US012689512B2

(12) United States Patent
Otman et al.

(10) Patent No.: US 12,689,512 B2
(45) Date of Patent: *Jul. 21, 2026

(54) SIGNAL PROTECTION AND RETRIEVAL BY NON-LINEAR ANALOG MODULATION

(71) Applicant: Signal Advance, Inc., Rosharon, TX (US)

(72) Inventors: Naser Otman, Halifax (CA); Chris M. Hymel, Rosharon, TX (US); Alan Nightingale, Halifax (CA); Ron Stubbers, Houston, TX (US)

(73) Assignee: Signal Advance, Inc., Rosharon, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/922,304

(22) Filed: Oct. 21, 2024

(65) Prior Publication Data

US 2025/0047485 A1     Feb. 6, 2025

Related U.S. Application Data

(63) Continuation of application No. 18/621,838, filed on Mar. 29, 2024, now Pat. No. 12,126,720.

(Continued)

(51) Int. Cl.
| | |
|---|---|
| *H04L 9/32* | (2006.01) |
| *H04L 9/08* | (2006.01) |
| *H04L 9/40* | (2022.01) |

(52) U.S. Cl.
CPC ................ *H04L 9/32* (2013.01); *H04L 9/088* (2013.01); *H04L 9/0822* (2013.01); *H04L 63/0428* (2013.01)

(58) Field of Classification Search
CPC ..... H04L 9/32; H04L 9/40; H04L 9/08; H04L 9/0822; H04L 9/088; H04L 63/0428
See application file for complete search history.

(56) References Cited

U.S. PATENT DOCUMENTS

| | | | |
|---|---|---|---|
| 4,302,628 A | * 11/1981 | Akrich | H04K 1/06 |
| | | | 380/43 |
| 5,519,725 A | 5/1996 | Hershey et al. | |

(Continued)

FOREIGN PATENT DOCUMENTS

| | | |
|---|---|---|
| CN | 105846946 A | 8/2016 |
| CN | 109660334 A | 4/2019 |

(Continued)

OTHER PUBLICATIONS

Bianchi et al. "Composite signal representation for fast and storage-efficient processing of encrypted signals." IEEE Transactions on Information Forensics and Security 5.1 (2009): 180-187. Retrieved on May 23, 2024 (May 23, 2024).

(Continued)

*Primary Examiner* — Jayesh M Jhaveri
(74) *Attorney, Agent, or Firm* — Gregory M. Howison

(57) ABSTRACT

A method is disclosed wherein an analog message signal is received with a finite length. An analog key signal is also received having a finite length at least as long as the analog message signal. An encryption carrier is generated and then an encryption operation initiated to encrypt the analog message. First, the encryption carrier is modulated with the analog key signal, generating an encryption dynamic carrier. Then, the analog message signal is mixed with the encryption dynamic carrier, with the mixing process initiated at an initial key starting point of the analog key signal and an initial message starting point. An encrypted message signal (Continued)

is output from the mixing process, which encrypted message signal has a starting point that coincides with both the message starting point and the key starting point and an encrypted message end point coinciding with the encrypted message signal end point.

18 Claims, 31 Drawing Sheets

Related U.S. Application Data

(60) Provisional application No. 63/456,410, filed on Mar. 31, 2023.

(56) References Cited

U.S. PATENT DOCUMENTS

| | | | |
|---|---|---|---|
| 5,909,491 A | 6/1999 | Luo | |
| 7,512,237 B1 | 3/2009 | Schantz et al. | |
| 7,545,929 B1 * | 6/2009 | Babb | H04K 1/02 |
| | | | 380/38 |
| 8,068,516 B1 * | 11/2011 | Oz | H04L 9/088 |
| | | | 725/111 |
| 8,452,544 B2 | 5/2013 | Hymel | |
| 2003/0034909 A1 | 2/2003 | Wong | |
| 2003/0035542 A1 * | 2/2003 | Kim | H04L 1/14 |
| | | | 380/37 |
| 2008/0141022 A1 | 6/2008 | Hu et al. | |
| 2011/0246792 A1 | 10/2011 | Weingarten | |

FOREIGN PATENT DOCUMENTS

| | | | | |
|---|---|---|---|---|
| CN | 110381504 A | * | 10/2019 | |
| CN | 111934848 A | | 11/2020 | |
| WO | WO-2015097312 A1 | * | 7/2015 | G09C 1/00 |

OTHER PUBLICATIONS

Motorola National Service Training: Securenet Systems Securenet Concepts: What is Securenet?; 28 Pages; Sep. 1, 1992.

Patent Cooperation Treaty: International Search Report and Written Opinion for PCT/US2024/022278; Matos, Taina; Jun. 17, 2024; 13 pages.

Chinese Patent Office: First Office Action of CN 2024800237926 (related application); Apr. 9, 2026; 8 pages.

* cited by examiner

NET TEMPORAL SHIFT

SPECTRAL COHERENCE
(Matched Key)

SPECTRAL COHERENCE
(Mis-Matched Key)

SPECTRAL COHERENCE
(Matched Keys)

SIGNAL PROTECTION AND RETRIEVAL BY NON-LINEAR ANALOG MODULATION

CROSS-REFERENCE TO RELATED APPLICATIONS

This application is a Continuation of U.S. application Ser. No. 18/621,838, filed Mar. 29, 2024, entitled SIGNAL PROTECTION AND RETRIEVAL BY NON-LINEAR ANALOG MODULATION, issuing as U.S. Pat. No. 12,126, 720 on Oct. 22, 2024, which claims priority to U.S. Provisional Application Ser. No. 63/456,410, entitled "SIGNAL PROTECTION AND RETRIEVAL BY NON-LINEAR ANALOG MODULATION," filed Mar. 31, 2023, the complete disclosure thereof being incorporated herein by reference.

TECHNICAL FIELD OF THE INVENTION

The present invention relates to the analog encryption and decryption of analog and/or digital signals representing information/data.

BACKGROUND OF THE INVENTION

Protecting and maintaining secure communication and data capabilities are critical national priorities. Industrial control, military operations, banking, government and medical systems, etc. that rely on point-to-point data transfer and communication are too critical to allow eavesdropping or malicious manipulation. Communications are critical not only for defense, but across a wide range of industries, as noted, from medical to infrastructure and industrial communications and controls to law enforcement to cloud computing. The integrity of stored data and confidence that it remains both private and unaltered is also crucial to the systems listed above. Each of these requires assurance of data integrity and insurance against malicious intervention. This opens areas of application to include parallel processing, serial processing, time division and frequency division multiplexed waveforms, stored signals and encrypted storage; time division multiple access (TDMA), and its more sophisticated variations are all possible applications, as multiple parallel and/or serial data streams can be secured simultaneously.

Traditional and current approaches to encryption for cybersecurity are typically digital and complex with multiple communication and transmission overlays, and with potentially unknown vulnerabilities. Current systems use either point-to-point fully encrypted digital links or tunnels and, for radio frequency communication, spread spectrum techniques overlaying digital data encryption. Ever more complex and sophisticated digital attack strategies evolve as fast or faster than the protection mechanisms for these digital cybersecurity solutions. Therefore, fundamentally different and asymmetric strategies and countermeasures are needed to maintain and protect data transmission and storage.

SUMMARY OF THE INVENTION

The present invention disclosed and claimed herein comprises a method for encrypting a message. An analog message signal is first received having a finite length from an initial message starting point to message end point. An analog key signal is also received having a finite length at least as long as the analog message signal and with an initial key starting point. An encryption carrier is generated operating at fixed center frequency. An encryption operation is then initiated to encrypt the analog message by the steps of, first, modulating the encryption carrier with the analog key signal with a predetermined modulation, which modulation begins at the initial key starting point of the analog key signal, wherein an encryption dynamic carrier is generated. Then, the analog message signal is mixed with the encryption dynamic carrier with a predetermined encryption mixing process, with the mixing process initiated at the initial key starting point of the analog key signal and the initial message starting point. An encrypted message signal is then output from the mixing process, which encrypted message signal has an encrypted message starting point that coincides with both the initial message starting point and the initial key starting point and an encrypted message end point coinciding with the encrypted message signal end point. The encrypted message is then transmitted over a communication path compatible with the encryption dynamic carrier

BRIEF DESCRIPTION OF THE DRAWINGS

For a more complete understanding, reference is now made to the following description taken in conjunction with the accompanying Drawings in which.

DETAILED DESCRIPTION OF THE INVENTION

Figure 1:
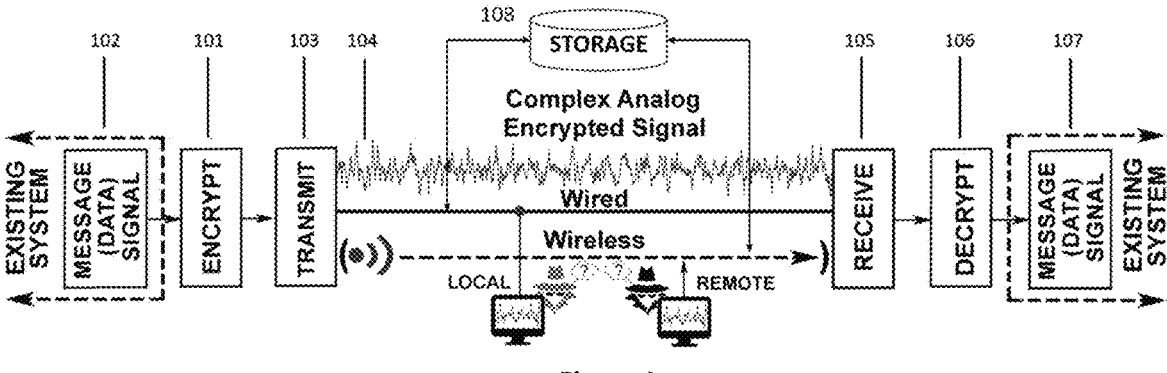
FIG. 1 illustrates a system block diagram of the encryption and decryption devices.

Referring now to FIG. 1, there is illustrated an overall block diagram of the analog key encryption system of the present disclosure. The process embodied in the system of FIG. 1 comprises analog encryption 101 of a received message/data signal 102 optionally provided to a transmission 103 or storage 108 means. Following transmission 103 or access to storage 108, the analog encrypted signal is received 105, in some instances by an intervening power or signal-amplifying receiver, and matching decryption 106 is applied to recover the original message/data signal 107 to enable point to point secure communications. It is compatible with a range of transmission media, including wired or wireless across a range of frequencies, including storage before transmission.

This technology uses an analog key signal-based Dynamic Carrier ("DC"), for example, the DC would be a Dynamic Frequency Carrier ("DFC") when frequency modulation (vs. phase or other form of modulation) is applied utilizing the analog key. Various forms of modulation (e.g., frequency, phase) using a complex analog key (or keys), rather than modulating the original analog message signal, modulate a carrier waveform to generate a complex dynamic carrier waveform. The DC is then mixed with another signal (e.g., the message signal), which is a baseband signal. This process is termed Analog Dynamic Modulation (ADM). This message signal is a finite message signal that has a beginning and an end.

The system of FIG. 1 illustrates both the encryption side and the decryption side. For encryption, what is necessary is the DC and the analog key or keys. To perform the decryption operation, all that is needed is the same DC and analog key or keys. In addition, the decryption requires the mixing operation on the encryption side to be mirrored on the decryption side. During encryption, the modulation of the DC is temporally related to the message signal such that both are initiated at a finite time relative to each other. As will be described hereinbelow, the decryption operation must also take into consideration the temporal relationship.

As to the overall operation, a message is received from an existing system and then converted to an analog signal. The now analog message is input to the encrypt block and converted to a Complex Analog Encrypted Signal with the analog key. As will be described hereinbelow, the Complex Analog Encrypted Signal is a signal that centers the message around the DC, wherein the DC has a bandwidth to accommodate the encryption operation. The Complex Analog Encrypted Signal is the encrypted message. On a wired transmission path (although wireless is anticipated as a transmission path) the Complex Analog Encrypted Signal is transmitted to a receiver associated with the decryption operation. At the decrypt block, the Complex Analog Encrypted Signal is received and the same analog key used in the decryption operation. As will be further described hereinbelow, the decryption operation requires the analog key and the encrypted message be input at the same time requiring a temporal relationship therebetween.

In addition, a method of signal modulation, termed Phase-Linked Temporal Non-Linear Modulation ("PLTNM") is introduced and described herein to enhance encrypted signal complexity and, thus, encryption strength. The implementations described herein render local and remote attacks using digital approaches ineffective-thus mitigating the ability of "bad actors" to remotely infiltrate systems and breach security and, if acquired, exploit the information contained in the analog encrypted signals. The technology herein disclosed includes an apparatus and method steps for assemblage and implementation of an analog, hardware-based, physical signal encryption approach-compared to software-based digital data encryption.

Encryption

Figure 2:
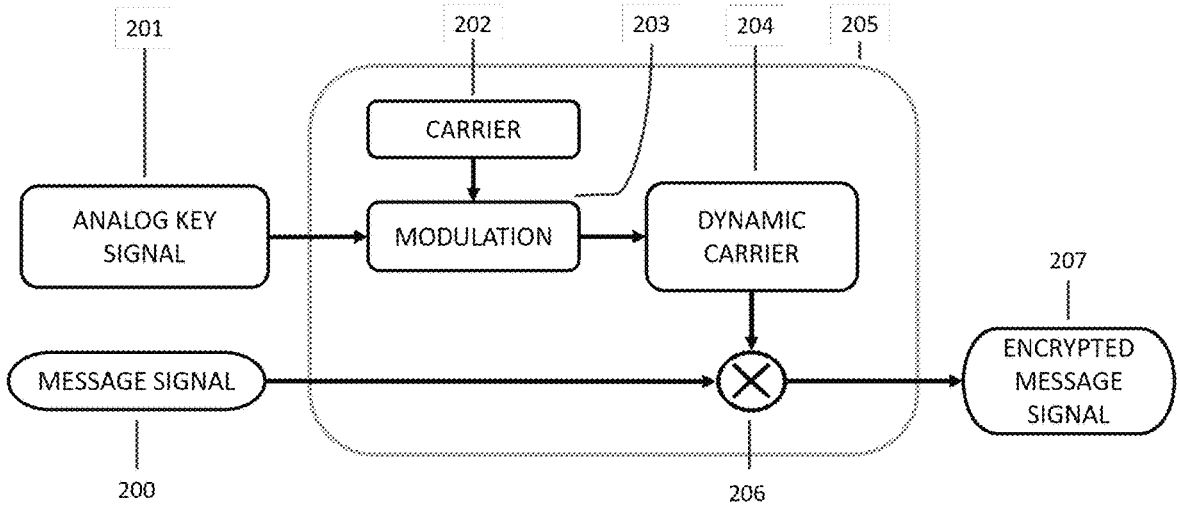
FIG. 2 illustrates a block diagram of the encryption device.

Referring now to FIG. 2, there is illustrated a block diagram of the encryption block 101, illustrating an implementation of a portion of one disclosed embodiment and describes methods and an apparatus to encrypt a message signal 102 whether analog or digital, having amplitude and phase. The message signal, if digital, is converted to a continuous time analog signal with a digital-to-analog converter or other means of analog encoding. On the decryption side, the decrypted signal will exist in the analog domain and will have to be processed through an analog-to-digital converter or other encoding means to recover the original digital message. The encryption operation operates on non-discrete continuous time analog signals.

The disclosed implementation employs a continuous "analog key" signal 201 having similar amplitude and phase. This analog key can be any analog signal, such as an audio signal in the form of a Wave file or any type of analog file existing in the baseband and in an analog domain. The analog key will have a finite length with a beginning and an end. The analog key signal 201 is used to apply, through modulation of a carrier, angle, temporal (or by other means) modulation via a modulation block 203 to a first carrier 202 in any one of several different methods. Thus, a base carrier in the form of the first carrier 202 is provided to the modulation block 203 and modulated by the analog key signal to provide or generate a second carrier signal termed a Dynamic Carrier (DC) 204. The DC needs to be at a frequency higher than the analog key signal. It can be a carrier in the MHz range or higher and even an optical carrier. The bandwidth of any channel associated with transmission of the carrier must be sufficient to capture all of the spectral energy associated with the modulation.

For explanatory purposes, one specific embodiment disclosed herein comprises the dynamic carrier to be generated by applying frequency modulation, and thus is a DFC 204, i.e., a modulated DC. In this embodiment, frequency modulation is utilized as the type of modulation. Non-trivial encryption requires an analog key that is complex in the time domain and has bandwidth to include a range of frequencies in the encryption process, which range of frequencies is within the analog domain. Pure sine waves do not provide non-trivial encryption and, although they would provide an analog signal for the purpose of modulation, a more complex analog signal is preferred.

Throughout this specification, the message signal (also known as original message signal or data signal) 200, with appropriate numbering for the figure referenced, will be used to refer to a signal, whether analog or digital in nature, that is a message, data, audio (whether digital or analog), or any type of information to be encrypted and then stored or transmitted for later decryption. However, as described above, the message signal, if digital, is converted to a signal in the analog domain. The message signal 200 is input to a mixer 206 to be mixed with the DFC to generate a primary encrypted message signal 207. The process of modulating with the modulator 203 an analog carrier 202 with the analog key signal 201 to produce a dynamic carrier, which is subsequently mixed with the message signal, is referred to as the encryption module 205 in this embodiment. This essentially amplitude modulates the already modulated DC.

In this disclosed embodiment is the generation of a carrier with dynamic variation in frequency and/or phase (or variation from any other form of modulation) content based upon an analog key signal. This variation can be, without limitation, accomplished by angle modulation, including examples such as frequency modulation, where the carrier would then be designated as a DFC, or phase modulation, where the designation could be defined as a Dynamic Phase Carrier ("DPC"), or a combination of both.

A further form of modulation herein introduced, designated temporal modulation through use of a class of circuits exhibiting Negative Group Delay (NGD), where the action of these circuits is designated as PLTNM. Other types of modulation, such as amplitude, may also be utilized by one skilled in the art. Portions of the NGD are described in U.S. Pat. No. 8,452,544, which is incorporated herein by reference in its entirety.

While there are several modulation methods disclosed herein (e.g., phase, angle, frequency, amplitude), in order to simplify subsequent explanations, this Specification utilizes as an example frequency modulation, and thus the dynamic carrier generated is referred to as a Dynamic Frequency Carrier ("DFC"). This example in no way limits the scope of the disclosed embodiment to frequency modulation exclusively. Stated otherwise, for simplicity in explanation throughout the rest of this document, DC will be utilized to represent generally a dynamic carrier without limitation as to type of modulation used to make it "dynamic." Where 'DFC' is shown within the figures, explanations, and specifications, it is therefore representative of the range of dynamic carriers. If DFC is to be indicated specifically and only DFC, that fact will be stated.

It is also understood that more than one type of modulation or operation (scaling or mixing as non-limiting examples) may be applied to the carrier 202 as well to increase the level of complexity and thereby increase the level of encryption of the signal it is later used to encrypt.

The DC is then mixed with mixer 206, in real-time, with the continuous message signal 200 using any one of several possible mixing methods including, in one disclosed embodiment, multiplication and, in another embodiment, PLTNM described later herein, to produce an encrypted continuous signal 207 with amplitude and phase containing both the analog key and message embedded therein that can be securely transmitted. Demonstration of mixing is described in the multiplication embodiment and PLTNM embodiment described herein below, and in both embodiments the message signal is mixed with a dynamic carrier.

In this particular disclosed embodiment, the output of the mixer is a carrier centric signal that can be transmitted over a communication link, wired or wireless, to the receive block 105 on the decryption side. Thus, once received, the decryption operation begins, and the analog key must be initiated at the time of reception of the encrypted signal.

A complete encryption/decryption system is illustrated by the combination of FIG. 2 for encryption followed by FIG. 29 for decryption, described hereinbelow. For the operation of the encryption and decryption operation a DC must be created by modulation of a carrier by the analog key signal. The created DC is now a signal at passband or in other words centered around the carrier frequency, but with a complex spectrum due to the effect of the analog key and the modulator transfer characteristics. The same DC is required on both sides of the system.

With the DC available, referring further to FIG. 2 for encryption, when the message signal 200 is multiplied by the DC with multiplier 206, this will result in amplitude modulation of the message onto the complex DC signal. This resulting signal 207 is the encrypted message signal.

Referring back to FIG. 1, if directly transmitted or stored, the encrypted message signal 207 is represented by signal 104. FIG. 1 indicates an additional module designated 103, which may without limitation include additional amplification for power or amplitude, modulation to shift frequency ranges, filtering for bandwidth reduction, or buffering of other known conversions of the analog signal. In the case where FIG. 1 module 103 is present in a system, an encryption module 205 or of a related type as described in the present technology is then represented by module 101.

Receivers of the encrypted signal and subsequent decryption process blocks (105, 106, respectively) in FIG. 1 without the matching analog key signal are unable to reproduce the DC and, hence, are unable to successfully 'unmix' the original message signal from the encrypted signal. The decryption block 106 in FIG. 1, when supplied with the proper analog key signal and the same carrier as used in the encryption process, can reproduce the same DC used in the encryption process to 'unmix' the encrypted signal and recover the original message signal at the receiving end. This decryption process will be described hereinbelow with respect to FIG. 29 and following.

During encryption, the analog key signal is applied to the carrier 202 via the modulator 203 with a temporal relationship, as both have finite lengths. The encryption operation thus begins when both the message and the analog key signal are applied to the system of FIG. 1. As will be described hereinbelow with respect to FIG. 29, decryption requires the same operation wherein the encrypted message signal and the analog key are applied to the decryptor at the same time to begin the decryption operation.

The general summarized steps for the encryption operation are as follows:
1) Receive analog key;
2) Receive message to be encrypted:
    a. If digital then convert to the analog domain;
3) Provide a carrier;
4) Initiate encryption by inputting:
    a. Analog key to a modulator and modulate the carrier (frequency, phase, temporal or Amplitude) to provide a Dynamic Carrier (DC),
    b. Message (in analog domain) to a mixer,
    c. DC to the mixer at same time as message;
5) Output encrypted message from the mixer;
6) Transmit encrypted message to a decryptor.

Figure 29:
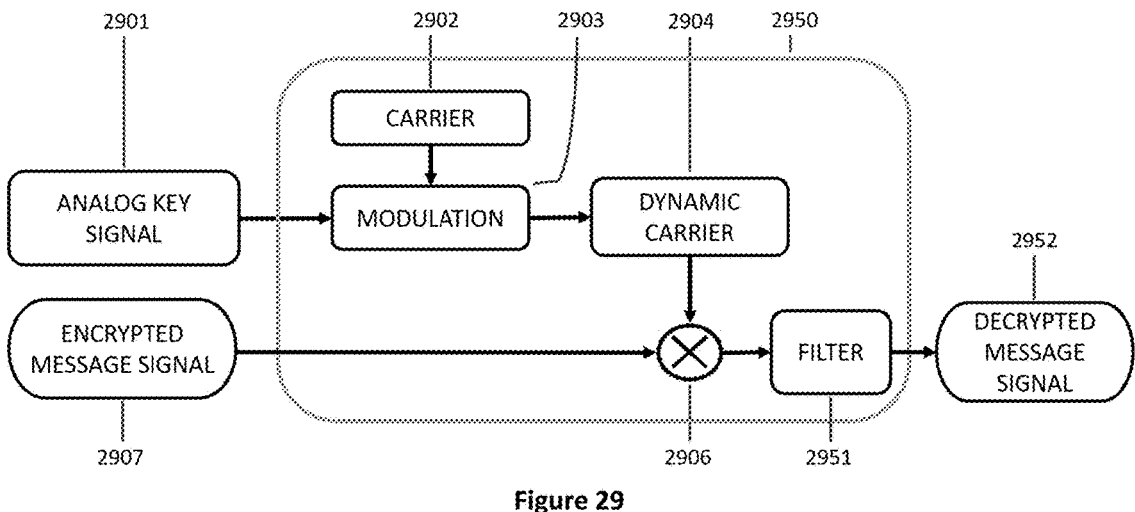
FIG. 29 illustrates the decryption system of FIG. 1 with a filter.

The steps for the decryption operation, as will be more fully described hereinbelow with respect to FIG. 29, are as follows:

1) Receive or retrieve encrypted message; Retrieve analog key;

2) Provide the same carrier used for encryption;

3) Initiate decryption by inputting:

a. Analog key to a modulator identical to modulator used in encryption and modulate the carrier to provide a Dynamic Carrier (DC), b. Encrypted message to a mixer identical to the mixer used for the encryption operation, c. DC to the mixer at the same time as the encrypted message;

4) Filter the output of the mixer;

5) Output from the filter the decrypted message.

Once the message has been encrypted, the decryption operation requires substantially the same process to be carried out as the encryption operation, as will more fully be described hereinbelow with respect to FIG. 29 and following. However, in general, the concept is that the mixing process for encryption and decryption is identical but must utilize the substantially identical input from a DC on the decryption side to the mixing process on the decryption as was used for the encryption for value in time for the encrypted messages. Consider the analog key signal being a continuous complex analog key signal with values $AK_t$ with t representing time increments 0 to n. The unencrypted message signal would be an analog signal with values $MS_t$, wherein that the analog key signal, $AK_t$, and the message signal, $MS_t$, would both be initiated a t=0 when the encryption is initiated. The carrier in the encryption operation would have a continuous value that, once modulated by the analog key signal, would produce the dynamic carrier DC having values DC over time. As such, for each value of t, $AK_t$, $MS_t$ and $DC_t$ would yield a value for the encrypted message, $EM_t$.

In order to decrypt the message, what is required is to provide the same mixing process employed in the encryption operation and, for each value of t in the received $EM_t$ there will be a DC generated at the decryption side with an analog key identical to the one used in the encryption process, Decryption Analog Key (DAK), and a carrier identical to the carrier used in the encryption operation, wherein using the same modulation as the encryption process, the DAK can modulate the carrier generated in the decryption operation to generated a decryption dynamic carrier (DDC) that is substantially identical to the DC generated in the encryption operation. Thus, there will exist for the encryption at a given time t a $DDC_t$ and a $DAK_t$. At, for example for a value of t=270, what must occur for decryption is that $DDC_{270}$, $DAK_{270}$ and $EM_{270}$ all line up, with $DDC_{270}$ and $EM_{270}$ being input to the same mixing process as that used in the encryption process. This will result in a decrypted message signal being output at that value of t. If there is a slight offset in time, such that the value of the encrypted message a t=270 were $EM_{275}$, that would just result in some error in the decrypted signal due to the fact the EM was generated at t=275. After conversion to a digital value, there may be a higher Bit Error Rate (BER). It can thus be recognized that generation of the same $DDC_t$ corresponding in time relative to the value of t for $EM_t$ is required, wherein initiating the decryption operation at t=0 for both the analog key signal and the encrypted message signal will result in such happening.

Methods are further disclosed herein to protect the encrypted message signal by adding additional signal encryption complexity through the mixing process and/or process of generation of the dynamic carrier (DC). This latter set of processes, that add further complexity in the generation of the dynamic carrier, are generally designated as "key protection." Key protection will ensure that the analog key signal cannot be extracted from the encrypted signal or otherwise determined by an actor that is not authorized to access the key signal.

Figure 3:
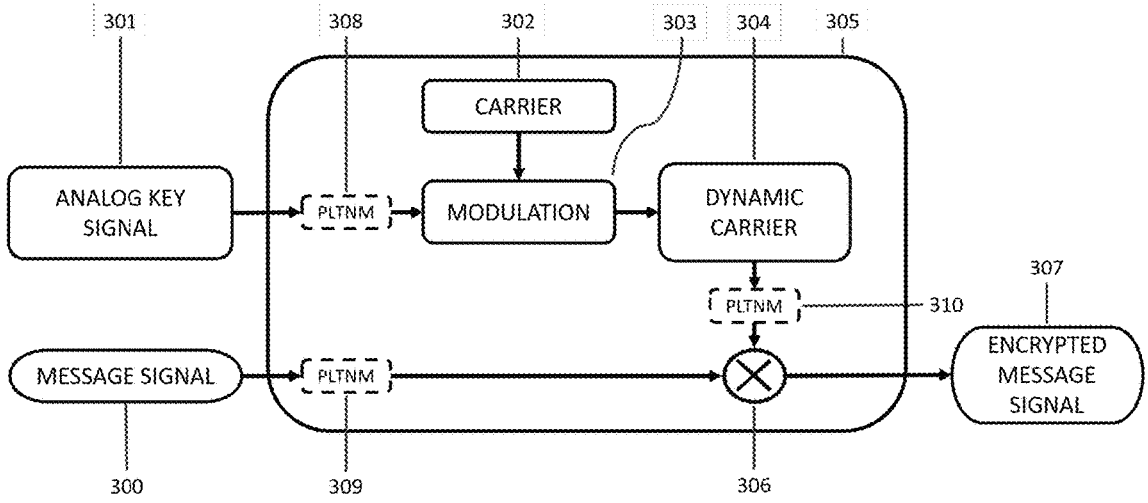
FIG. 3 illustrates a block diagram of the encryption device utilizing optional PLTNM circuits for additional security.

FIG. 3 illustrates the same encryption process depicted in FIG. 2, but additionally implementing PLTNM at various points in the process to increase encrypted signal complexity and thus encryption strength. PLTNM significantly increases encrypted signal complexity and extraction difficulty due to the 2nd-order per stage non-linear nature of this form of temporal modulation. Elements 300, 301, 302, 303, 304, 305, 306, and 307 in FIG. 3 are the same as elements 200, 201, 202, 203, 204, 205, 206 and 207 in FIG. 2. Additional elements 308, 309 and 310 are various implementations of PLTNM applied at different points in the encryption process. PLTNM applied at 308 between the analog key signal 301 and the modulation block 303 or at 310 between the DC 304 and the mixer 306 affects the dynamic carrier (DC) and must be applied correspondingly during the decryption process for message signal recovery. In addition to the elements 308, 309 (applied between the message signal 300 and the mixer 306), and 310 that may be added, PLTNM may in other embodiments also be utilized as the mixer 306. Whereas, in some specific embodiments, the mixer 306 may be, as a non-limiting example, a multiplier. The mixer 306 may also as a non-limiting example be a PLTNM circuit. This circuit implementation is demonstrated later in this document.

Where modulations are described in this disclosed embodiment, it is understood that there are several types of modulation available, including without limitation, generally, angle, including phase and frequency, amplitude, or temporal. For temporal modulation specifically, PLTNM can be utilized.

Protection of the Analog Key Signal

Inverted Key—The analog key signal is incorporated into the encrypted message signal for transmission before decryption. As the analog key signal also enables decryption of the encrypted signal, it is imperative that the analog key signal be protected. Protection of the analog key signal in the encrypted signal may be enhanced by several methods. One such method is the use of an inverted key, as illustrated in FIGS. 4 and 5.

Figure 4:
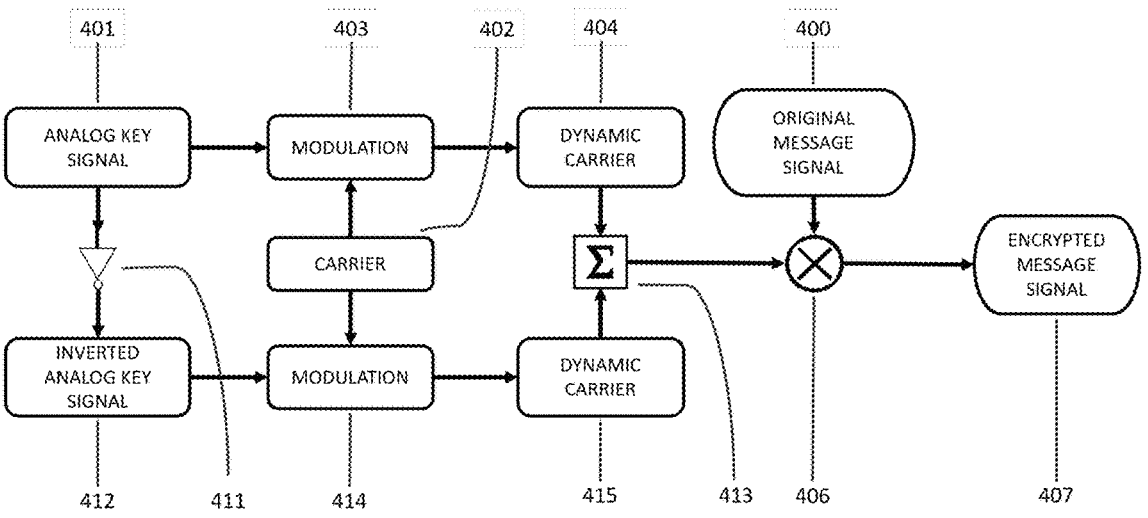
FIG. 4 illustrates a block diagram of an alternate embodiment of the encryption device with modulation of both the analog key and an inverted analog key.
Figure 5:
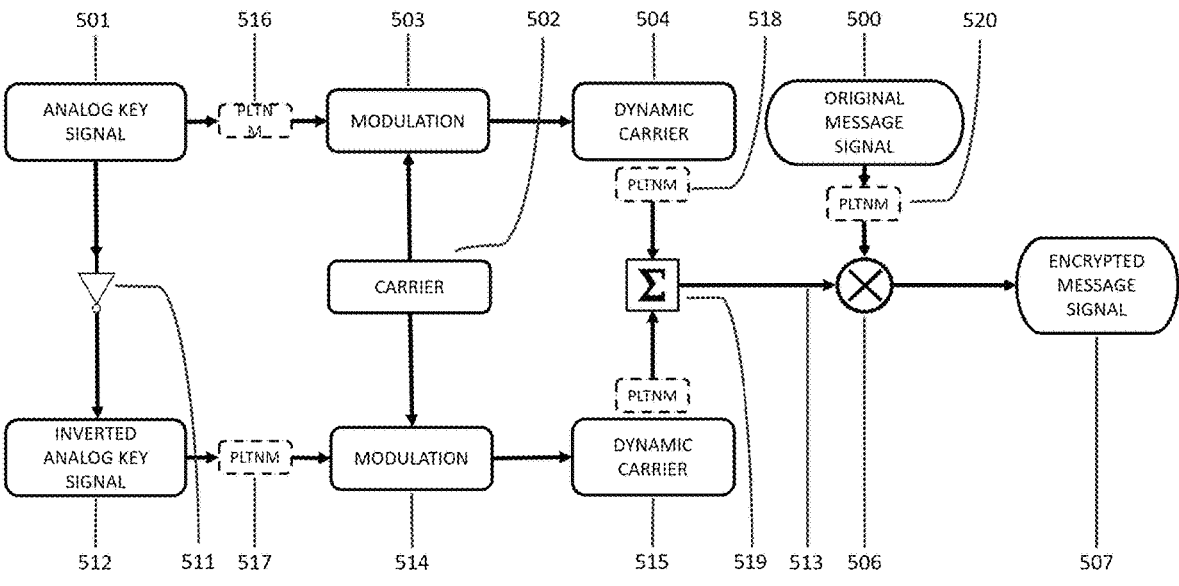
FIG. 5 illustrates a block diagram of an alternate embodiment of FIG. 4 where PLTNM circuits may optionally be added for additional complexity and security.

FIG. 4 illustrates inverted key protection without explicit implementation of PLTNM. FIG. 5 shows additional use of PLTNM. Similar to FIGS. 2 and 3, the figure elements numbered 400-407 correspond to elements 200-207 & 300-307 in the previous FIGS. 2 and 3, respectively.

The inverted key utilizes an analog key signal 401 to modulate, with a modulator 403, the carrier 402 to generate, in this embodiment, the dynamic carrier 404. Analog key signal 401 is inverted (effectively multiplied by −1) with an inverter 411 to form the inverted analog key signal 412, which modulates with a modulator 414 the carrier 402 to form an additional dynamic carrier 415. DC 414 is similar to but not identical to the second DC 415 due to the fact it is modulated with an inverted analog key signal. The modulations of the modulators 403 and 414 applied to the individual signals must be of exactly the same type and must be applied to the two signals individually before summation with a summation block 413. Any attempt to perform direct demodulation (e.g., frequency demodulation) of the encrypted signal to extract the analog key signal will result in elimination of the analog key signal due to destructive interference with the inverted key signal.

Systems that include inverted key protection, are operable to mix with a mixer 406 summed DC from a summation block 413 with the original message signal 400 to form the encrypted message signal 407.

FIG. 5 illustrates one embodiment of inverted key protection that additionally applies different implementations of PLTNM (516-520) at various points in the process to manipulate the analog key signal and/or the inverted analog key signal and/or one or more dynamic carriers (DCs), and/or the original message signal for increased encryption complexity/strength. Elements 500-515 corresponds to elements 400-415 in FIG. 4.

Figure 6:
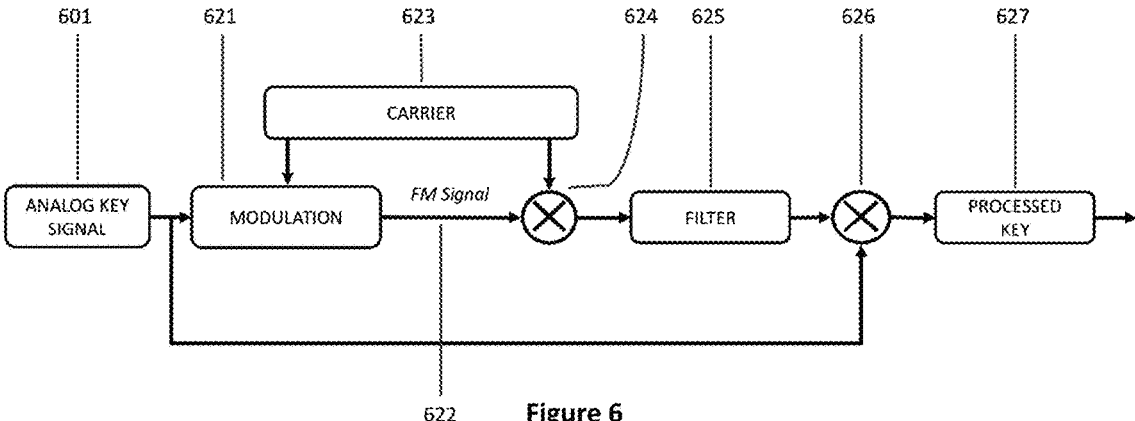
FIG. 6 illustrates a block diagram for generation of a processed key without PLTNM.

Processed Key Referring now to FIG. 6, there is illustrated a block diagram of a process to generate a processed key. Protection of the analog key signal from being extracted from the encrypted signal involves additional processing of the analog key signal. The analog key signal is used to angle or otherwise modulate a first carrier directly to form a DC (for this example, a DFC). An additional modulation step is implemented to further protect the key embedded in the DC from extraction.

FIG. 6 illustrates the generation of a processed key from an analog key. It is noted that the processed key is utilized in the generation of a dynamic carrier (DC) exactly like an unprocessed key would be but implements additional protection from extraction of the key from the DC.

The analog key signal 601 angle or otherwise modulates with a modulator 621 a first carrier 623, creating a first modulated signal 622. The first modulated signal and the first carrier are then mixed with a mixer 624, in this preferred embodiment by multiplication, filtered with a filter 625, and then again mixed with a second mixer 626 with, in this preferred embodiment by multiplication, the analog key signal 601 to produce a processed key 627. This processed key is then utilized in any of the embodiments described herein where the analog key signal 201, 301, 401, 501 is illustrated. The "double modulation" shown provides an additional layer of security against decryption by FM or related type demodulation, thus protecting against an adversary attempting to extract the key from the encrypted data stream. This type of key protection is designated as processed key protection.

In an additional embodiment, the final signal mixing uses a second analog key signal rather than the original analog key to additionally increase encrypted signal complexity/strength (not illustrated).

Figure 7:
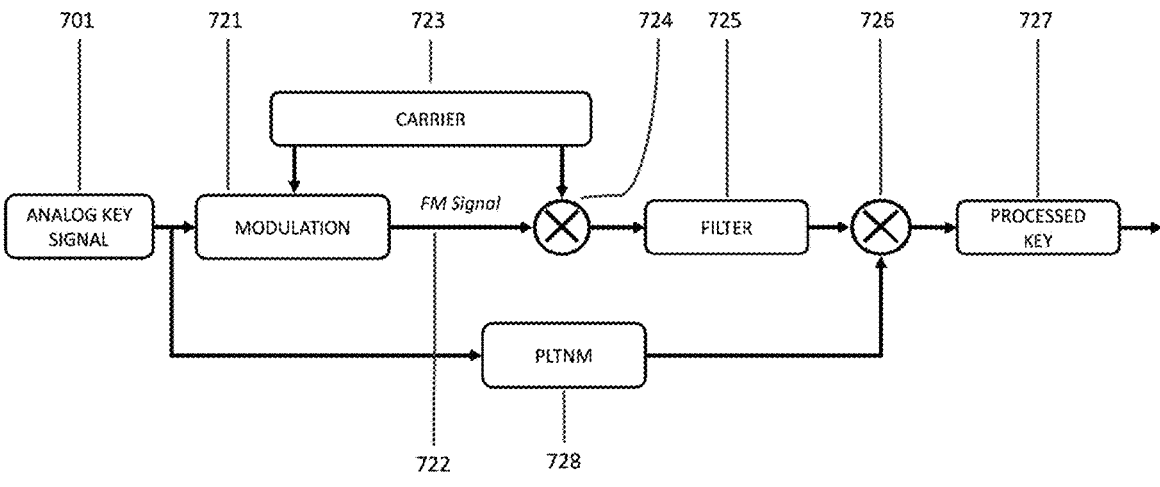
FIG. 7 illustrates a block diagram of an alternate embodiment of FIG. 6 with the addition of PLTNM.

Referring now to FIG. 7, there is illustrated a block diagram of a further embodiment of the FIG. 6 embodiment, wherein PLTNM 728 applies non-linear temporal modulation to the analog key signal 701 before the final mixing at a mixer 726 in order to provide additional security against extraction of the key and, hence, increased encryption strength. PLTNM significantly increases encrypted signal complexity and extraction difficulty due to the 2nd-order, nonlinear nature of this form of temporal modulation. Elements 701 and 721-727 correspond to elements 601 and 621-627 in FIG. 6 respectively.

Described thus far is a method for modification as well as encryption of a message signal that produces intermediate signals. Those intermediate signals as listed include or are produced from modulated carriers, dynamic carriers, orthogonal mask signals, message signals, and more. Additional manipulation may be applied to primary signals to produce modified intermediate signals, or to intermediate signals themselves to increase signal complexity and increase the extent and thus strength of signal encryption.

Phase-Linked Temporal Non-Linear Modulation (PLTNM)

One class of additional methods of manipulation of intermediate signals or to primary signals described herein is termed Phase-Linked Temporal Non-Linear Modulation ("PLTNM"). This modulation method can be implemented with a variable non-linearity, for example, as a second order function presenting as any of a number of signal functions, e.g., high pass, low pass, high/low with no-go in middle, band pass, band stop. The range of functions that can be produced with the PLTNM characteristic equation is described in greater detail later in this document.

Within each of these implementations, the bandwidth and frequency ranges of interest are designed to match the signal characteristics of the specific application and can further be varied throughout the analog signal encryption process. PLTNM circuits and circuit functions are characterized by negative group delay (NGD). PLTNM circuit modules may also be cascaded to produce higher order functions. Further, PLTNM can be applied at various steps (functional system processes) comprising the signal encryption process, e.g., the message signal, analog key, additional key, the DC, mask signal.

Additional Complexity—Increased Encryption Strength

Increased signal encryption complexity translates to improved encryption strength. Increased signal complexity can be achieved through the signal mixing process by use of multiple carriers, in which the signal carriers are orthogonal to one another. One channel contains the message of interest and the other contains an orthogonal mask signal. The two channels are configured such that if the identical analog key signal is used for both encryption and decryption, the additional orthogonal mask signal is eliminated and only the message of interest is retained in the decrypted message. If the analog key signal used for decryption does not match the analog key signal used for encryption, then some or all of the mask signal added by the orthogonal carrier is retained, thereby degrading readability of the received message.

Figure 8:
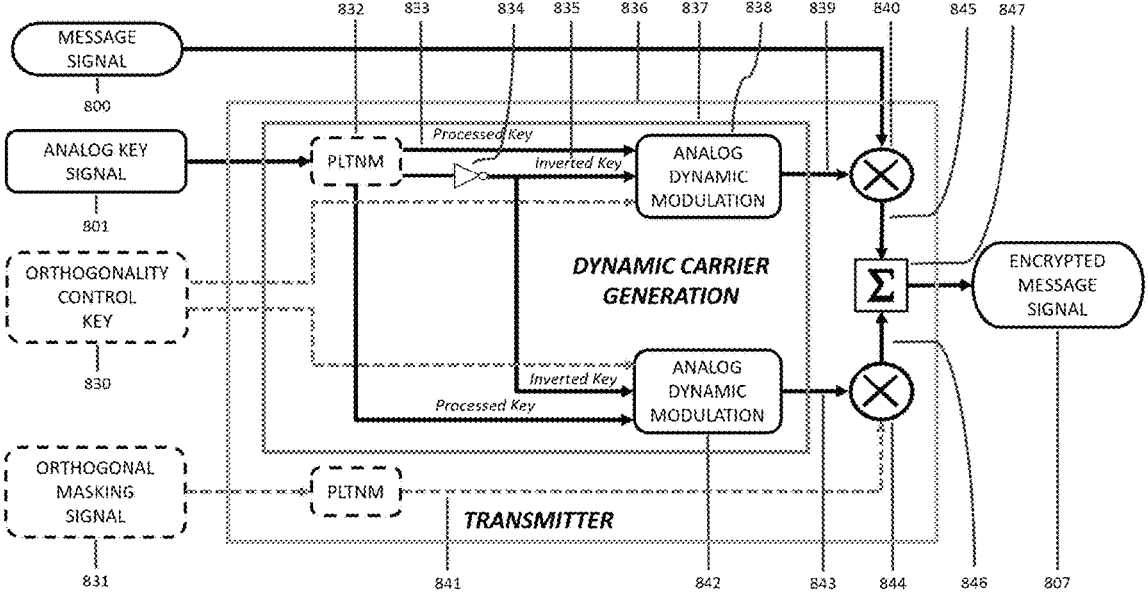
FIG. 8 illustrates a block diagram of an encryption system that includes the addition of a masking signal added via orthogonal carrier to the message signal.

Referring now to FIG. 8, the method of orthogonal carriers described above is illustrated which can be accomplished with a single key 801 and orthogonal carriers, or with an additional key 830. Orthogonal signals, in this case sinusoids with 90 degrees of separation, can be used to transmit two signals on the same frequency at the same time. Either the single key or the additional key can alternatively control an orthogonally additive signal 831 such that if the additional key does not match, the orthogonally additive signal dominates the decrypted message produced by the decryption process. The present embodiment teaches use of a key to determine if the orthogonal signal will be shown or hidden. The orthogonally added signal 831 is optionally modulated by PLTNM prior to transmission by a transmitter 841 to a mixer 844. The carrier that has undergone modulation with a modulator 842 is orthogonal to the carrier that also undergoes modulation with a modulator 138. The message signal is mixed with the modulated carrier DC 139 at 840, and the masking signal is mixed with the orthogonally modulated carrier DC 843 at a mixer 844. These two mixed signals are subsequently summed at a summation block 847 to form the encrypted message signal 807. The summation process does not affect orthogonality properties as the mixing processes are scaling processes and thus do not impact the orthogonality of the two carriers. The encrypted message signal is the mixture of the message signal modulated by one DC, and a masking signal modulated by an orthogonal DC.

FIG. 8 further illustrates the combination of several elements that have been discussed. It shows inverted key protection at an inverter 834 generating the inverted key 835, and indicates the processed key 833, though the full diagram for the processed key is not included here. The optional (dashed lines) application of PLTNM modulation is illustrated at block 832 and between 831 and 841.

Increased Encryption Strength Through Dynamic Sequencing

Figure 9:
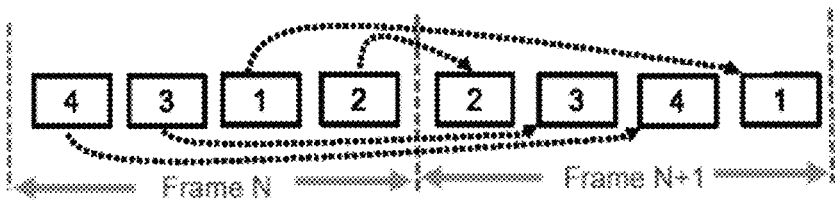
FIG. 9 illustrates a sequencing diagram for time blocks or frequency sub-bands.

Two methods, one in the time domain and one in the frequency domain, increase encryption strength through dynamic sequencing. In one embodiment addressing time domain sequencing, the message signal is broken into time blocks. Each of those time blocks is further divided into a number of time segments or blocks (in this example four (4) time blocks), as an example without limitation, illustrated in FIG. 9. If the normal ordering of the sub-blocks is 1, 2, 3, 4, it is possible to cause the sequence of the sub-blocks within a block to be rearranged to a different ordering, for example 1, 4, 2, 3.

For one skilled in the art, there are many methods to generate ordering that can be known at both the encryption block and decryption block by users who have access to appropriate codes and knowledge. However, the ordering is difficult to decode for anyone not skilled in the art without the requisite codes and knowledge. This re-ordering of sub-blocks within a block for sequential blocks of a message to be transmitted is time domain sequencing. Use of PLTNM circuits can 1) shift data blocks into time spaces considered to be in a different sub-block is one method of utilization and/or 2) apply non-linear modulation to the signal segment. If each block is shifted (in time) in the encryption device instead of a full integer amount of time shift and/or modulated non-linearly, using PLTNM, the identical decoding would be performed on the decryption device.

Further embodiments to be described more fully herein (see FIG. 27) apply multiple channels in parallel and/or in series where dynamic sequencing is applied. The disclosed embodiment enables yet more complex encryption and decryption of multiple parallel signal time-domain segments or frequency-domain sub-bands to be transmitted, or single signals to be transmitted that may be split into multiple parallel streams for transmission. For these multiple channels where multiple instances of PLTNM or other circuits may be utilized for encryption, circuits and parameters of circuits may either be the same for each channel and circuit or may be different, yielding a substantial combinatorial set of possibilities for encryption.

Figure 10:
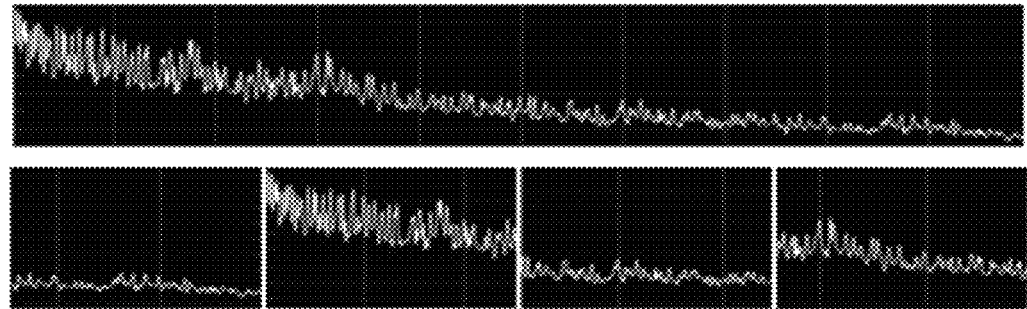
FIG. 10 shows frequency sequencing where a frequency spectrum is broken into four sub-spectra and the 'order' of the four sub-spectra are changed.

Frequency domain sequencing is analogous to time domain sequencing, but where a block of the message signal is transformed into the frequency domain, and frequency slices of the spectrum are taken and re-sequenced. The term dynamic is used in front of either time domain sequencing or frequency domain sequencing if the sequence is dynamically changed, as noted in the description for time domain sequencing above by applying PLTNM to effect phase (time)-shift and/or non-linear modulation. (See also FIGS. 9 and 10). As was noted above, for time domain and frequency domain sequencing, temporal segments (or blocks) and/or frequency sub-bands can be applied across multiple parallel or parallel/serial channels with like or unique parameters and sequences. Further embodiments will be described in more detail below.

Use of PLTNM to introduce temporal and phase changes as well as other modulations results in a broadened and flattened power spectrum in order to increase encryption strength when performing frequency sequencing, dynamic frequency sequencing, or time domain sequencing including dynamic time domain sequencing.

For both time domain sequencing and frequency domain sequencing, it is possible to add additional "masking" sub-blocks with time domain or frequency content intended to confuse those attempting to gain unauthorized access to the signals. This is particularly helpful in frequency domain sequencing when the message signal has characteristic frequency content.

Utilization of the Present Disclosed Embodiment for Digital Signals

Application of the present technology to digital signals has been mentioned previously but bears elaboration as there are multiple methods for application. Digital signals are encoded for transmission using such methods as phase-shift keying (PSK) modulation, frequency shift keying (FSK) modulation, or Quadrature Amplitude Modulation (QAM) to name just a few of the several available methods, to produce analog signals. The technology here disclosed can be applied just as it would be for any other analog signal.

Digital-to-digital encoding of the "1's" and "0's" is generally in one of three types of encoding: Unipolar, Polar and Bipolar.

Figure 11:
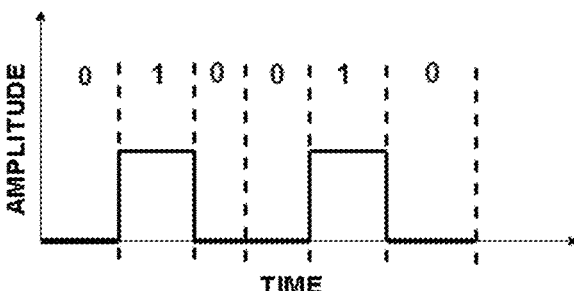
FIG. 11 illustrates diagrammatically unipolar encoding of a digital sequence.

In Unipolar encoding, '1' is represented by a high voltage and '0' is represented by zero voltage (FIG. 11).

Figure 12:
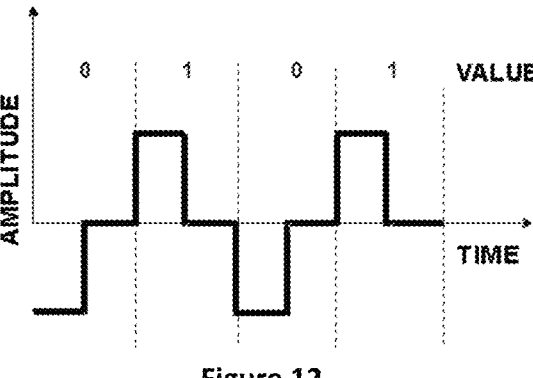
FIG. 12 illustrates diagrammatically bipolar encoding of a digital sequence.
Figure 13:
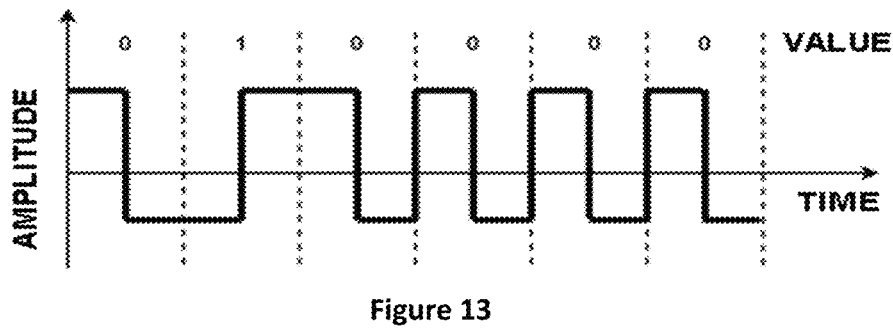
FIG. 13 illustrates diagrammatically bipolar Manchester encoding.

Polar encoding uses two voltage levels: one is positive, and another is negative. While there are some variations, FIGS. 12 and 13 illustrate two Polar encoding methods.

Bipolar encoding uses three voltage levels: positive, negative, and zero. The zero level represents binary 0, and binary 1 is represented by alternating positive and negative voltages.

Analog encryption can be applied to each of these digital encoding schemes, either by processing the data stream as an analog signal, or through conversion by application of an appropriate front and back end for the system. More complex parallel data streams could undergo digital to analog (D/A) conversion on the front end (prior to analog encryption) and analog to digital (A/D) conversion on the back end (following analog decryption), thereby enabling analog encryption for the transmission of parallel data streams. Such analog encryption application to parallel data streams requires consideration to data rates and bandwidth.

PLTNM Application to Digital Signals

An embodiment of the present technology is application to digital signals that are characterized by sequences of 1's and 0's to scramble the ordering of the 1's and 0's.

A first further embodiment utilizes temporal modulation of the signal with PLTNM to temporally shift the order of occurrence of the bits representing the 1's relative to those representing the 0's in the data stream. The encryption block and decryption block both utilize the same two PLTNM methods (one for the "1's" and another for the "0's"), and the encryption in the encryption block is essentially reversed or undone in the decryption block utilizing the same key.

A second further embodiment utilizes temporal modulation of phase encoded bit streams. Phase modulation of digital data is a popular and standardized methodology of encoding data for transmission, and modulation using one or more keys and PLTNM for temporal modulation results in encryption of the signal. As the same analog key signal is used for encryption and decryption, the encryption that occurs in the encryption block and/or for storage is essentially reversed or undone during decryption.

In a third further embodiment, as noted above, the digital data stream encodes the 1's and 0's at two different voltage levels representing the data bits. This signal is treated, for the purpose of encryption, like any other analog waveform. The incoming waveform shifts between one voltage level and the other and remains for the designated time period to encode one or more 1's or 0's (bits). Encryption is performed just as with any other analog waveform employing one or a combination of the analog modulation and protection methods described previously.

Figure 14:
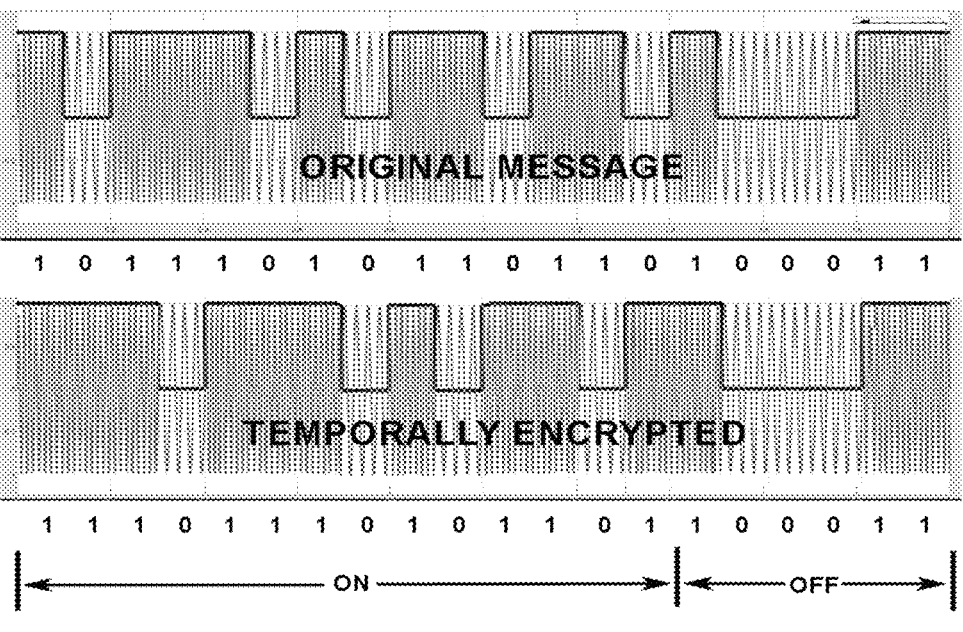
FIG. 14 illustrates digital signal encoding using frequency shift keying with a net temporal shift caused by temporal modulation.

A fourth further embodiment, as noted above, applies to the case in which the data stream is represented in a continuous analog waveform by two different frequencies (both in the analog domain), each representing the 1's or 0's. The incoming waveform shifts between one frequency and the other, again remaining at either frequency for the required time period to represent one of more bits (FIG. 14). The analog waveform is encrypted just as any other analog waveform and may be treated like any other analog waveform.

A fifth further embodiment as noted above involves conversion by a digital to analog converter on the front end, after which the analog signal is encrypted for storage or transmission. Subsequent decryption would then be followed by conversion back to a digital signal by an analog to digital converter.

Pulse Position Modulation

Pulse position modulation is the encoding of a signal so that the total time for any number to be represented is constant, but the location of a pulse within that time determines the value. For example, a signal that has four values can have a pulse in any of four positions. Variations on this modulation scheme are possible.

As stated, PLTNM can be applied to any one or more of the following: message signal 200, analog key 201, orthogonal masking signal 831, or other key or message signals. Application of PLTNM is particularly effective when the signal is encoded using pulse position modulation. PLTNM can then be used to shift the pulse position based on a modulating control signal and according to a modulating control waveform. PLTNM can be configured so that the shape of the pulse is minimally affected by appropriate selection of component values. For example, the PLTNM modulating signal can cause the message or any other signal pulse to be shifted (in time) to a location other than its original location. Application of the matching modulating signal at both the encryption block and decryption block ensures decoding of the encoded pulse.

Analog Encrypted File Storage

An application of the disclosed embodiment is encryption of either signals of originally analog or digital nature into an analog form for storage in an efficient and secure manner. Once encrypted, the encrypted and now analog signal is either sampled and converted to a digital format that retains its encryption, which is stored on any known available means for storage of digital signals, or if kept as an analog signal, is stored directly on media intended for analog signals.

An aspect of the disclosed embodiment is efficient encryption of digital signals for analog encrypted storage, as encrypted signals may be stored and later transmitted for decryption or decrypted for subsequent use at the original location of encryption. If the stored analog data is acquired by an unauthorized party, use of the actual data still requires analog decryption. As such, acquired datasets remain secure.

Phase-Linked Temporal Non-Linear Modulation

The use of PLTNM has been included in the description of the disclosed embodiment. PLTNM employs a class of circuits that generally exhibit Negative Group Delay (NGD) over specific frequency ranges to perform both linear and non-linear temporal modulation of an analog signal (e.g., frequency carrier, data signal, masking signal, analog key).

In NGD, there is a portion of the characteristic frequency response of a circuit or system where the slope of the phase is positive relative to a change in frequency. Under these conditions, band limited signals applied to the circuit exhibit a negative group delay. As such, the output wave envelope can lead the input. Causality is not violated, but rather early signal perturbations are amplified and detected at the output. Within the frequency range(s) in which the slope of the change in phase is positive, the group delay is negative, i.e., the output signal (Vo) is advanced in time relative to the input signal (Vi).

Figure 15A:
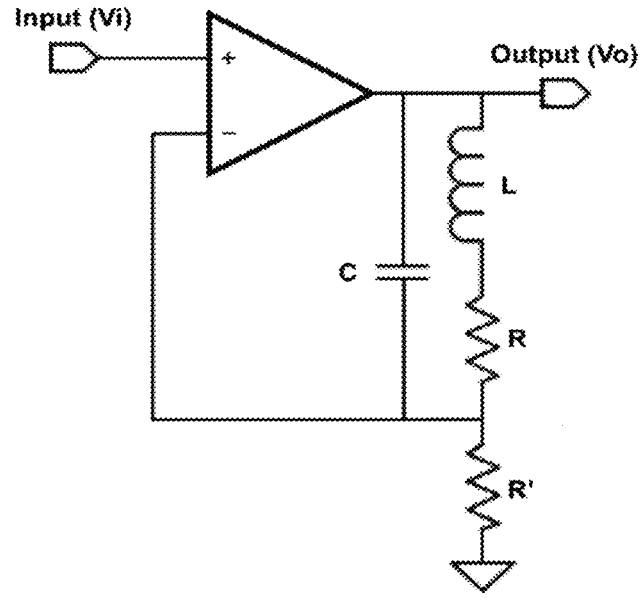
FIG. 15A illustrates a circuit diagram for a single resonant-circuit non-inverting NGD circuit.
Figure 15B:
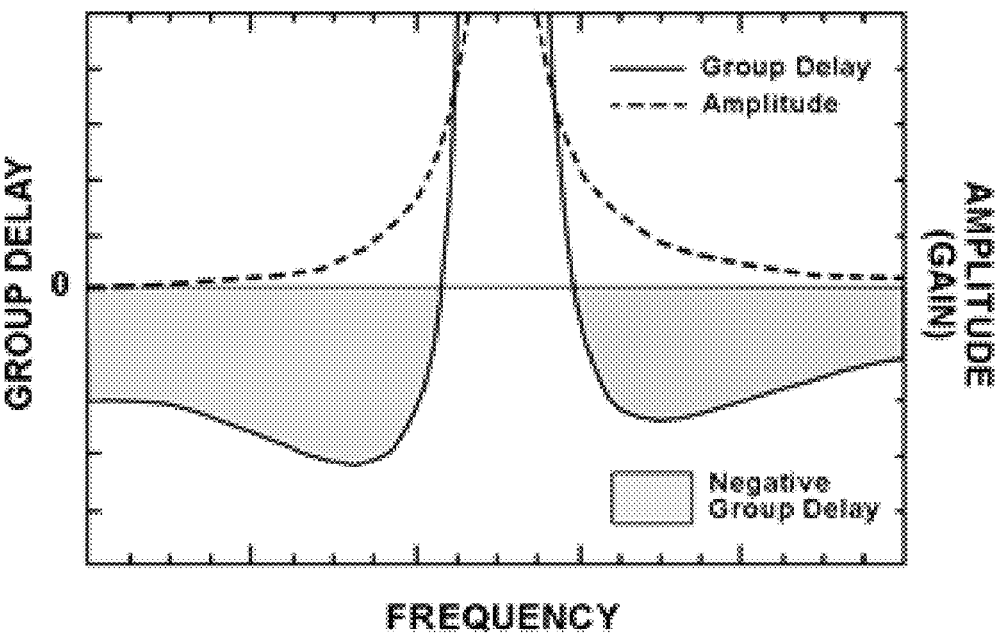
FIG. 15B illustrates the amplitude response and group delay vs. frequency plot for the single resonant-circuit non-inverting NGD circuit of FIG. 15A.

Referring now to FIG. 15A, there is illustrated a simple, single stage NGD circuit example and in FIG. 15B the associated amplitude and negative group delay response (vs. frequency) that illustrate the non-linear relationship between the phase and frequency. This illustration depicts the response of the single-stage PLTNM circuit configuration that demonstrates resonance at a single frequency and NGD both above and below the resonant frequency (or pole).

Figure 16A:
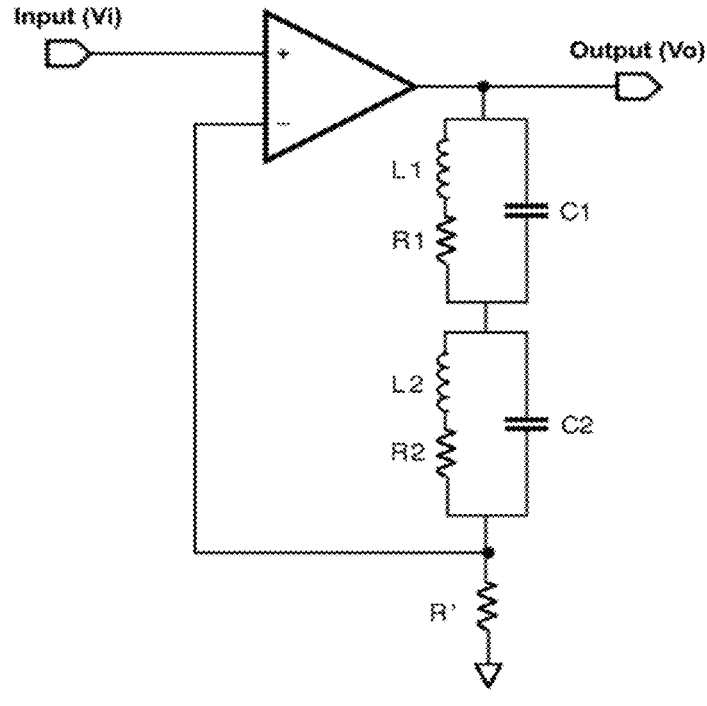
FIG. 16A illustrates a circuit diagram for a non-inverting amplifier configuration.

FIG. 16A depicts an NGD circuit implementation that produces two resonant frequencies (poles) in a single-stage NGD circuit. This circuit configuration yields multiple (three) frequency ranges or sub-bands in which the resulting negative group delay varies in each of the three different frequency bands.

Figure 16B:
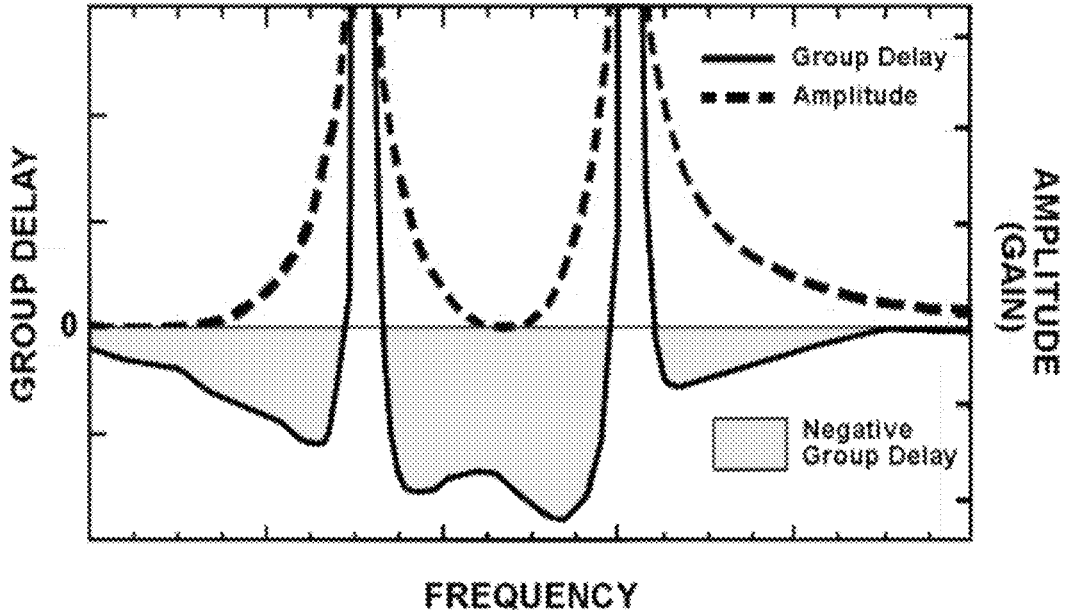
FIG. 16B illustrates the resulting amplitude response and group delay vs frequency plot for the non-inverting amplifier configuration of FIG. 16A.

In this configuration, the resonant frequencies (or poles) are separated and distinct within the frequency range shown in FIG. 16B. In addition, there are frequency ranges that demonstrate NGD before, between, and after the two poles. The NGD imparted by the circuit is different in each of the three frequency ranges—lower than the $1^{st}$ pole, between the poles and greater than the $2^{nd}$ pole. Further, the NGD within each region is non-linear and the gain is zero or positive, thereby enhancing the utility.

It is noted that, for circuit stability, the frequency content of the analog signal being modulated should not have content at or near the frequencies associated with the poles (or resonances).

Figure 17:
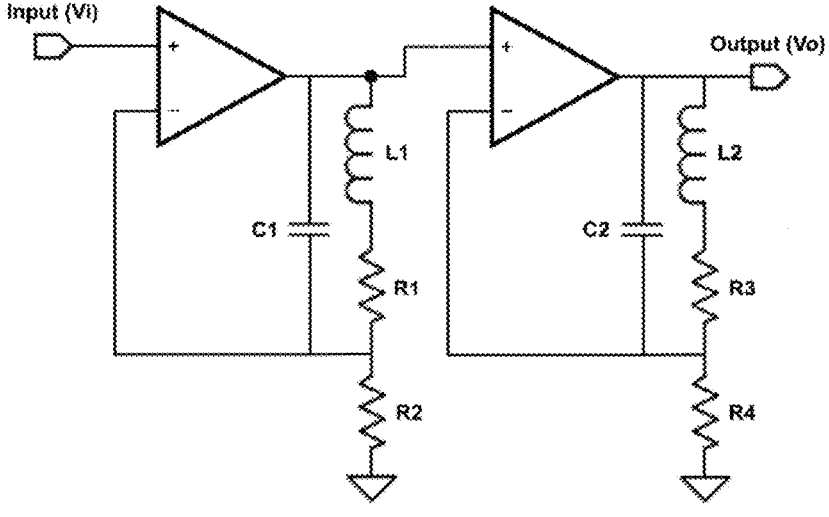
FIG. 17 illustrates a circuit diagram for two cascaded non-inverting resonant-circuit NGD filter circuit stages.

Referring now to FIG. 17, there is depicted a two-stage NGD circuit that also produces two resonant frequencies (poles). The form of the transfer function for NGD circuits under consideration is generally as shown below, and there are several frequency response characteristics that can result. These will be discussed below.

The transfer function for the circuit schematics illustrated in FIG. 17 is expressed as:

$$T(\omega) = \left[1 + \left(\frac{1}{R_2}\right)\left(\frac{1}{(R_1 - i\omega L_1)^{-1} - i\omega C_1}\right)\right] \times$$
$$\left[1 + \left(\frac{1}{R_4}\right)\left(\frac{1}{(R_3 - i\omega L_2)^{-1} - i\omega C_2}\right)\right]$$

Equation 1

The associated phase is given by:

$$\psi(\omega) = \arg[T(\omega)]$$

Equation 2

One skilled in the art can write the above equation as a transfer function for the two-stage NGD circuit using the Laplace Transform. This equation in the "s" domain is second order in both the numerator and the denominator.

The distinction between this implementation and the two-pole response depicted in FIG. 17 that is designed to produce the NGD phase response can be made linear over a specific frequency range—in this case, for frequencies that are lower than the first pole. As such, the imparted NGD is constant over the same frequency band is shown in FIGS. 18A, 18B, and 18C.

Figure 18A:
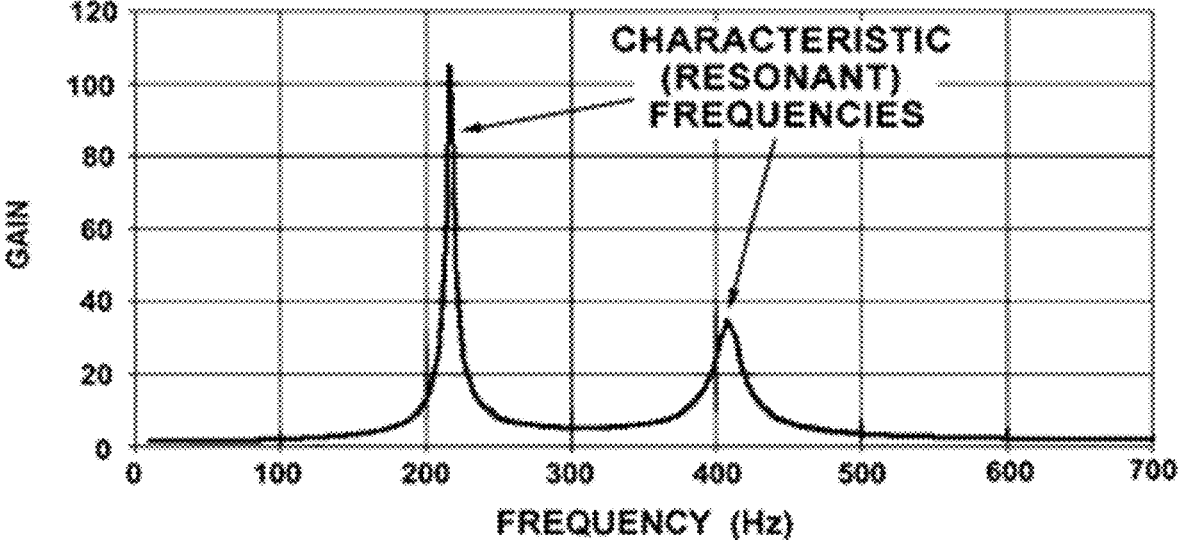
FIGS. 18A, 18B and 18C illustrate plots of gain, phase, and group delay vs frequency, respectively, for a two-stage NGD circuit illustrated in FIG. 17.
Figure 18B:
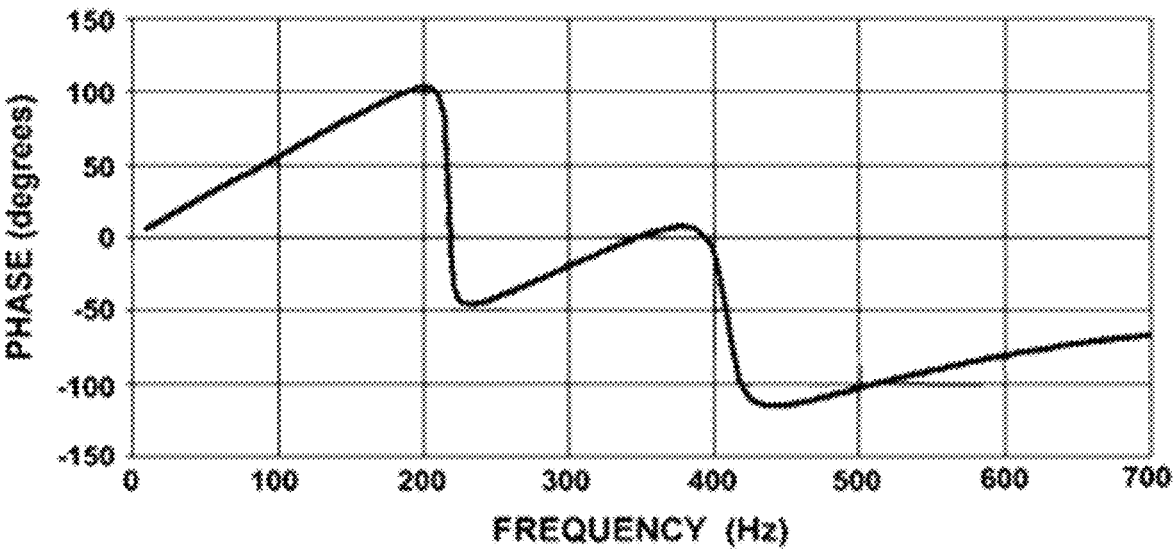
Figure 18C:
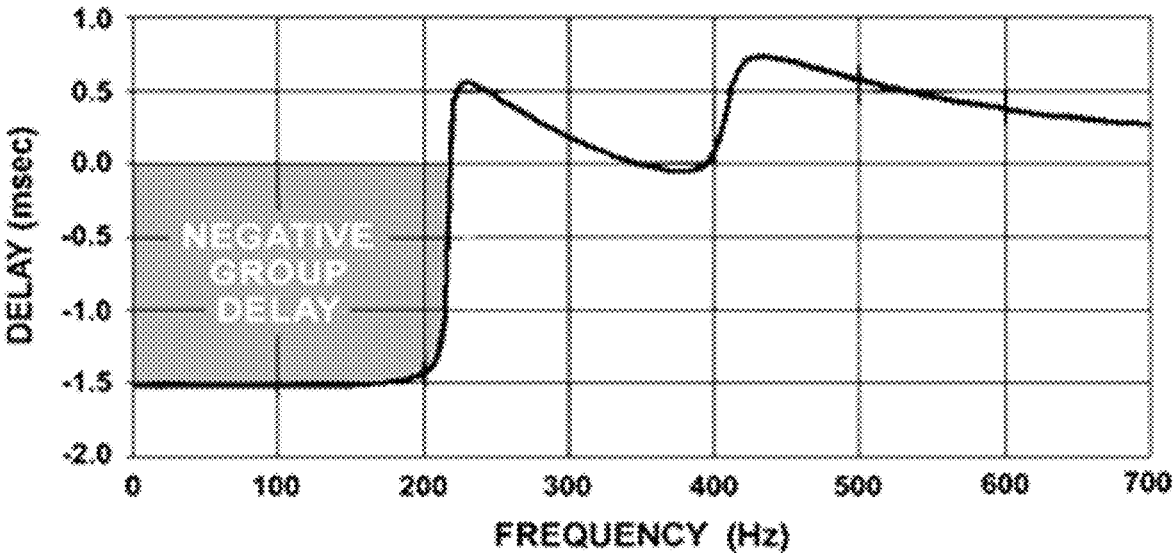

FIG. 18A illustrates the Gain or amplitude response, FIG. 18B illustrates the phase change over frequency, and FIG. 18C illustrates the Group Delay (change in phase per change in frequency) for this particular embodiment of a two-stage PLTNM circuit. This circuit configuration can be used to impart NGD that, within the lower frequency range (frequencies less than the frequency associated with first pole), the NGD is constant. The linear change in phase produces a constant negative group delay or positive group advance.

Two poles and two zeroes (Bode Plot) are characteristic of a two-stage NGD circuit, with some poles approaching the right half plane. For the discussion below, of primary interest is the poles (frequencies at which the circuit resonates) or the roots of the denominator.

Figure 19A:
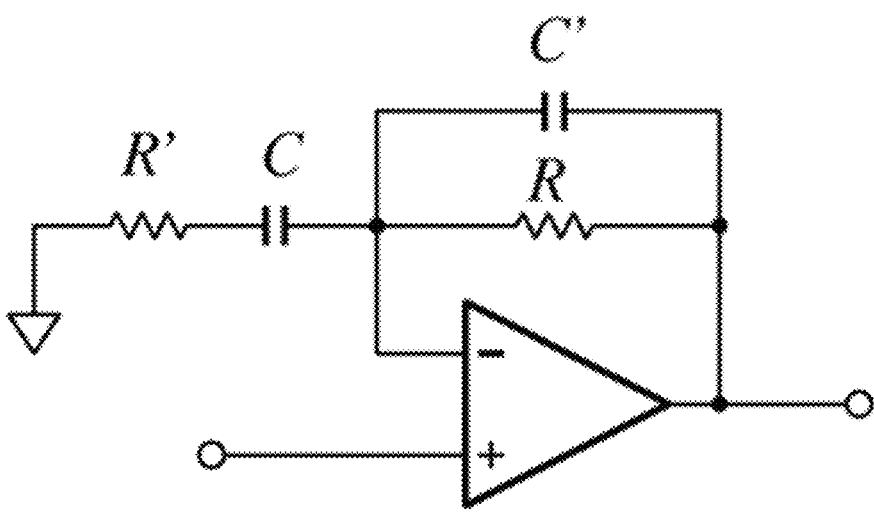
FIG. 19A illustrates an NGD circuit topology employing resistance and capacitance, but not inductance.
Figure 19B:
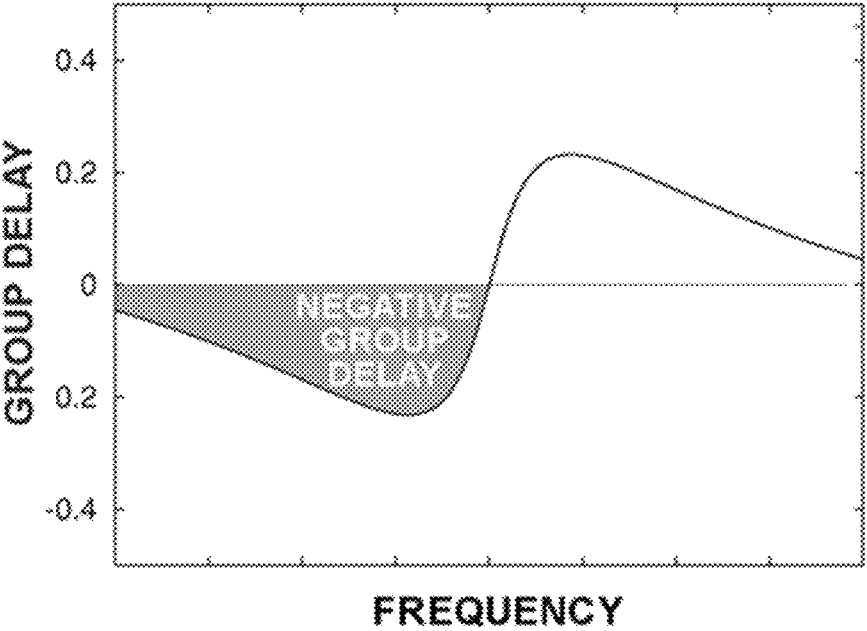
FIG. 19B illustrates a graph illustrating output signal group delay versus frequency in a range both above and below the circuit resonant frequency for the circuit of FIG. 19A.

FIG. 19B illustrates the negative group delay results for another NGD circuit topology employing resistance and capacitance shown in FIG. 19A, but not inductance in which NGD occurs in the frequency band adjacent to, but lower than, the frequency at which the circuit resonates. This example (FIG. 19A) is representative of a range of NGD circuit topologies that are possible but not illustrated.

The above descriptions of PLTNM illustrate the means to apply non-linear temporal modulation to analog signals, where the values of the various circuit components are varied according to a modulation scheme. Non-linear temporal modulation applied in conjunction with traditional forms of modulation (e.g., frequency, phase, angle, etc.) provide a novel means to encrypt any analog signal, whether the signal undergoing PLTNM represents data or the message, a carrier wave, an analog encryption key, and masking signal or any other analog waveform.

One example of the instant invention using PLTNM employs frequency shift keying (FSK) to represent a digital signal where either the digital "0" or "1" is represented by a frequency less than the frequency of the lower frequency pole and the other is represented by a frequency greater than the frequency represented by the higher frequency pole. By doing so, the relative positions, in time, of the "1's" can be varied relative to the positions of the "0's". In the alternative, one could utilize NGD frequency ranges that are less than or greater than the resonant frequency (or pole) to represent and temporally shift the "1's" relative to the "0's". Modulation FIG. 15A/B-19A/B illustrate NGD characteristics of various configurations of PLTNM circuits. Each of these can be implemented as a PLTNM circuit by manipulation of circuit components either directly or through an analog key acting on a carrier. Within the disclosed system, PLTNM can be utilized for the linear and/or non-linear temporal shift and/or modulation of the original message signal, analog key signals, orthogonal key (masking) signals, carrier orthogonality control signals and/or encrypted signals as well as additional signals.

The characteristics of the temporal modulation (frequency, phase, group delay) can be manipulated by:
1) varying one or more circuit component values, 2) the control, introduction, or removal of one or more cascaded PLTNM circuit stages, or
3) integrating controlled variation of both the circuit components comprising one or more of the cascaded PLTNM circuit stages in conjunction with controlled addition/elimination of various circuit stages comprising the cascade.

PLTNM Example

Figure 20:
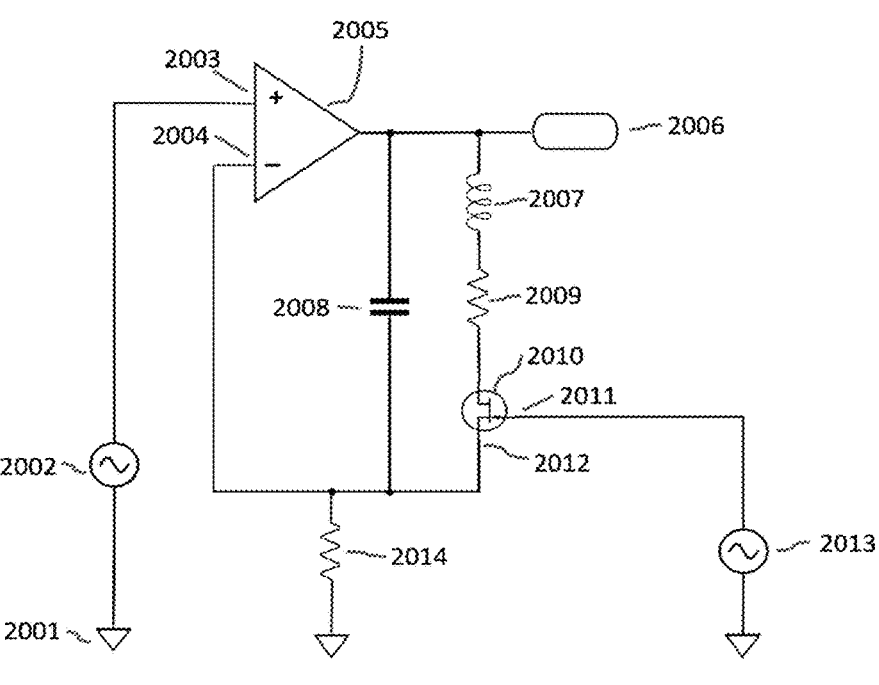
FIG. 20 illustrates a circuit diagram of a non-inverting op-amp filter used for encryption.
Figure 21:
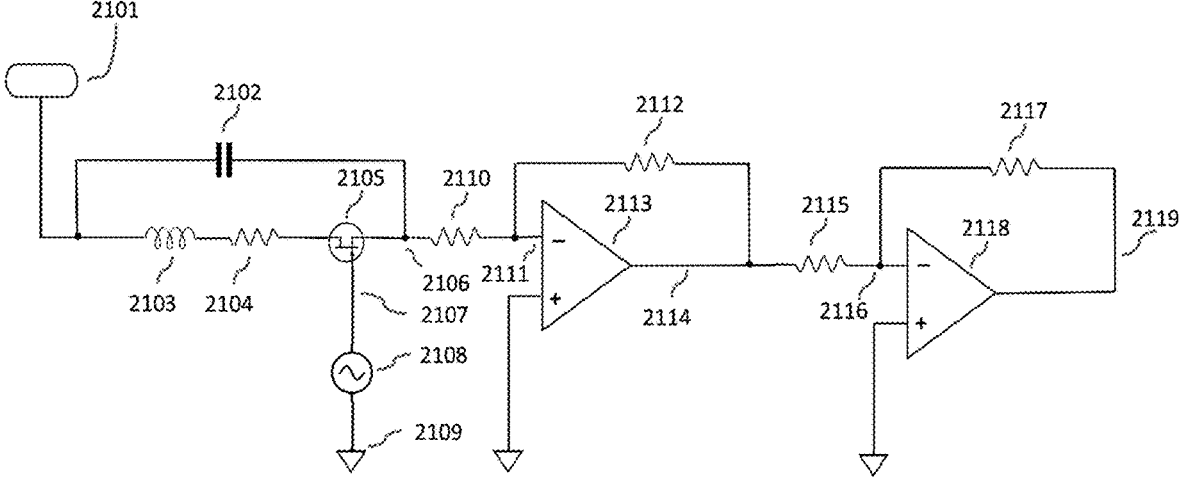
FIG. 21 illustrates the inverse circuit of FIG. 20 used for decryption.

FIGS. 20 and 21 depict simplified examples of a PLTNM (encryption) circuit and the inverse function (decryption) applied to a single message (data) signal and a single analog key signal. At the center of the PLTNM process are specific configurations of NGD circuits (see examples—FIGS. 15A, 16A and 17).

In FIG. 20 (encryption circuit), the message signal 2002 to be encrypted is applied relative to a circuit ground 2001 to the positive input 2003 of the operational amplifier (op-amp) 2005. The op-amp output signal 2006 is the encrypted message signal, connected also to a resonant circuit comprising inductor 2007, capacitor 2008, and a combined resistor 2009 and FET (Field Effect Transistor) 2010 operating as a variable resistor. The impedance of the FET 2010 is determined by the voltage between the FET gate voltage 2011 and FET source voltage 2012 driven by a component of voltage source 2013. The inductor 2007, capacitor 2008, resistor 2009, and FET 2010 form a resonant circuit in the feedback loop connected to the inverting input of the op-amp 2005. This resonant circuit is an important part of the NGD configuration. In addition, resistor 2014 is connected between the op-amp 2005 inverting input 2004 and circuit ground. Thus, the circuit is a non-inverting amplifier configuration. Signal source 2013 is a DC applied to the gate of the FET 2010, thus modifying the resonant frequency of the resonant circuit. As noted previously, this DC signal (or an associated circuit known to those practiced in the art) also provides bias for the FET 2010. This results in non-linear temporal modulation of the message signal 2002 and, thereby, generates the encrypted message 2006.

FIG. 21 depicts a simplified circuit that functions to invert or reverse the modulations performed by the circuit shown in FIG. 20 and, thus, "decrypt" the encrypted signal. (Decryption will be discussed in more detail hereinbelow with respect to FIG. 29 and following.) Input signal 2101 is the encrypted message signal (additional circuitry performing amplification and detection not shown) and may be required depending on the system in which the instant invention is implemented. This encrypted signal could, in theory, be the encrypted output signal 2006 from FIG. 20. However, in a number of practical applications, intervening amplifiers or other circuit elements may be present. The signal may also have been a stored digital signal that had been previously encrypted. Inductor 2103, capacitor 2102, and resistor 2104 produce a resonant circuit whose parameters are modified by FET 2105 operating as a variable resistor. The impedance of the variable resistance of 2105 (between resistor 2104 and node 2106) is determined by gate voltage 2107 driven by source 2108. In order to decrypt and thus recover the original message signal, the DC applied to the source 2108 must be identical to the DC used to encrypt the signal, indicated as 2013 in FIG. 20. These two DC sources may vary significantly with regard to signal complexity and may be derived from any type of source that produces a continuous analog signal.

For optimal decryption, impedance 2110 matches impedance 2014 of FIG. 20, and the various resonant circuit impedances of FIG. 21 match the resonant circuit imped-
ances of FIG. 20. The virtual ground node at 2111 allows
resistor 2112 to be chosen to match 2110 without affecting
the signal, and the final inverting amplifier 2118 with
resistors 2115 and 2117 invert the signal at 2114, resulting
in the decrypted signal at 2119 having the same polarity as
the original unencrypted signal. The final amplifier serves no
decryption function.

Figure 22:
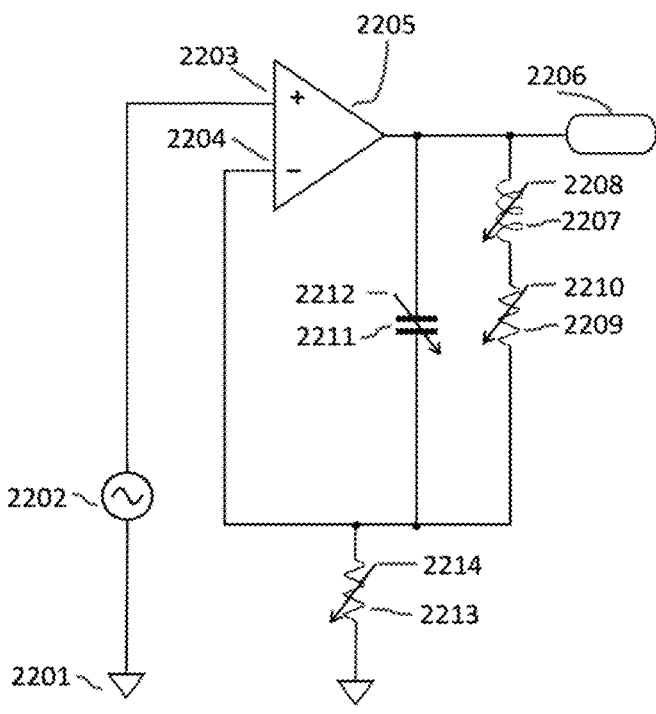
FIG. 22 illustrates a circuit diagram of a non-inverting op-amp filter used for encryption with single resonant circuit in the feedback loop where all elements of the resonant circuit and the gain resistor to ground are indicated as variable elements.
Figure 23:
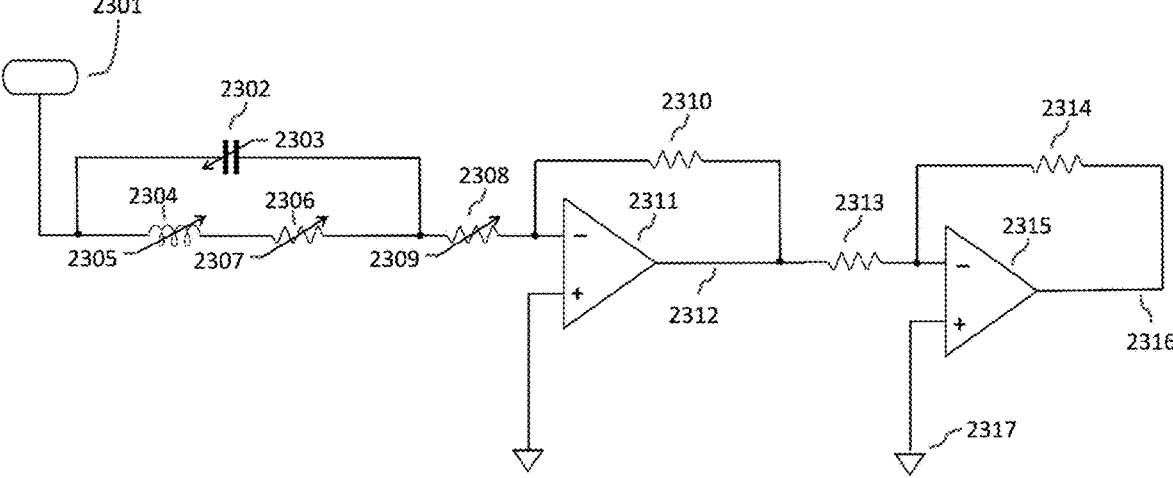
FIG. 23 shows the equivalent circuit topology of the circuit of FIG. 21 in which all elements of the resonant circuit and the gain resistor to ground are indicated as variable elements.

FIGS. 20 and 21 are an instant embodiment of an encryp-
tion/decryption method utilizing a PLTNM circuit configu-
ration. In the configuration of FIGS. 20 and 21, the resonant
feedback circuit resistance is varied by means of a series
FET, and this resistance alone is modified, thus modifying
the resonant frequency of the circuit. This change has a
particular effect on the characteristic or transfer equation for
the system, and on the system itself as a method of encryp-
tion and decryption. This configuration can also be gener-
alized as shown in FIGS. 22 and 23 where additional
components are also variable. Varying the resonant circuit
capacitor, inductor, series resistor, as well as the feedback
circuit resistance to ground, provides the ability of one
skilled in the art to adjust and variably control the transfer
function of the negative feedback circuit throughout the
encryption process and, thus, the encrypted signal charac-
teristics.

FIG. 22 illustrates a circuit for encryption of a signal
using PLTNM whereby one or more of the circuit compo-
nent values may be varied. As with FIG. 20, the input
message signal 2202 is applied to the non-inverting input
2203 of the amplifier 2205 where a resonant circuit in a
non-inverting feedback configuration is fed back from the
amplifier output (i.e., the encrypted output of the encryption
device 2206) to the amplifier negative input 2204 and circuit
ground through 2213.

Inductor 2207 is a variable component that can be varied
by a signal applied to input 2208. This signal may be an
analog key, a modulating carrier, or other suitable signal.

Resistor 2209 is a variable component that can be varied
by a signal applied to input 2210. This signal may also be an
analog key, a modulating carrier, or other suitable signal.

Variable capacitor 2211 is a variable component that can
be varied by a signal applied to input 2212. This signal may
also be an analog key, a modulating carrier, or other suitable
signal.

Resistor 2213 is a variable component that can be varied
by a signal applied to input 2214. This signal may also be an
analog key, a modulating carrier, or other suitable signal.

FIG. 23 depicts the schematic for the decryption circuit
that inverts or reverses the function of the circuit of FIG. 22.

When properly configured, variations in component val-
ues applied dynamically to a signal arriving at 2202 result in
an encrypted signal at 2206. Further, by synchronizing the
timing and control of variations in these components during
the continuous analog signal encryption and transmission
process and providing the control timing/synchronization
information for decryption, the non-linear temporal modu-
lation can be varied over time—significantly increasing
encrypted signal complexity/strength.

FIG. 23 is the circuit implementation that decrypts the
signal generated by the circuit embodied in FIG. 22. The
component manipulation performed during encryption must
be performed in exactly the same order and timing synchro-
nized with the encrypted message signal during decryption.

The encrypted message signal 2301 is applied to the
resonant circuit. Resistor 2308 is shown as variable with
control 2309 corresponding to the value and variation of the
variable component 2213 in FIG. 22. Components 2304

(inductor), 2302 (capacitor), and 2306 (resistor) form a
resonant circuit that correspond to the resonant circuit in
FIG. 22 comprised of inductor 2207, capacitor 2211, and
resistor 2209. In FIGS. 23 and 21, an inverting amplifier is
placed at the end of the decryption circuit so that the phase
of the decrypted message signal matches the original mes-
sage signal.

FIGS. 22 and 23 depict a more generalized version of the
encryption/decryption circuit/system than the particular
embodiment shown in FIGS. 21 and 22 in order to provide
clarity. Further generalization and expansion with respect to
encryption control is illustrated by the process diagram
provided in FIG. 24.

In this embodiment, the unencrypted message signal 2402
is applied to the NGD circuit to produce an encrypted
message signal 2406. Any one key or a plurality of analog
control signals may be used to control the parameters of the
encryption, in this example, showing four (4) keys desig-
nated as 2409, 2412, 2415, and 2418. Note that any one or
more Key/Control/Variable Component combinations can
be varied during encryption/decryption or can remain fixed
during the course of an encryption/decryption run.

Control signals may be identical or completely different
from one another, or some may match and some may be
different. These control signals can control any number of
controllable components, however, in this example, four (4)
designated 2408, 2411, 2414, and 2417. Each of the control
elements is one of the variable components of FIG. 22, but
where additional complexity can be added at the user's
discretion. Each control element may be a complex circuit
on its own, directed by the key signal and providing addi-
tional complexity to encryption of the message signal due to
variation of the resonant feedback circuit component values.

Figure 24:
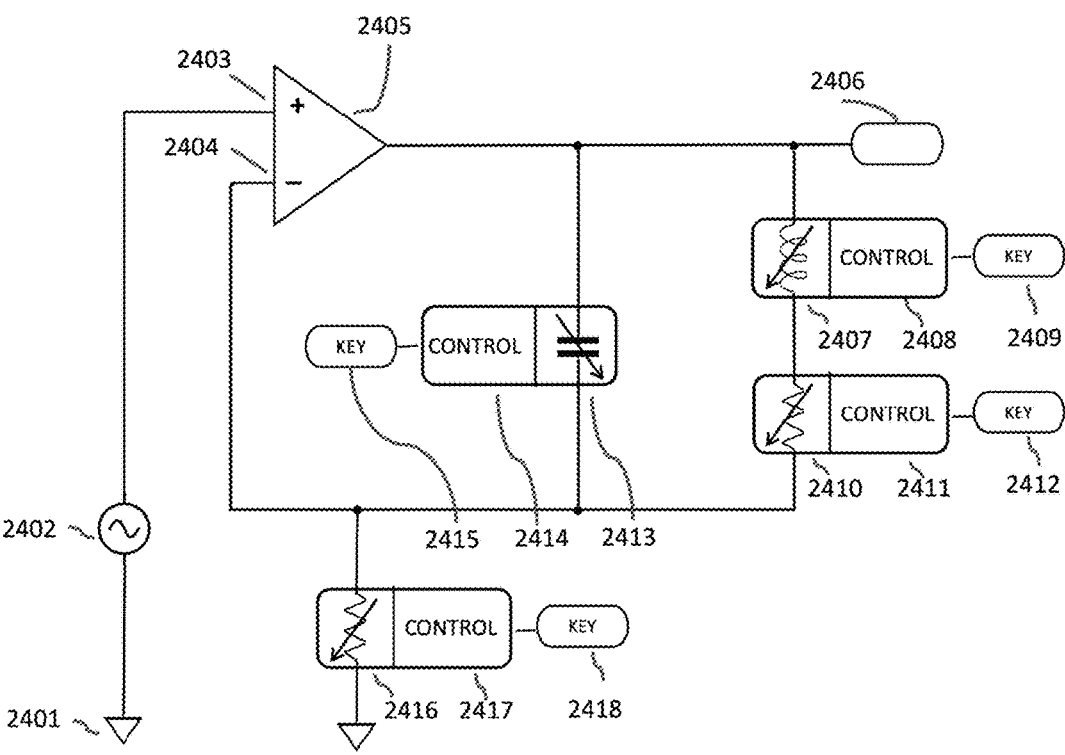
FIG. 24 illustrates the circuit diagram of FIG. 22 with generalized control elements for a plurality of controllable components.

FIG. 22 has a variable inductor. In the case of FIG. 24, the
combination of 2407 and 2408 might as a non-limiting
example be a gyrator circuit that simulates an inductor using
operational amplifiers, resistors, and capacitors, and allows
the value of the inductance of the circuit to be modified by
changing a resistance. In this case, a FET used as a variable
resistance in a gyrator circuit becomes the control element
simulating the variable simulated inductance in FIG. 22, and
the control signal can change the value of the inductance
across a range of values and with speeds that would not be
possible using a hand-modified coil or other variable induc-
tor.

Likewise, one control element represents the variable
resistor 2209 in the resonant circuit of FIG. 22. One possible
combination that creates a control element is the resistor/
FET combination of FIG. 20, designated 2009 and with FET
2010 driven by a control signal. In FIG. 20, the control
signal is the gate voltage amplitude 2013. In FIG. 22, this is
2210 the input line that controls the variation for 2209 and
where the control signal such as an analog control signal is
connected. FIG. 24 illustrates the analog control signal 2412
driving Control 2411. This combination produces a variable
resistance whose resistance can be varied over a wide range
and at whatever frequency is determined by the analog key
signal driving the control element.

Additional circuit elements may also be added by one
skilled in the art to add encryption complexity. Likewise, for
the variable capacitor and remaining variable resistive ele-
ment, those elements can be replaced by unit circuit ele-
ments driven by analog control signals to produce variation
in the encrypted message signal yielding robust encryption.

It is important to note that anywhere within the instant
invention that a control signal is noted where it applies to an
NGD circuit, multiple control signals can be applied to multiple circuits. Multiple control signals can also be applied within the same circuit, as shown in FIG. 24. For example, in FIGS. 25-28 in which a control signal (symbolized as a key symbol) is shown, a plurality of control signals (analog keys) may be applied to that individual circuit—applied to individual circuit controls (in this example, four shown).

Angle Modulation

Angle modulation is the process of varying the total phase angle of a carrier wave in accordance with the instantaneous value of the modulating signal, while keeping the amplitude of the carrier constant. Angle modulation can include phase modulation and/or frequency modulation.

For Phase Modulation (PM), the equation for the modulated carrier is:

$$s_{PM}(t) = A \cos[\omega_c t + \Theta_0 + k_{PM} m(t)] \qquad \text{Equation 3}$$

where:

$\underline{A}$ is the carrier amplitude $\underline{\omega_c}$ is the carrier angular frequency $\underline{\Theta_0}$ is an initial phase $\underline{k_{PM}}$ is the phase sensitivity constant $\underline{m(t)}$ is the analog key signal or modulating signal For Frequency Modulation (FM) the Equation for the Modulated Carrier is:

$$s_{FM}(t) = A \cos\left[\omega_c t + \Theta_0 + k_{FM} \int m(t)dt\right] \qquad \text{Equation 4}$$

where:

$\underline{A}$ is the carrier amplitude $\underline{\omega_c}$ is the carrier angular frequency $\underline{\Theta_0}$ is an initial phase $\underline{k_{FM}}$ is the phase sensitivity constant $\underline{\int m(t)dt}$ is the integral of the analog key signal or modulating signal Temporal modulation is related to other forms of modulation in that it shifts the signal in time, but not within the angle of a carrier.

Orthogonality

The principle of orthogonality is illustrated in several ways in the disclosed embodiment. Where two channels are employed, one channel may be frequency modulated while the other is phase modulated, and where the carriers for the two channels are orthogonal, the signals on the two channels may then be kept separate or combined, depending on how the key signals are controlled and utilized both at the encryption block and the decryption block. A particular embodiment of this method is where one signal is a masking signal, and where if a key does not match at the encryption block and at the decryption block, the masking signal overwhelms the decrypted message signal, hiding the message signal and thereby providing an added measure of security.

An additional use of orthogonality is where two signals are to be passed at the same time in one channel. In this case, use of separate carriers orthogonal to one another allows the signals to be transmitted together without interference.

Parallel Channels, NGD and PLTNM

The requirement to encrypt multiple channels in parallel is common, e.g., for digital television, but also for satellite communication and other high-density and high-sensitivity or high-security communication systems. For these systems, it may be important that not only individual channels are encrypted, but that individual channels are encrypted differently from one another so that decrypting one does not decrypt all.

The disclosed embodiment presents several methods of achieving this end. First, there are multiple modulation methods that can be applied to signals, both primary and intermediate, as well as both singly and in combination, to produce complex waveforms with strong encryption strength. Second, multiple modulation methods, including without limitation, PLTNM can be applied, as described below, in combinations of serial and parallel configurations with varied frequency settings, phase responses, and ranges of adjustment of the PLTNM modulation parameters to strongly encrypt signals, and where each different setting and configuration will have unique encryption parameters. Several embodiments discussed herein are illustrated in FIGS. 25-28 whereby parallel message signals of one or more AG and/or PLTNM circuits are applied in serial and parallel combinations. The parallel message signals are in one or more embodiments derived from multiple independent messages that are then collected together, or in other embodiments can be a single message signal that is subdivided (in the frequency or time domain) and these sub-segments are applied to multiple channels simultaneously.

Negative group delay (NGD) circuits (discussed elsewhere in this document) form the basis of the PLTNM modulation circuits. Parallel and/or parallel/serial combinations of ADM circuits (where the parallel/serial combinations may or may not include PLTNM) and direct PLTNM circuits employing various modulation methods, whether frequency, phase, temporal, or other methods, come at the cost of additional circuitry and circuitry real estate in order to enhance encryption security.

Parallel PLTNM Channels

Multiple channels of encryption/decryption (see FIG. 1) are often operated in parallel. PLTNM can be utilized on individual channels with variable adjustable advance or delay or spectral modification of the message or encrypted waveform. The schema of encryption of one channel relative to another, and encryption of any channel at any particular moment is known to the encryption control block. This same schema is used for decryption but must be kept hidden from unauthorized users. This is an additional method for enhanced security in communications.

Parallel/Serial PLTNM Channels

In addition to application of individual Analog Dynamic Modulation (ADM) or PLTNM circuits applied to individual channels operating in serial cascades, multiple PLTNM and/or ADM circuits in parallel with each parallel channel, including cascade circuit configurations, can be applied to a single "message" input signal to obtain modulation and spectral results not obtainable with a single or a serial cascade of PLTNM and/or ADM circuits.

Figure 25:
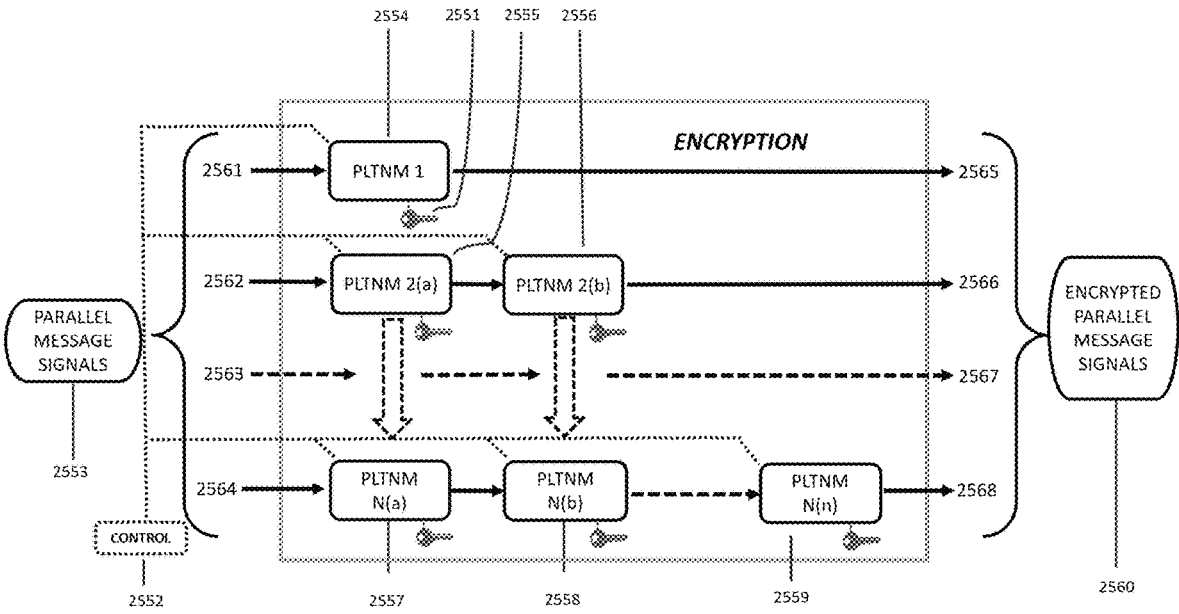
FIG. 25 illustrates application of multiple PLTNM circuit stages to parallel message signals.

As depicted in FIG. 25, the first message signal line 2561 is applied to circuit 2554. The second message signal line 2562 is applied in series with circuit 2555, and circuit 2556 is applied in series with circuit 2555. The message signal 2564 to which circuit 2557 is applied has a number of circuits additionally applied, including 2558 and 2559 respectively. If the component values of circuit 2554 are different from circuit 2555, then the action taken on their respective message will be different as well. These circuit characteristics can be independently modified and thus modulated—one channel may be modulated with parameters different from the next channel.

Figure 26:
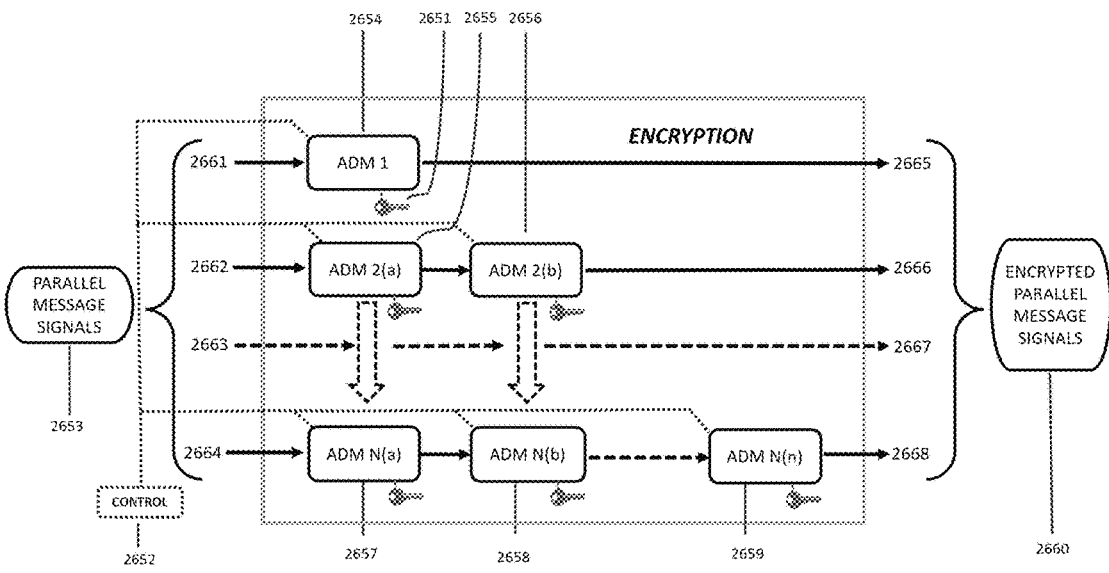
FIG. 26 illustrates application of ADM circuit stages to parallel message signals.

As depicted in FIG. 26, implementing only ADM circuit stages, the first message signal line 2661 is applied to circuit 2654. The second message signal line 2662 is applied to circuit 2655 and circuit 2656 is applied in series with circuit 2655. The message signal 2664 to which circuit 2657 is applied has a number of circuits additionally applied, including 2658 and 2659 respectively. If the keys applied to, or component values of circuit 2654 are different from circuit 2655, the action taken on their respective message will be different as well. These circuit characteristics can be independently modified and thus modulated-one channel may be modulated with parameters different from the next channel.

For PLTNM circuits, as shown in FIG. 25, individual circuits may be modulated utilizing parameters unique to the channel, making the encoding and thus encryption of that channel different from other channels. Individual circuits on individual channels are controlled by control lines indicated as 2552, 2652, and 2704 for FIGS. 25, 26, and 27 respectively. Controls may be applied across a number of channels in concert, or to entire channels, or to individual circuits within a channel without limitation. Using FIG. 25 as an example, the control for circuit 2554 may be the same or different from the control for circuit 2559 without limitation. The designation of 2552 on the control indicates a composite representing all control signals.

Again, using FIG. 25 as a non-limiting example, a control (key) signal is applied to each PLTNM circuit. The characteristics of the analog control (key) signal have been described elsewhere in this document and may include, according to FIG. 24, a plurality of individual signals applied to individual control elements for each PLTNM circuit (in this example four (4) shown). Such key 2551 is representative of a key signal or signal set on any circuit where, without limitation, the signals can be identical or different from one another. It is critical that the key used for encryption and decryption for any particular ADM or PLTNM circuit must be exactly the same key in both the encryption and decryption processes, and must be synchronized—starting at the same time that the message signal is presented to the circuit. For systems having multiple parallel message signals, having different keys may be important in that those separate and distinct keys are applied in decryption of each of the channels as separated and, in the order, presented.

Serial/Parallel PLTNM Circuits Applied to a Split Single Message Signal

Figure 27:
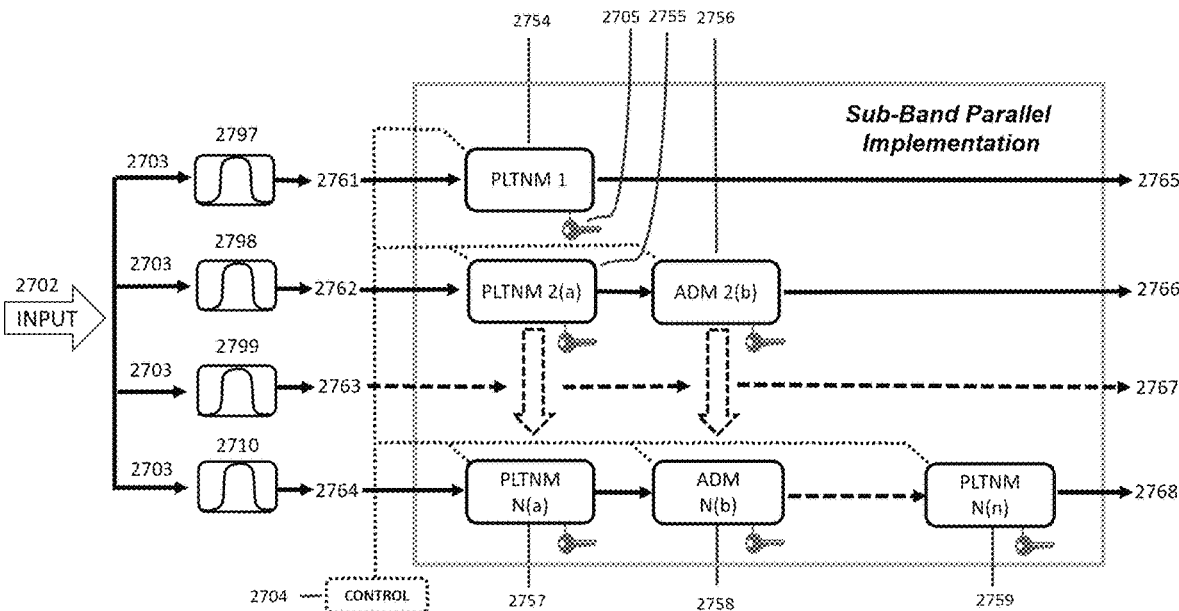
FIG. 27 illustrates application of both ADM and PLTNM circuit stages to a message signal split into multiple frequency bands. Multiple control signals (keys) that may or may not be the same as one another are applied to each of the ADM/PLTNM circuit stages, and multiple parallel/serial combinations of ADM/PLTNM circuits may be applied to channels before decryption.

Analogous to the discussion above, multiple ADM and/or PLTNM circuits in parallel and/or serial configurations can be applied to a single input to obtain modulation results and spectral results not obtainable with a single serial ADM circuit (FIG. 27). In this embodiment, filters 2797, 2798, 2799, 2710 act to split signal 2702 into frequency bands that may then be operated on independently as signals 2761, 2762, 2763, and 2764, respectively. The number of bands utilized may be more or fewer to accommodate the application requirements, and can be implemented by one skilled in the art. Filters 2797, 2798, 2799, and 2710 may be all-pass—simply passing the incoming signal 2702 to each of the parallel channels 2761, 2762, 2763, 2764, in one embodiment, or they may be overlapping in frequency, or they may not overlap and provide distinct frequency bands for each parallel channel and subsequent operations. The application of ADM and/or PLTNM circuit stages, 2754-2759 inclusive, is also indicated by the dashed lines to be non-limiting, in that additional message channels with additional ADM and/or PLTNM circuits with additional parallel/serial configurations may be applied without limitation to generate encrypted signals 2765, 2766, 2767, 2768. The technology here disclosed is not limited to four channels, but may be extended to any number of channels, in which case the number of filters and associated input channels would be extended appropriately.

An example of the application of this embodiment would be the application to the previously describing frequency domain dynamic sequencing (FIGS. 9 and 10), wherein the frequency sub-bands or segments are applied to each of the parallel channels in order to apply various encryption characteristics to each frequency segment.

The configurations of FIGS. 25, 26, and 27 allow for variations of circuit configuration between any of the individual circuits shown, for examples 2554, 2555, 2556, 2557, 2558, or 2559 or 2654, 2655, 2656, 2657, 2658, or 2659; or 2754, 2755, 2756, 2757, 2758, or 2759 without limitation. Serial and/or parallel combinations of PLTNM and/or ADM circuit stages are possible without limitation. ADM and PLTNM circuit stages enable modulation of the circuit transfer function by changes in value of an external signal (including a key signal such as an analog key). Each of the circuit stages in the diagram can be modulated by a different signal or modified version of a signal at the same time, allowing for complex and rich encryption. This same enabling of rich and complex encryption by modulation of ADM and/or PLTNM circuits individually and as groups, and variation of ADM component values to produce varying circuit functions is equally as applicable to FIG. 26.

Figure 28:
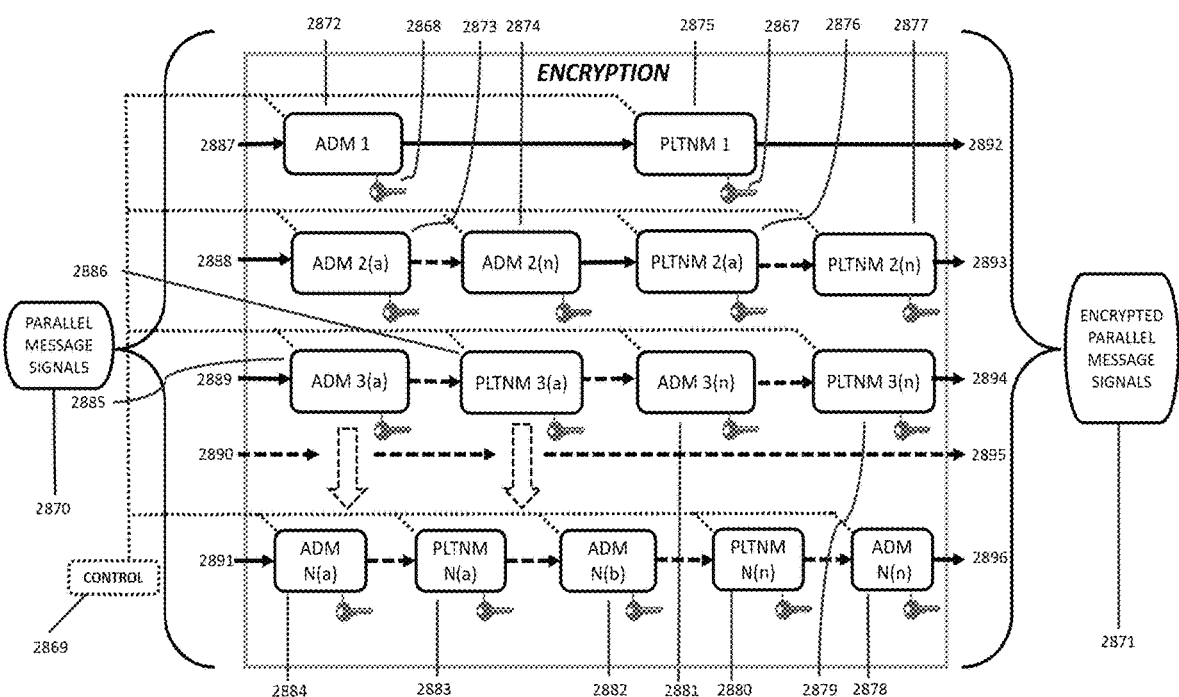
FIG. 28 illustrates parallel/serial application of mixed PLTNM and ADM circuit stages to parallel message signals.

FIG. 28 illustrates a complex combination of the various modulations integrating both ADM and PLTNM circuits in multiple configurations including encryption stages with constant or variable-parameters in the ADM and PLTNM circuit stages. The multiple parallel channels indicate that although channels may have identical filtering and PLTNM or ADM circuit parameters, they may also have different parameters in different orders and different numbers to create the desired outcome. In FIG. 28, all keys whether numbered or unnumbered may be driven by either the same key signal or by different key signals. All are independent key inputs.

PLTNM circuitry can be added to ADM circuitry to further enhance encryption strength and signal protection. Further embodiments may integrate ADM and PLTNM in various configurations or topologies in which the integrated ADM/PLTNM circuits would replace individual ADM or PLTNM circuit stages as depicted in FIGS. 25-28 as integrated individual circuit stages.

Application of Frequency and Temporal Sequencing

The embodiments illustrated in FIGS. 25-28 may also utilize signal advance or signal delay, or other modifications of signal characteristics, to implement an enhanced form of frequency or temporal dynamic sequencing, as described above. The application of ADM and/or PLTNM results in the controlled modulation of the individual time segments and/or frequency sub-bands. Parallel and/or serial combinations may be utilized to enhance encryption strength for secure transmission or storage of signals.

Decryption

Decryption (FIG. 1, 106) relies on carriers, and in particular the same Dynamic Carrier (DC) 2904 utilized for encryption of the signal, this being the carrier 202 modulated by the analog key signal 201. A basic decryption process, according to FIG. 29, shows use of the same analog key 2901 utilized to encrypt the signal. This must be exactly the same analog key signal used for encryption, and must be introduced into the decryption device at the same time as the encrypted message signal 2907 is introduced into the system, as described hereinabove. This is facilitated by a controller (not shown) that controls the timing of the overall operation. In a similar manner, the encrypt block also has a controller that control the timing of the encryption operation. These two controllers operate independent of each other. This encrypted message signal 2907 is the signal produced by the encryption device. The analog key signal 2901 modulates a carrier 2902 using a modulator 2903 where the carrier 2902 is identical to the carrier used in the encryption device. The carrier 2902 is of the same frequency as the carrier 202 used in the encryption, and the modulator 2903 is of the same type and characteristics as the modulator 203. The two carriers on either side of the encryption and decryption process do not have to be phase locked. Modulation of the carrier 2902 produces a modulated or dynamic carrier (DC) 2904. The DC 2904 is mixed with a mixer 2906 using multiplication or other suitable means identical to that utilized in the encryption device 101 in FIG. 1 to generate an output signal that is then filtered with a filter 2951 to produce the decrypted message signal.

The encrypted message signal 207 from FIG. 2 is passed to the decryption system of FIG. 29 as 2907. The DC is created contemporaneously with the transfer of the encrypted message signal into the decryption system as noted above by modulation of the carrier 2902 by the analog key signal 2901. With a transmitted encrypted signal that is centered about the DC in the frequency domain, thus resulting in the encrypted signal arriving at the decrypt block 2950 at substantially the same time as it was generated in time. As the message is being fed into the encrypt block 205, the encrypted signal is being fed into the decrypt block 2950. To ensure that the analog key signal 2901 is initiated at the same time as the initial portion of the encrypted signal, a header can be employed. There are many different header or synchronization methodologies that can be utilized. One exemplary one is to provide an operation wherein the DC at the encryption side is modulated with a simple FSK and the mixer 206 controlled to pass this carrier through. A specific code can be transmitted, such as "111101" wherein the message is indicated as following the "01." At the decryptor, a separated Phase Lock Loop (not shown) can be implemented to extract this code on the output of the signal input using the carrier 2902 and initiate the operation upon recognizing the sequence of "1's" followed by a "01."

Once initiated, the analog key signal is initiated to coincide with the beginning of the encrypted message signal to generate the DC 2904. This DC and the encrypted message signal are multiplied, in the same type of operation used in the encryption system, to remove the DC components that were added during encryption, and to shift the message signal components back to baseband. The multiplier is followed by the filter 2951 to remove unwanted high frequency components produced by the multiplication. The resulting decrypted message signal is identical to the original message signal.

Two factors are important for the operation of this encryption/decryption system. The first is that band-limited signals can be represented as sums of sinusoidal signals. The message signal, the carrier, and the analog key signal may all be represented as sums of sinusoidal signals. The second important factor is that multiplication of a pair of sinusoidal signals produces two sinusoids at the sum and difference of their frequencies. Multiplication of a low frequency signal by a high frequency signal produces a copy of the low frequency signal at the high frequency. Multiplication of that signal again by the same high frequency signal will shift the low frequency signal back to baseband where it started, though a high frequency noise component is left over to be filtered out. This works even if the signal being multiplied is itself a complex combination of sinusoids like a DC.

Protection of the Analog Key During Decryption

If key protection, including without limitation inverted key, processed key, multiple keys, or other methods described in the present technology, is utilized in the encryption process, then the corresponding key protection reversal process must be utilized for decryption.

Description of a Particular Embodiment with Data

Encryption/Decryption System Basic Model Results

Note that in the following discussion the pairs of terms "analog key" and "analog key signal," "encrypted signal" and "encrypted message signal," and "decrypted message" and "decrypted message signal" have identical meaning and may be used interchangeably.

Inputs, outputs, and intermediate signals from a basic system of FIG. 1 combining the basic encryption device of FIG. 2 utilizing an analog key signal, with a basic decryption device of FIG. 29 is illustrated in the figures that follow. A message signal 200 is presented along with an analog key 201 to the encryption device 205 that then produces an encrypted signal 207. That encrypted signal 207 in this case is not stored but passed as input 2907 to a decryption device 2950 along with the exact same ("matching") analog key 2901 used for encryption, and the resulting output signal 2952 is a decrypted and recovered message that is essentially equivalent to the original message.

These results represent one instant example demonstrating the utility of the methods and devices and is not a limiting example. Practitioners skilled in the art will recognize that frequencies and bandwidths can be scaled, thereby increasing or reducing the complexity of the various signals, as well as encryption strength based on the needs of the individual application within the bounds of the present technology.

Time Domain

Matched Keys

Figure 30:
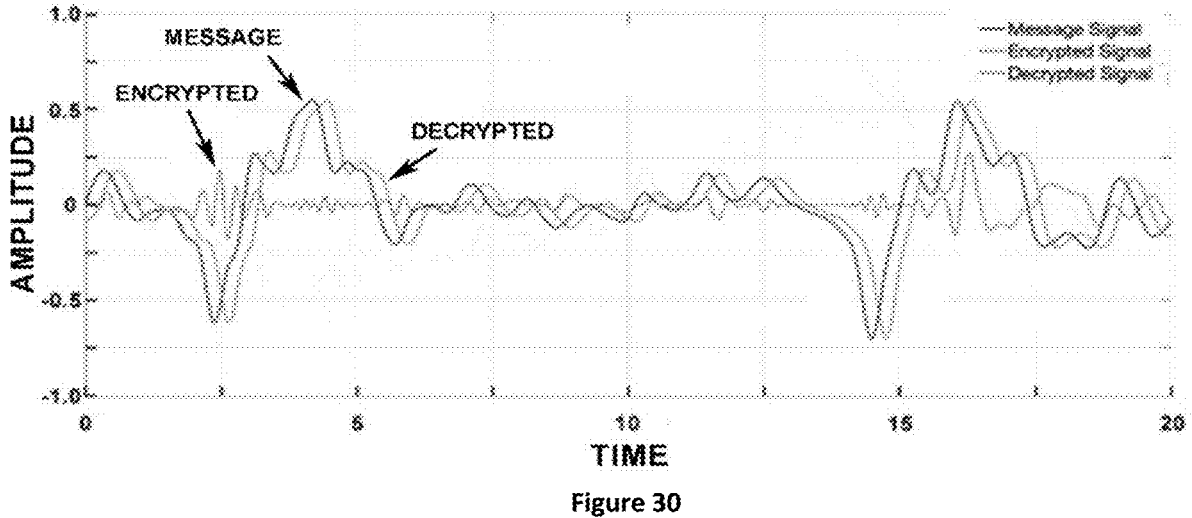
FIG. 30 illustrates waveforms obtained employing exclusively ADM circuitry in the encryption-decryption system where the encryption and decryption keys match.

FIG. 30 illustrates in the time domain (showing what signals look like over time rather than their frequency content) the result of reducing to practice FIG. 1 using a simple encryption device applying the general information of FIGS. 2 and 29, and where the analog key presented to both the encryption device and the decryption device match. It is noted that the decrypted signal is mirrored back to baseband from the modulated carrier. This is what can be extracted from the modulated carrier without the decryption circuit and the analog key.

The Pearson correlation coefficient ("Pearson "r" or "CC") provides an objective means to quantify how well two waveforms correlate to each other—basically how similar they are. The Pearson r ranges from −1 to +1 in which the "1" and "−1" indicate 100% positive and negative correlation, respectively, and a "0" value indicates that there is no correlation between the two waveforms. The correlation coefficient provides an objective indication of the similarity or difference between the original message signal, the encrypted signal, the decrypted signal and the analog key.

Additional results analyses (relative to frequency) include:

Power Spectrum—quantifies the power present in each frequency.

Spectral Coherence—identifies frequency-domain corre-
lation between signals. The results range from zero
("0") to one ("1"). Similar to correlation, coherence
values approaching "0" indicate that corresponding
frequency components are uncorrelated; values
approaching "1" indicate that the corresponding fre-
quency components are correlated.
Cross-Spectrum Phase—estimates the relative phase
between the correlated signal spectral components.

Note that the decrypted signal (slightly time-delayed
relative to the message signal, due to filter 2951 shown in
FIG. 29) is highly correlated with the message signal
(r=0.999). In this example (see FIG. 32), the analog key
signal (uncorrelated with the message (r=−0.020), decrypted
(−0.020) and encrypted (−0.023) signals are applied to the
encryption device (201 in FIGS. 2 and 2901 in FIG. 29). The
message signal (FIG. 30) is applied as signal 200 in FIG. 2,
and results in the encrypted signal (207 in FIGS. 2 and 2907
in FIG. 29).

The encrypted message signal 2907 (shown un-numbered
in FIG. 30) does not correlate with either the message signal
200 (r=−0.024), the analog key signal 201 or 2901 (r=−
0.023), or the decrypted message signal 2952 (r=−0.024).

Mismatched Keys

In a key-based encryption system, when the key used for
decryption matches (is identical to) the key used for encryp-
tion, the message signal is retrievable—can be decrypted to
recover the original message (the decrypted signal). If the
key applied for decryption does not match the key used for
encryption the original message cannot be decrypted or
recovered. This is analogous to inserting the wrong key at
someone's front door—the door remains locked.

Figure 31:
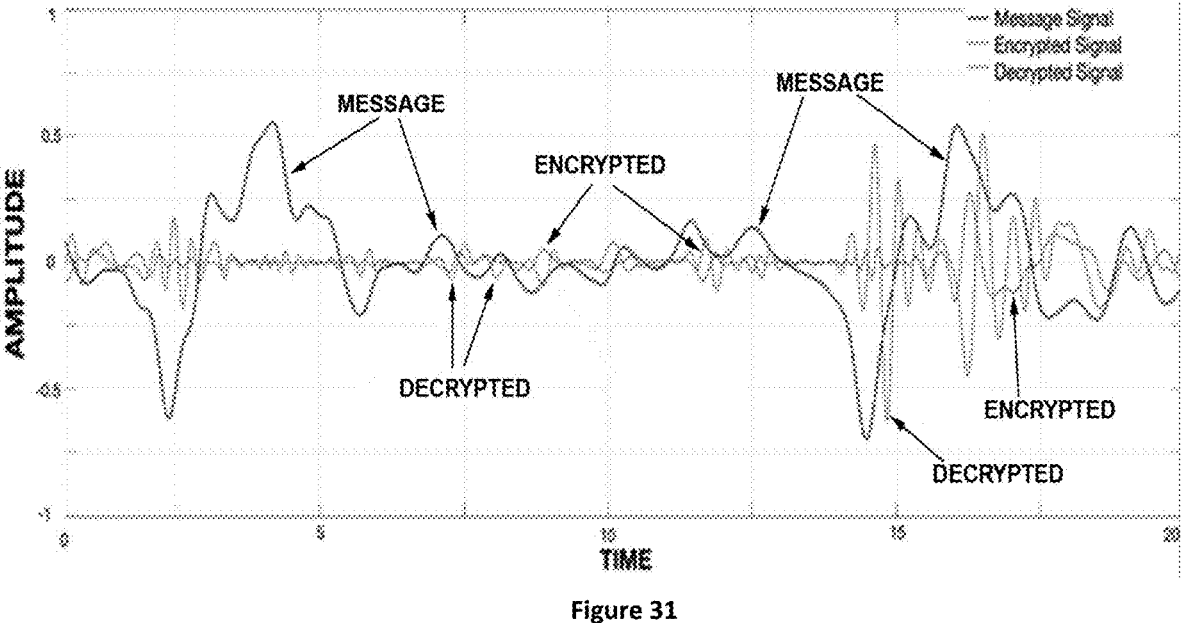
FIG. 31 illustrates waveforms obtained by the application of ADM circuitry in the encryption-decryption system where the encryption and decryption keys do not match (mismatched.

FIG. 31 illustrates signals produced from the same system
of FIG. 1 using the encryption device of FIG. 2 and
decryption device of FIG. 29, in which the key applied for
decryption is not identical ("mismatched") to the key
applied for encryption. FIG. 31 illustrates a message signal
200 encrypted by an analog key 201 to generate an
encrypted message signal 207. The message signal and
encrypted signal (encrypted message signal) are relatively
uncorrelated (r=−0.242).

When the encrypted message signal 207 is presented as
encrypted message signal 2907 to the decryption device
2950, and the analog key signal 2901 is not identical to
analog key 201 (mismatched), the decrypted message signal
2952 (decrypted signal (decrypted) in FIG. 31), as a non-
limiting example, is generated that has essentially no cor-
relation with the original message signal 200 (r=0.026) (i.e.,
it bears no resemblance to the original message signal 200
waveform). The original message signal 200 cannot be
detected or recovered (decrypted) from the encrypted signal
using the wrong or mismatched key, 2952 (i.e., not identical
to the key applied for encryption) and is thus protected from
unauthorized access.

Figure 32:
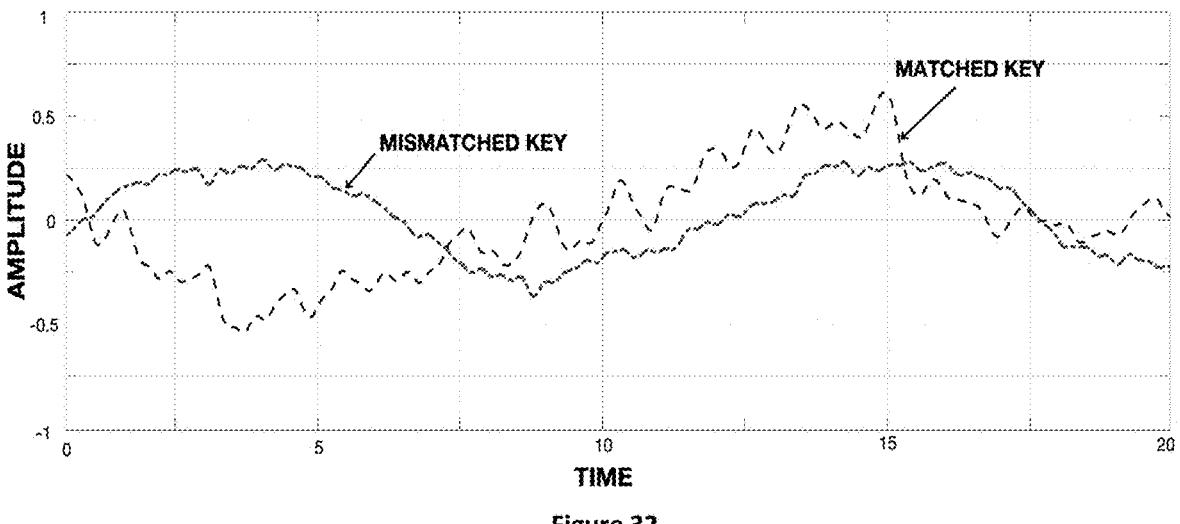
FIG. 32 illustrates waveforms (over a representative segment of time) depicting the matched key used for both encryption and decryption, and for the mismatched key the "mismatched key" used for decryption only.

FIG. 32 compares representative time segments of both
the matched key and mismatched key. The matched key is
utilized to generate the data for FIG. 30 for both analog key
signal 201 in FIG. 2, and analog key signal 2901 in FIG. 29.
The mismatched key is only utilized for decryption in the
mismatched case, illustrated in FIG. 31.

The analog key signal applied for both encryption and
decryption to obtain the results depicted in FIG. 30 are
identical, illustrated as the waveform labeled "MATCHED".
The analog key signal applied for encryption and decryption
to obtain the results illustrated in FIG. 31 are the two
different waveforms labeled "MATCHED" and "MIS-
MATCHED", respectively. Although only a representative time segment is depicted in FIG. 32, the two signals (labeled
"MATCHED" and "MISMATCHED") applied as analog
keys are uncorrelated (r=−0.050) over their entire time
course.

Frequency Domain

The time domain results illustrate the relationship
between signals in the encryption/decryption system as they
vary over time. The frequency domain analyses provide
another means to examine the relationships between the
various encryption and decryption device signals. The
power spectrum quantifies the relative power contribution
from individual frequencies that comprise the time domain
waveform.

Matched Keys

Figure 33:
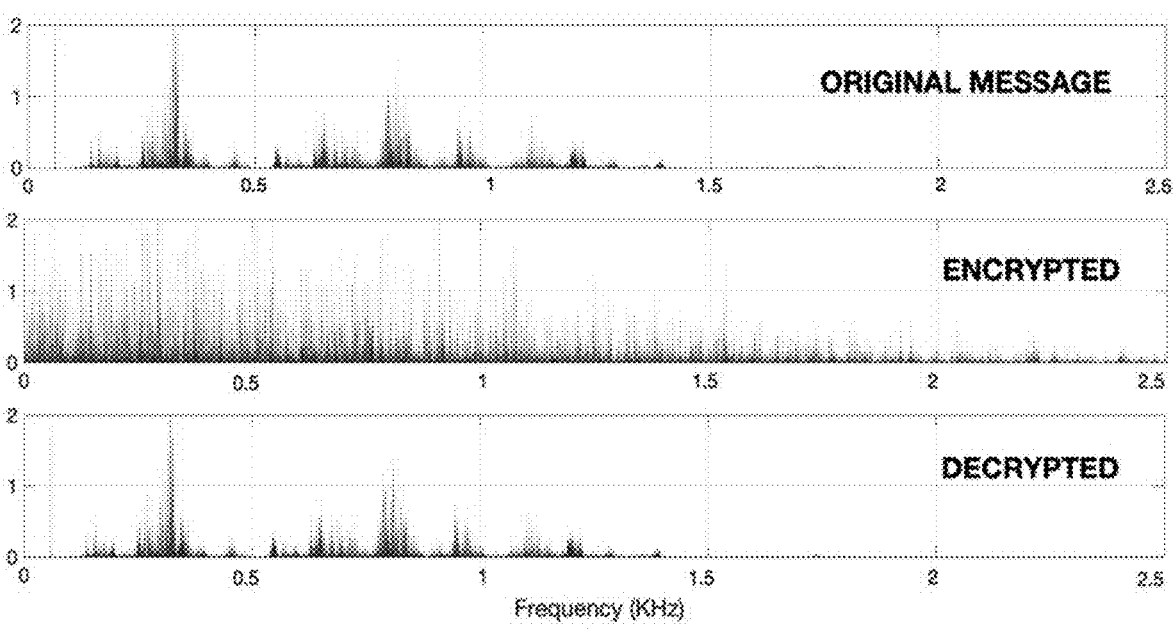
FIG. 33 illustrates an example of power spectra obtained using a simple encryption and decryption circuit with matched keys and depicts the spectra for the original message, matching decrypted message, and encrypted message.

FIG. 33 illustrates the power spectrum of the original
message signal 200, the decrypted message signal (de-
crypted) 2952, and the encrypted message signal (en-
crypted), both 207 and 2907. When the encryption analog
key 201 matches the analog key 2901 used for decryption,
the power spectrum of the decrypted message 2952 matches
the power spectrum of the original message signal 200. The
resulting power spectrum of the message signal 200 to
which the dynamic carrier is applied in order to generate the
encrypted message signal 207 is more evenly spread across
the available bandwidth. Where the message signal 200 had
significant energy in a few frequency bands, that energy has
been spread across a wider spectrum. There is also addi-
tional frequency content from the key-modulated carrier(s).
The amount of spectrum used is a tunable parameter and, as
such, provides an analog key "sensitivity" adjustment that
impacts the frequency and phase modulation in the genera-
tion of the dynamic carrier and, thus, the encrypted signal.
This adjustment facilitates increasing the encrypted signal
complexity (and thus strength) by increasing the dynamic
carrier bandwidth to accommodate specific user/application
related requirements.

Mismatched Keys

Figure 34:
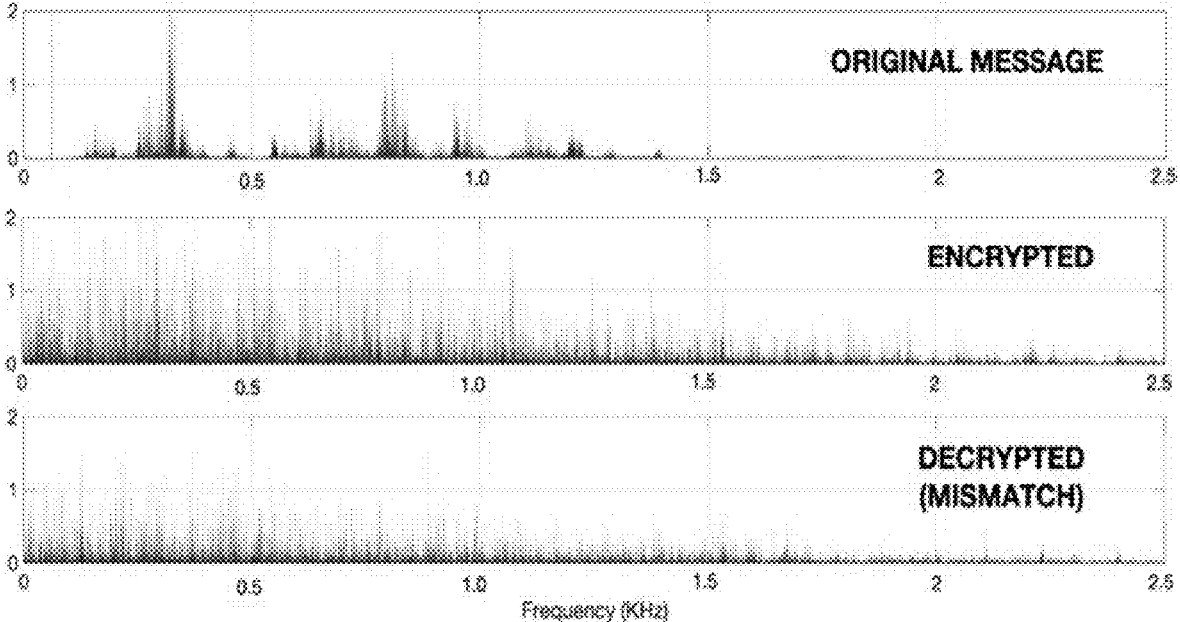
FIG. 34 illustrates an example of power spectra obtained using a simple encryption and decryption circuit with mismatched keys (where encryption and decryption keys are different from one another) for the original message, decrypted message with spectrum that does not match the original message, and encrypted message.

The effect of mismatched analog keys in the frequency
domain is depicted in FIG. 34. As a non-limiting illustration,
when the analog key signal presented at 201 for encryption
is not identical to the analog key signal presented at 2901
used in decryption, the power spectrum of the incorrectly
decrypted signal will vary significantly from the original
message signal. In FIG. 34, the original message signal 200
is shown in the 'original message' graph in the top row and
the incorrectly decrypted message signal 2952 (decrypted) is
shown in the middle row. Note that the power spectrum of
each of the two signals is quite distinct. The original
message signal is comprised of specific regions of concen-
trated power at specific frequencies along with other fre-
quency regions with much less power. The decrypted mes-
sage signal has energy spread across a broader spectrum and
no longer exhibits the distinctive power spectrum contour of
the original message. Although visually the contour of the
decrypted message signal 2952 appears to be similar to that
of the encrypted message signal at 207 or 2907, mathemati-
cal analysis indicates that the two signals are uncorrelated
(r=−0.041).

The graphs of FIG. 34 were generated using the exact
same system and parameters as FIG. 33 except where the
decryption analog key signal does not match the analog key
signal used for encryption. FIG. 34 illustrates the scenario in
which an encrypted signal may be intercepted in transmis-
sion or through unauthorized access to a data storage system.
Without the correct analog key, as well as any required synchronization control signals, the analog encrypted signal cannot be decrypted and the original message signal cannot be recovered.

Figure 35:
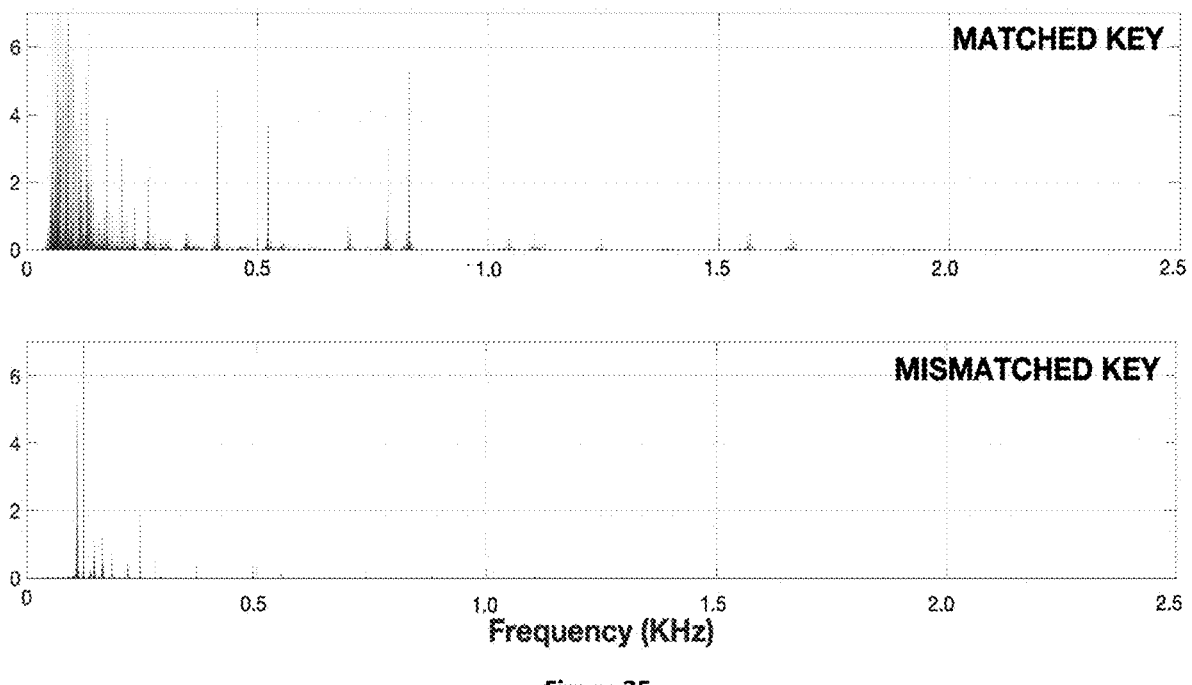
FIG. 35 illustrates the power spectra of the two analog keys used to generate the preceding figures for a matched key and a mismatched key, respectively, where the matched key used for both and, where mismatched keys are used, the matched key is used for the encryption side and the mismatched key is used for decryption.

Power spectra of the two keys used to generate the signals illustrated in FIGS. 33 and 34 are provided in FIG. 35 for reference. The 'Matched Key' signal is used for both analog key signal 201 in FIG. 2 and analog key signal 2901 to generate the matched key graphs of FIG. 33. To generate the mismatched power spectrum graphs of FIG. 34 the top matched key was used for analog key signal 201 in FIG. 2, and the lower mismatched key was used for analog key signal 2901 in FIG. 29.

Description of a Second Particular Embodiment with Data

Encryption/Decryption System Basic Model Results

Note that in the following discussion the pairs of terms "analog key" and "analog key signal," "encrypted signal" and "encrypted message signal," and "decrypted message" and "decrypted message signal" have identical meaning and may be used interchangeably.

Inputs, outputs, and intermediate signals from a basic system of FIG. 1 combining the basic encryption device of FIG. 2 utilizing an analog key signal, with a basic decryption device of FIG. 29 is illustrated in the figures that follow. A message signal 200 is presented along with an analog key 201 to the encryption device 205 that then produces an encrypted signal 207. That encrypted signal 207 in this case is not stored but passed as input 2907 in FIG. 29 to the decryption device 2950 along with the exact same analog key 2901 used for encryption, and the resulting output signal 2952 is a decrypted and recovered message that is essentially equivalent to the original message.

These results represent one instant example demonstrating the utility of the methods and devices and is not a limiting example. Practitioners skilled in the art will recognize that frequencies and bandwidths can be scaled, thereby increasing or reducing signal complexity and encryption strength based on the needs of the individual application within the bounds of the present technology.

The particular embodiment utilized to generate the data for FIGS. 36-41 includes the basic encryption device of FIG. 2, but where the multiplicative mixer 206 has been replaced by a variation of the PLTNM circuit. The non-linearities produced by the PLTNM circuit are "undone" or "reversed" in the basic decryption device where an inverted version of the PLTNM circuit is also included as the mixer 2906 in FIG. 29.

Time Domain

Matched Keys

Figure 36:
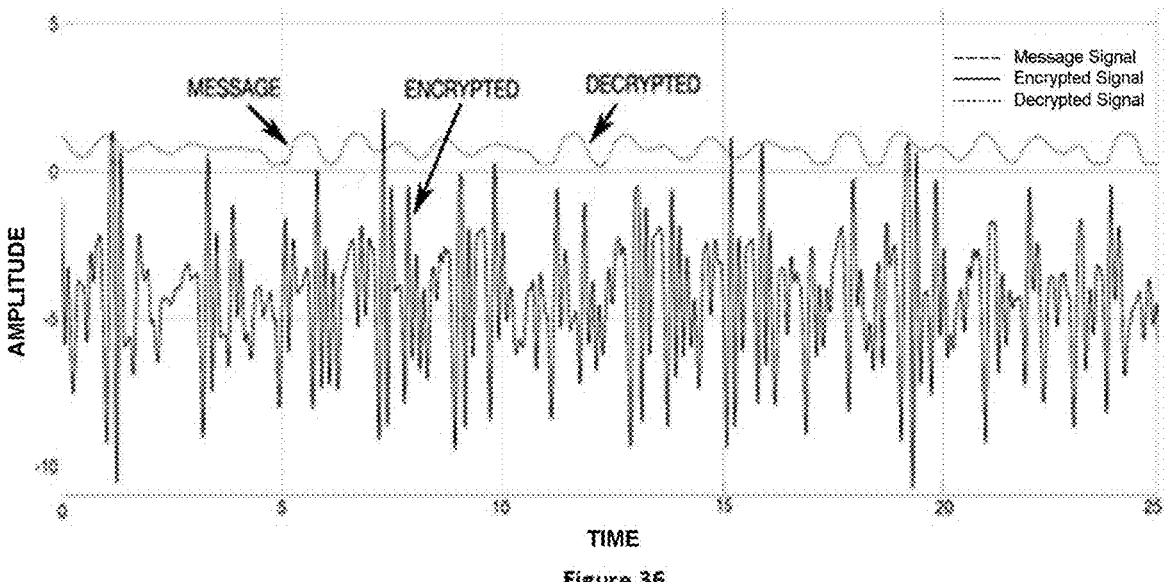
FIG. 36 illustrates waveforms obtained using the encryption-decryption system with PLTNM mixer where the encryption and decryption keys match, the original message, decrypted message, encrypted message, and analog key over a representative segment of time.

FIG. 36 illustrates in the time domain (showing what signals look like over time rather than their frequency content) the result of reducing to practice FIG. 1 using a simple encryption device utilizing the general information of FIGS. 2 and 29, wherein the mixer has been replaced with PLTNM circuit, and the analog key presented to both the encryption device and the decryption device match.

The Pearson "r" provides an objective means to quantify how well two waveforms correlate to each other—basically how similar they are. The Pearson r ranges from −1 to +1 in which the "1" and "−1" indicate 100% positive and negative correlation, respectively, and a "0" value indicates that there is no correlation between the two waveforms.

Note that the decrypted signal is highly correlated with and essentially overlaps the message signal (r=0.999), resulting in the original and decrypted messages that appear overlapped as the simulation yielded negligible delay. In this case, the analog key signal shown above (uncorrelated with the message (r=−0.055), decrypted (−0.055) and encrypted (0.024) signals) is applied to the encryption device (201 in FIGS. 2 and 2901 in FIG. 29). The message signal above is applied as signal 200 in FIG. 2, and results in the encrypted signal (207 in FIGS. 2 and 2907 in FIG. 29).

The encrypted message signal 2907 (shown un-numbered in FIG. 36) does not correlate with either the message signal 200 (r=−0.031), the analog key signal 201 or 2901 (r=0.024), or the decrypted message signal 2952 (r=−0.031).

Mismatched Keys

In a key-based encryption system, when the key used for decryption matches (is identical to) the key used for encryption, the message signal is retrievable—can be decrypted to recover the original message (the decrypted signal). If the key applied for decryption does not match the key used for encryption, then the original message cannot be decrypted or recovered.

Figure 37:
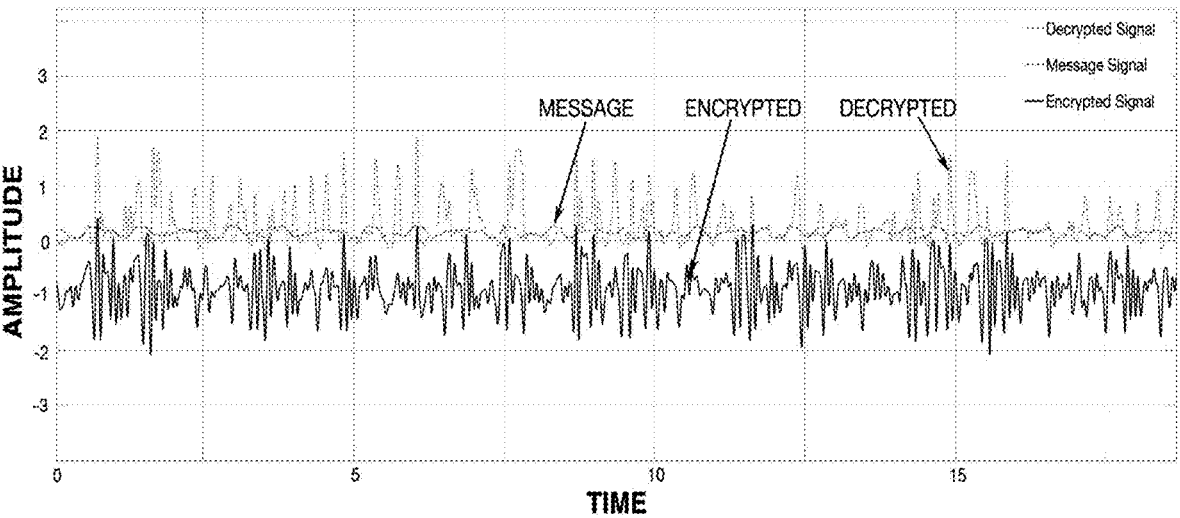
FIG. 37 illustrates waveforms obtained using the encryption-decryption system with PLTNM mixer where the encryption and decryption keys do not match, the original message, decrypted message, and encrypted message over a representative segment of time.

FIG. 37 illustrates the same system of FIG. 1 using the encryption device of FIG. 2 and decryption device of FIG. 29, in which the multiplicative mixer has been replaced by a PLTNM circuit. In this example, the key applied for decryption is not identical (mismatched) to the key applied for encryption. FIG. 37 illustrates a message signal 200 encrypted by an analog key 201 to generate an encrypted message signal 207. The message signal and encrypted signal (encrypted message signal) are relatively uncorrelated (r=−0.032).

When the encrypted message signal 207 is presented as encrypted message signal 2907 to the decryption device 2950, and the analog key signal 2901 is not identical to analog key 201, the decrypted message signal 2952 (decrypted signal, decrypted) generated (see FIG. 37), as a non-limiting example, has negligible correlation with the original message signal 200 (r=0.067) (i.e., it bears no resemblance to the original message signal 200 waveform). The original message signal 200 cannot be detected or recovered (decrypted) from the encrypted signal using the wrong key 2952 (not identical to the key applied for encryption), and is thus protected from unauthorized access.

Figure 38:
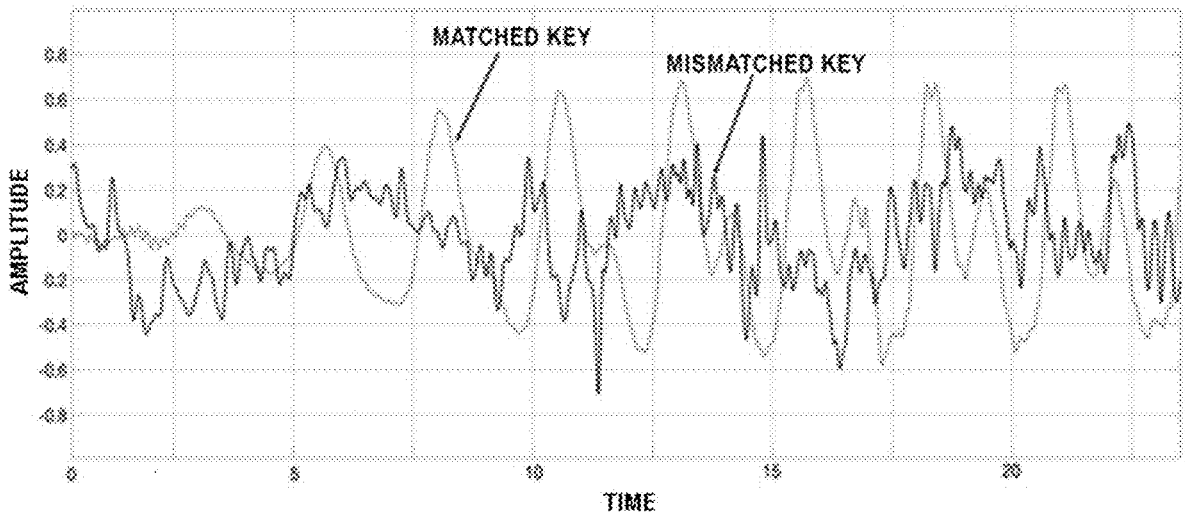
FIG. 38 illustrates the matched key used for both encryption and decryption, and the mismatched key used for decryption only for a system with PLTNM mixer.

FIG. 38 compares representative time segments of both the matched key that produced the results illustrated in FIG. 36 for both analog key signal 201 in FIG. 2 and analog key signal 2901 in FIG. 29. The "unmatched key" or mismatched signal shown in FIG. 38 is used as the analog key signal 2901 in FIG. 29 when generating data for FIG. 37. The analog key signal applied for both encryption and decryption to obtain the results depicted in FIG. 36 are identical, illustrated as the waveform labeled "MATCHED".

The analog key signal applied for encryption and decryption to obtain the results illustrated in FIG. 37 are the waveforms labeled "MATCHED" and "MISMATCHED", respectively. Although only a representative time segment is depicted in FIG. 38, the two signals (labeled "MATCHED" and "MISMATCHED") applied as analog keys are uncorrelated (r=0.029) over their entire time course.

Frequency Domain

The time domain results illustrate the relationship between signals in the encryption/decryption system as they vary over time. The frequency domain analyses provide another means to examine the relationships between the various encryption and decryption device signals. The power spectrum quantifies the relative power contribution from individual frequencies that comprise the time domain waveform.

Matched Keys

Figures 39, 40:
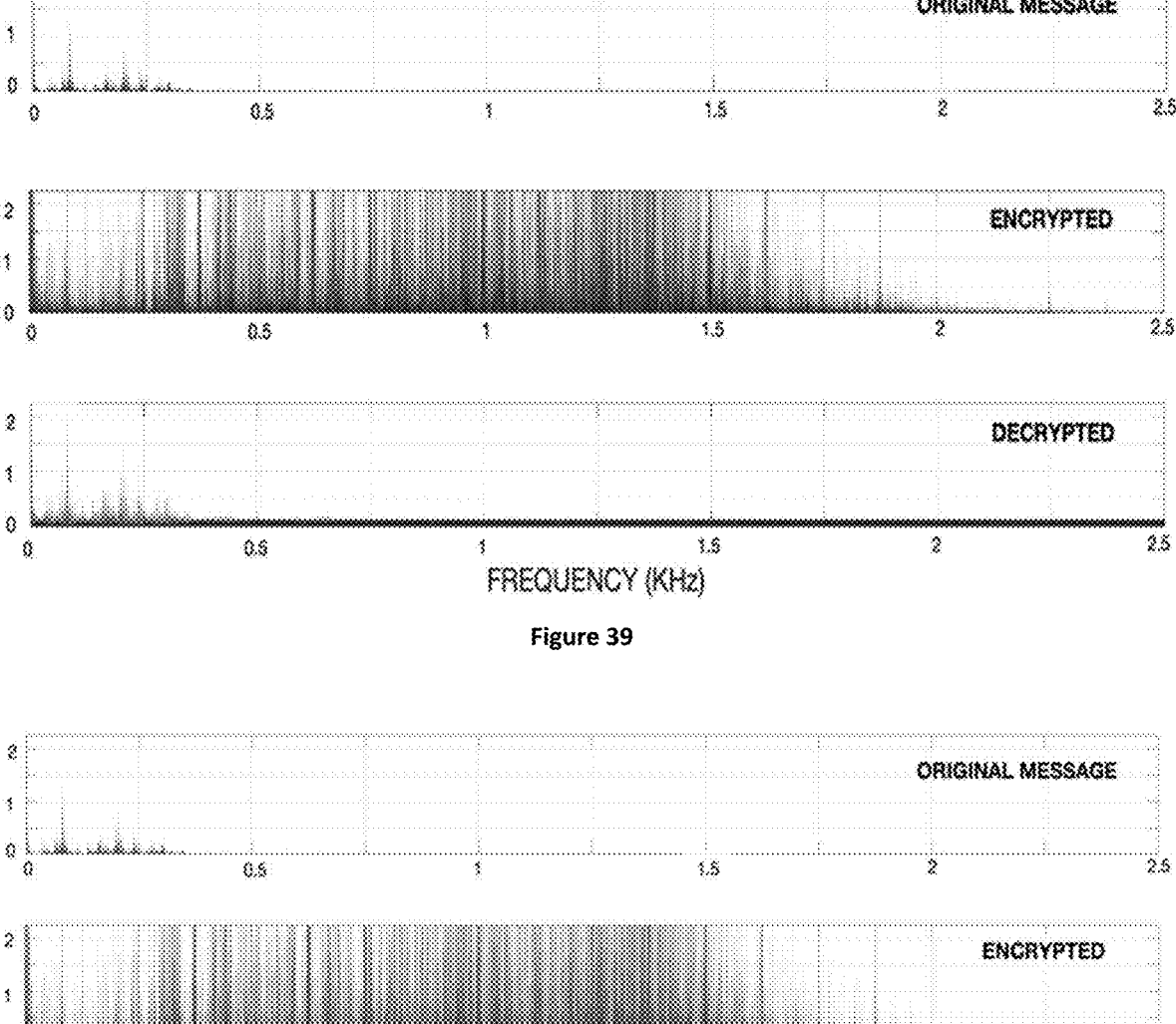
FIG. 39 illustrates an example of power spectra obtained using a simple encryption and decryption circuit with PLTNM mixer using matched keys and includes the spectra for the original message, matching decrypted message, and encrypted message.
FIG. 40 illustrates an example of power spectra obtained using an encryption and decryption circuit with PLTNM mixer using mismatched keys and includes the spectra for the original message, decrypted message with spectrum that does not match the original message, and encrypted message.

FIG. 39 illustrates the power spectrum of the original message signal 200, the decrypted message signal (decrypted) 2952, and the encrypted message signal (encrypted), both 207 and 2907. When the analog key 201 used for encryption matches the analog key 2901 used for decryption, the power spectra of the original message matches the power spectrum of the original message signal 200. The power spectrum of the message signal 200 to which the dynamic carrier is applied in order to generate the encrypted message signal 2907 is more evenly spread across the available bandwidth. Where the message signal 200 had significant energy in a few frequency bands, that energy has been spread across a wider spectrum. There is also additional frequency content from the key-modulated carrier(s). The amount of spectrum used is a tunable parameter in a preferred embodiment and, as such provides an analog key "sensitivity" adjustment that impacts the frequency and phase modulation in the generation of the dynamic carrier and, thus, the encrypted signal. This adjustment facilitates increasing the encrypted signal complexity (strength) by increasing the dynamic carrier bandwidth to accommodate specific user/application related requirements.

Mismatched Keys

In the frequency domain, the effect of mismatched analog keys is also demonstrated. As a non-limiting example, when the analog key signal presented at 2901 used for decryption is not identical to the analog key signal presented at 201 used for encryption, the power spectrum of the incorrectly decrypted signal will vary significantly from the original message signal. In FIG. 40, the original message signal 200 is shown in the 'Original Message' graph in the top row and the incorrectly decrypted message signal 2952 (decrypted) is shown in the middle row. Note that the power spectrum of each of the two signals is quite distinct. The original message signal is comprised of specific regions of concentrated power at specific frequencies along with other frequency regions displaying much less power. The decrypted message signal has energy spread across a broader spectrum and no longer exhibits the distinctive power spectrum contour of the original message. Although visually the decrypted message signal 2952 appears to be similar to the encrypted message signal at 207 or 2907 in that they both have much broader spectral dispersion than the original message, mathematically, the two signal are relatively uncorrelated (r=−0.212).

The graphs of FIG. 40 were generated using the exact same system and parameters as FIG. 39 except for the application of an analog key signal used for decryption that does not match the analog key signal used for encryption. FIG. 40 illustrates the scenario in which an encrypted signal may be intercepted in transmission or through unauthorized access to a data storage system. However, without the correct (matching) analog key, as well as any required synchronization control signals, the analog encrypted signal cannot be decrypted and the original message signal cannot be deciphered/recovered.

Figure 41:
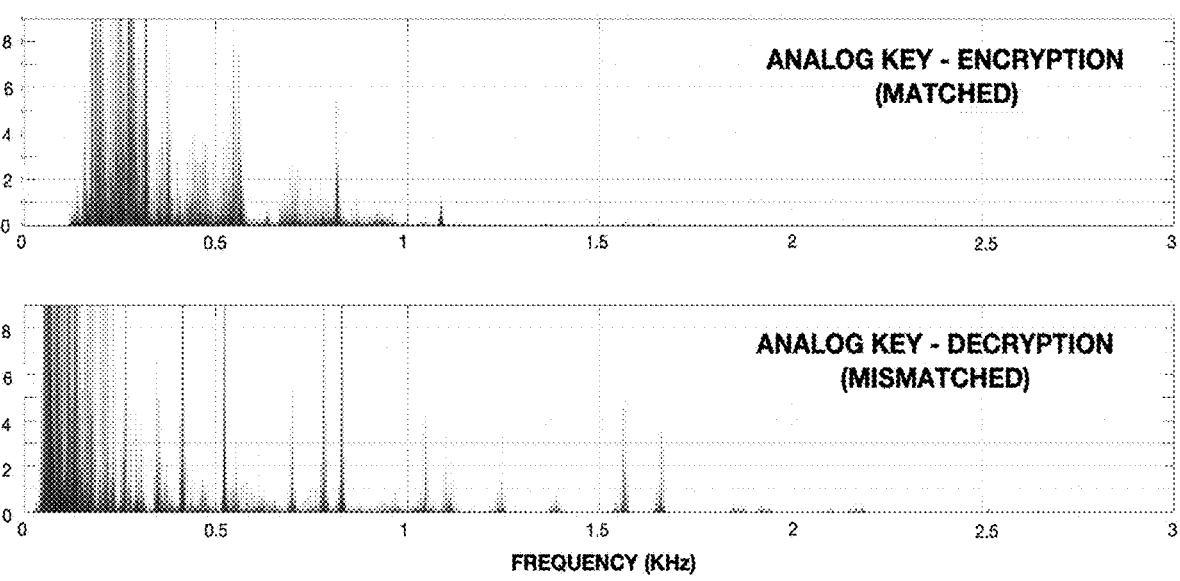
FIG. 41 illustrates the power spectra of the two analog keys used to generate the preceding figures, a matched key for encryption and a mismatched key used for decryption, with the matched key used for both encryption and decryption and, where mismatched keys are used, the matched key is used for the encryption side and the mismatched key is used for decryption.

Power spectra of the two keys used to generate the power spectra illustrated in FIGS. 39 and 40 are shown in FIG. 41 for reference. The 'Matched Key' signal is used for both analog key signal 201 in FIG. 2 and analog key signal 2901 to generate the matched key graphs of FIG. 39. To generate the mismatched power spectrum graphs of FIG. 40 the top matched key was used for analog key signal 201 in FIG. 2, and the lower mismatched key was used for analog key signal 2901 in FIG. 29.

Description of the First Disclosed Embodiment with Data

Encryption/Decryption System Model Results

Note that in the following discussion the pairs of terms "analog key" and "analog key signal," "encrypted signal" and "encrypted message signal," and "decrypted message" and "decrypted message signal" have identical meaning and may be used interchangeably.

Figure 42:
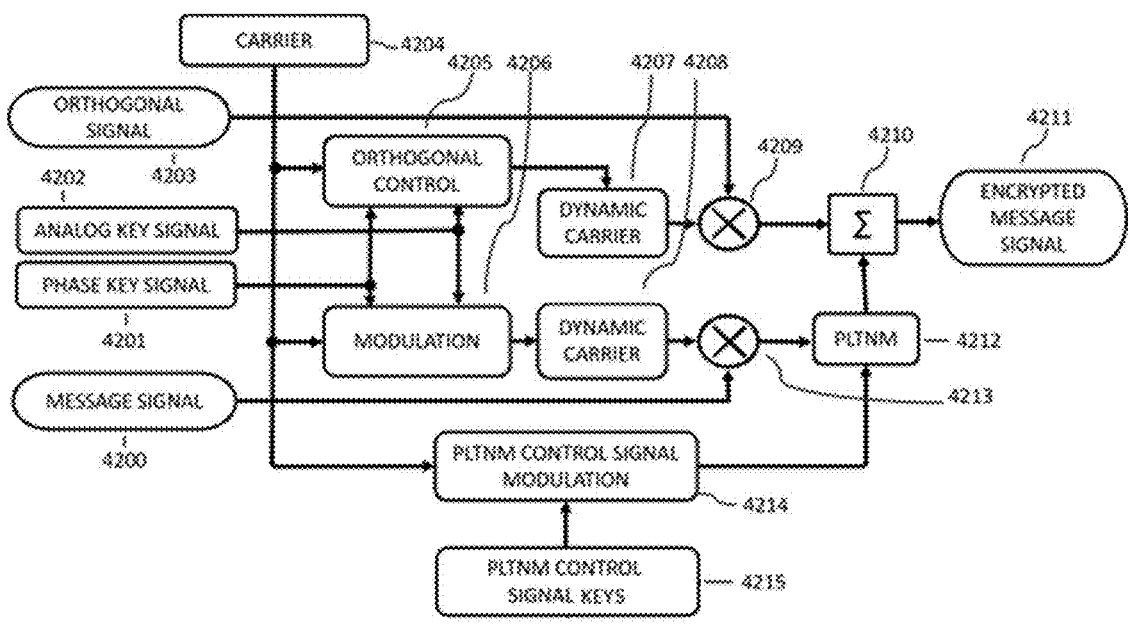
FIG. 42 illustrates the process flow diagram for an encryption system with multiple analog key signals, an orthogonal signal, and a message signal applied.
Figure 43:
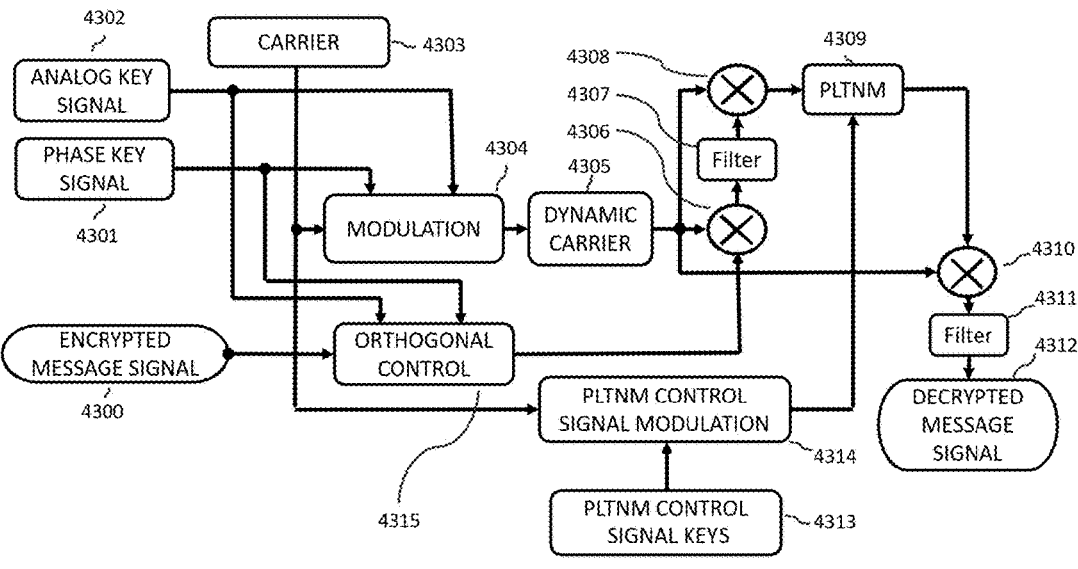
FIG. 43 illustrates the process flow diagram for a decryption system that corresponds to the encryption system of FIG. 42.

Inputs, outputs, and intermediate signals from a system of FIG. 1 form an encryption device of FIG. 42, combining the basic encryption process illustrated in FIG. 2, with keys converted to dynamic carriers, orthogonal signaling as shown in FIG. 8, and PLTNM circuit utilized with control signals such that if the control signals do not match, encrypted signal complexity and thus security, is maintained. In addition, the PLTNM circuits have, per FIG. 22, a plurality (four (4) shown in this example) of control points possible. This embodiment employs two controls each at both the encryption system and decryption system for each of the PLTNM, where the resistive elements in the resonant circuit and feedback may be varied. Two controls are additionally utilized for the inverse function of PLTNM for both the encryption system and the decryption system. FIG. 43 illustrates the corresponding decryption system where keys are required to match keys utilized for encryption. As presented in the other two detailed embodiments described, an analog key signal 4202 and an additional analog key signal (in this embodiment) termed "Phase Key Signal" 4201 are presented to a modulation block 4206 where the keys modulate, either in frequency or phase as their names imply, a carrier 4204 signal. This modulated carrier (the DC) 4208 is mixed 4213 with the message signal 4200. This is the basic system of the first detailed embodiment described above, but a number of enhancements have been added to this embodiment. The analog key signal 4202 and the phase key signal 4201 are also applied to modulate a carrier 4204 in an orthogonal control block 4205 to produce a second dynamic carrier 4207 that is orthogonal (shifted in phase by 90 degrees or $\pi/2$ radians) relative to the first dynamic carrier 4208, described previously. The 2nd dynamic carrier 4207 is mixed, in this specific example using a multiplicative mixer 4209 with the orthogonal signal 4203.

If keys are applied during the decryption process that match keys used during the encryption process, the energy injected into the encrypted signal is removed, otherwise the energy serves as an additional layer making recovery of keys or recovery of the original message more difficult.

A plurality of PLTNM control signals 4215 (four (4) shown in this example) modulate carrier signals 4204 to create modulated carriers for control of the PLTNM circuit in block 4212. This block comprises a series connected pair of PLTNM circuit stages equivalent without limitation to circuits like FIG. 22 and FIG. 23. The mixed 4213 message signal 4200 and DC 4208 passes through the PLTNM circuit and is summed at a summation block 4210 with the signal from mixer 4209 to generate the encrypted message signal 4211.

The encrypted message signal 4211 can be either transmitted to a receiver for decryption or the encrypted signal may be stored for later retrieval. Note that the encrypted message signal is not at baseband but is centered at the carrier frequency. When sent to a receiver device for decryption as depicted in FIG. 43, the encrypted message signal is shown as 4300. Analogous to the encryption system case, an analog key signal 4302 and phase key signal 4301 modulate the frequency and phase of a carrier 4303 via modulator 4304 to produce a dynamic carrier 4305. This DC 4305 is mixed, in this specific embodiment, by a multiplicative mixer 4306 with the encrypted message signal 4300 to produce a version of the encrypted message signal at baseband and at 2× the center frequency. The higher frequency version is filtered 4307 which, if the analog key and phase keys applied for decryption are identical to those applied for encryption, will remove energy contributed by the orthogonal signal 4203 from FIG. 42.

Removal of the orthogonally added signal shown in FIG. 42 originating as 4203 and where the analog key signal 4202 and phase key signal 4201 are modulated in the orthogonal control 4205 is centered in FIG. 43 at orthogonal control 4315. In the decryption case the analog key signal 4302 and phase key signal 4301 along with the encrypted message signal 4300 are shown affecting the orthogonal control 4315. Here rather than an explicit modulation, if the encryption system keys and decryption system keys match, the energy from the orthogonal signal will not be translated at mixer 4306 and will be filtered in filter 4307 so that on further processing at mixer 4308 the signal is no longer present.

This encrypted signal from filter 4307 mixed at mixer 4308 with dynamic carrier 4305 is then shifted from baseband back to the center frequency range by mixer 4308 and dynamic carrier 4305 and is available for processing by the PLTNM circuit represented by block 4309 in which the plurality of control signals (four (4) shown in this example) must match the control signals used in encryption, represented by block 4314 arising from 4313. After completion of PLTNM processing the signal is returned back to baseband by mixer 4310 using dynamic carrier 4305 resulting in decrypted message signal 4312.

This description represents one instant example demonstrating the utility of the methods and devices of the present technology and is not a limiting example. Practitioners skilled in the art will recognize that frequencies and bandwidths can be scaled, thereby increasing or reducing the complexity of the various signals and encryption strength based on the needs of the individual application within the bounds of the present technology.

The particular embodiment utilized to generate the data for FIGS. 44-49 includes the basic encryption device of FIG. 2, but with the addition of an orthogonal signal added for increased energy when keys do not match between encryption system and decryption system, and the addition of the PLTNM circuit with multiple parallel independent real-time controls that both require matching between encryption system and decryption system, and where additional energy provided to the encryption signals exhibits higher-order non-linear characteristics.

Time Domain

Matched Keys

Figure 44:
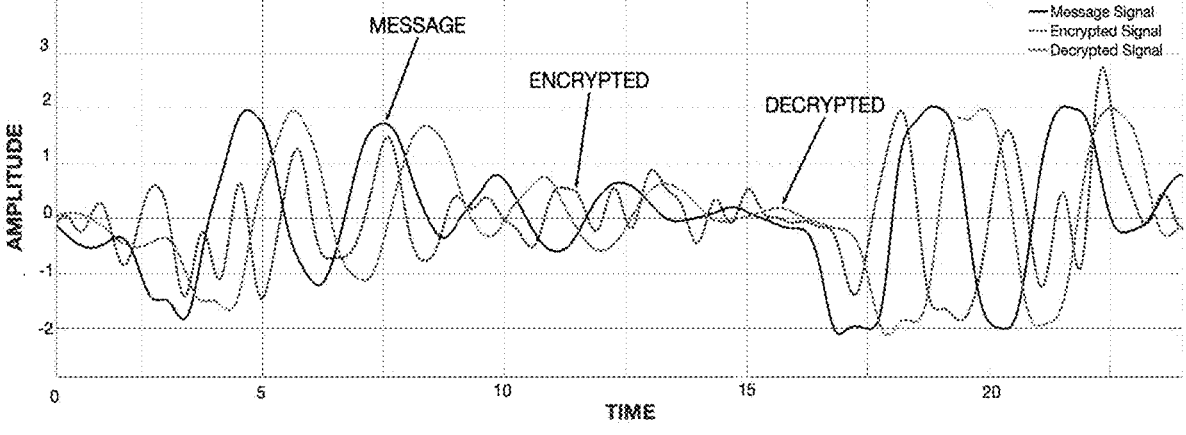
FIG. 44 illustrates the resultant time domain waveforms for the complex encryption-decryption system illustrated in FIGS. 42 and 43 with matching encryption and decryption keys.

FIG. 44 is a time domain (signal amplitude over time rather than a frequency distribution) illustration of the result of reducing to practice FIG. 1 using the encryption device utilizing the general information describing the encryption process depicted in FIG. 42, and the decryption process depicted in FIG. 43. The analog key(s) presented to both the encryption device and the decryption device as well as the control signals must match in order to successfully recover the original message.

As described previously, the Pearson correlation coefficient (Pearson r) provides an objective means to quantify how well two waveforms correlate to each other—it essentially quantifies the similarity between the waveforms.

Note that the decrypted signal (somewhat time-delayed relative to the message signal, due to filter 4311 shown in FIG. 43) is highly correlated with the message signal (r=0.996). In this case, the analog key signal (uncorrelated with the message (r=0.048) (see FIG. 46), decrypted (−0.001) and encrypted (−0.001) signals) is applied to the encryption device 4202 in FIG. 42. The message signal (FIG. 42), applied as signal 4200 to produce the encrypted signal 4211 (FIG. 42).

The encrypted message signal 4211 4300 does not correlate with either the message signal 4200 (r=0.040), the analog key signal 4202 4302 (r=−0.001), or the decrypted message signal 4312 (r=0.042).

Mismatched Keys

In a key-based encryption system, the key used for decryption must match (be identical to) the key used for encryption in order for the message signal to be retrieved. "Retrieved", in this context, means that the encrypted signal is decrypted to recover the original message. If the signal applied as a key for decryption does not match the key used for encryption, the original message cannot be decrypted or recovered.

Figure 45:
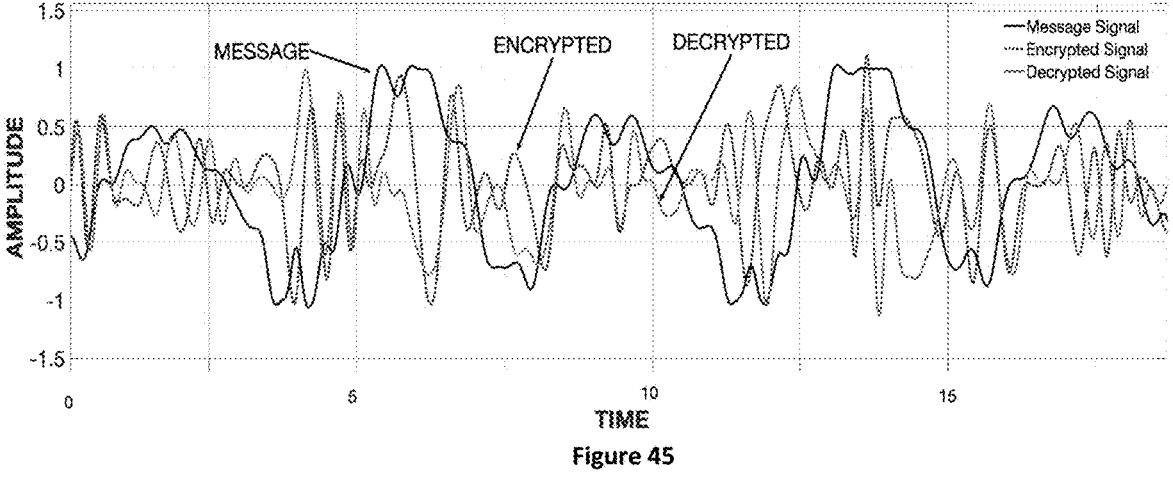
FIG. 45 illustrates the resultant time domain waveforms for the complex encryption-decryption system illustrated in FIGS. 42 and 43 with the encryption and decryption keys mismatched.

FIG. 45 illustrates the signals produced from the system depicted in FIG. 1 and the encryption process utilizing the general information depicted in FIG. 42, and decryption process depicted in FIG. 43, in which the key applied for decryption is not identical (mismatched) to the key applied for encryption. FIG. 45 illustrates a message signal 4200 encrypted by an analog key 4202 to generate an encrypted message signal 4211. The message signal and encrypted signal (encrypted message signal) are highly uncorrelated (r=0.040).

When the encrypted message signal 4211 is presented as encrypted message signal 4300 to the decryption device (FIG. 43), and the analog key signal 4302 is not identical to analog key 4202 utilized for encryption, the decrypted message signal 4312 (decrypted signal, decrypted) in FIG. 45, as a non-limiting example, is generated that has essentially no correlation with the original message signal 4200 (r=0.023) (i.e. it bears no resemblance to the original message signal 4200 waveform). The original message signal 4200 cannot be detected or recovered (decrypted) from the encrypted signal using the wrong key, 4302 (not identical to the key applied for encryption) and is thus protected from unauthorized access.

Figure 46:
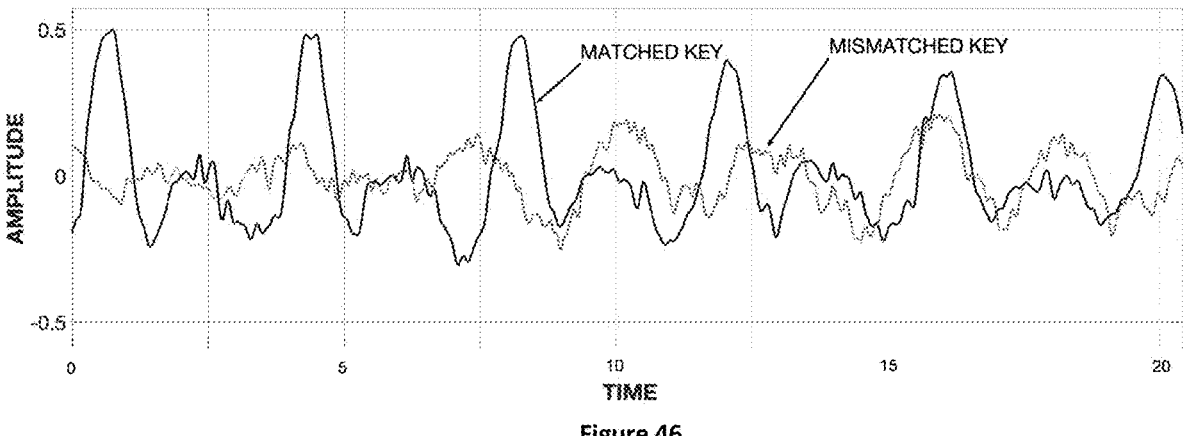
FIG. 46 illustrates the matched key used for both encryption and decryption, and the mismatched key used for decryption over a representative time segment only for the encryption system of FIG. 42 and decryption system of FIG. 43.

FIG. 46 compares representative time segments of both the matched key shown in FIG. 44 and utilized when generating the data for FIG. 36 for both analog key signal 4202 in FIG. 42 and analog key signal 4302 in the decryption process depicted in FIG. 43. The "mismatched key" or signal shown in FIG. 46 is used for analog key signal 4301 in the decryption process depicted in FIG. 43 when generating data for FIG. 45.

The analog key signal applied for both encryption and decryption to obtain the results depicted in FIG. 44 are identical, illustrated as the waveform labeled "MATCHED KEY." The analog key signal applied for encryption and decryption to obtain the results illustrated in FIG. 45 are the two different waveforms labeled "MATCHED KEY" and "MISMATCHED KEY," respectively. Although only a representative time segment is depicted in FIG. 46, the two signals (labeled "MATCHED KEY" and "MISMATCHED KEY") applied as analog keys are uncorrelated (r=−0.029) over their entire time course.

Frequency Domain

The time domain results illustrate the relationship between signals in the encryption/decryption system as they vary over time. The frequency domain analyses provide another means to examine the relationships between the various encryption and decryption device signals. The power spectrum quantifies the relative power contribution from individual frequencies that comprise the time domain waveform.

Matched Keys

Figure 47:
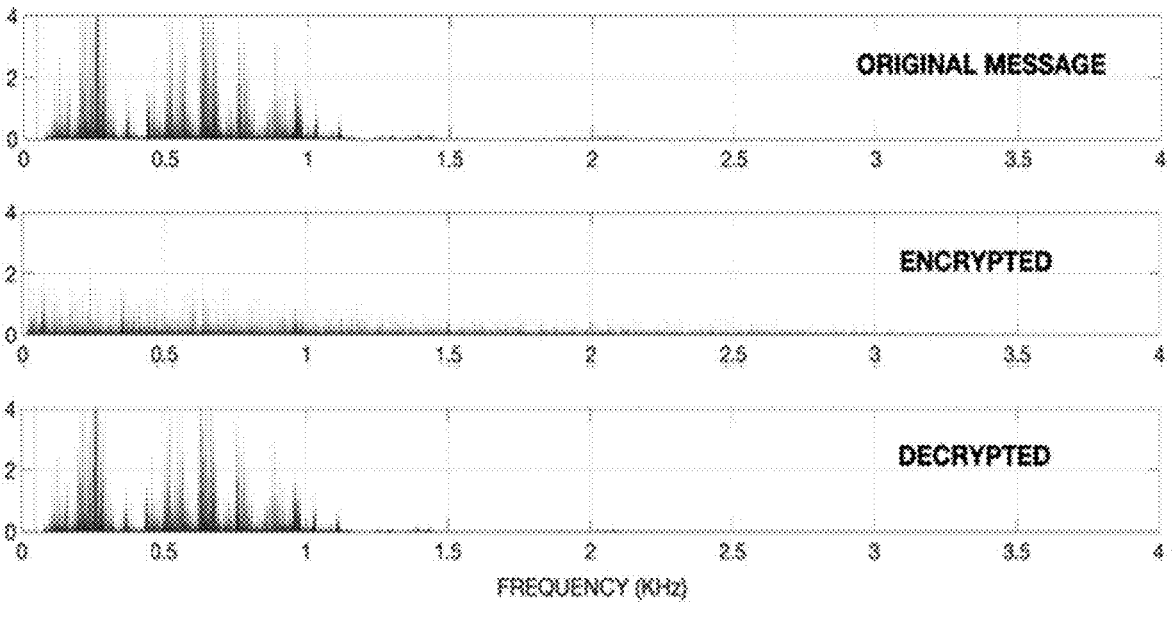
FIG. 47 illustrates the power spectra from the complex encryption-decryption system.

FIG. 47 illustrates the power spectrum of the original message signal 4200, the decrypted message signal (decrypted) 4312, and the encrypted message signal (Encrypted), both 4211 and 4300. When the encryption analog key 4202 matches the analog key 4302 used for decryption, the power spectrum of decrypted message 4312 matches the power spectrum of the original message signal 4200. for the encrypted message signal 4211, the power spectra are more evenly distributed across a broader bandwidth as compared to the original message signal 4200. Where the message signal 4200 had significant energy in fewer frequency bands, that energy has been spread across a wider spectrum. There is also additional frequency content from the key-modulated carrier(s). The amount of spectrum used is a tunable parameter in a preferred embodiment and, as such provides an analog key "sensitivity" adjustment that impacts the frequency and phase modulation in the generation of the dynamic carrier and, thus, the encrypted signal. This adjustment facilitates increasing the encrypted signal complexity (strength) by increasing the dynamic carrier bandwidth to accommodate specific user/application related requirements.

Mismatched Keys

Figure 48:
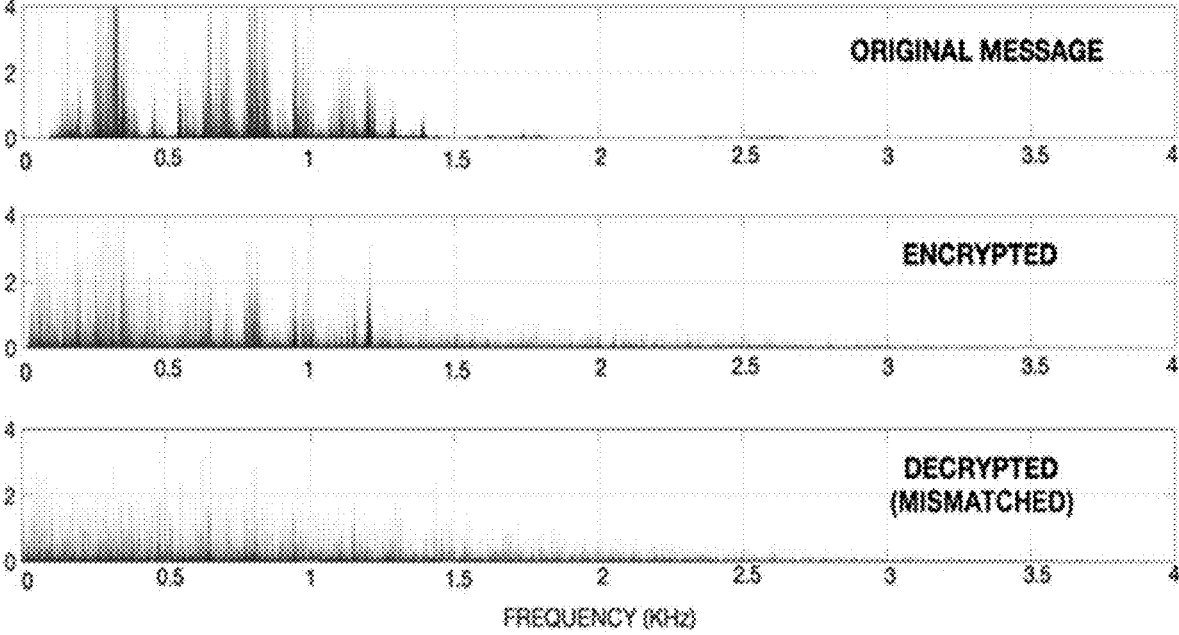
FIG. 48 illustrates an example of power spectra from the complex encryption-decryption system and PLTNM analog key-driven additional protection.

In the frequency domain, the effect of applying mismatched analog keys is also demonstrated. As a non-limiting illustration, when the analog key signal presented at 4202 for encryption is not identical to the analog key signal presented at 4302 for decryption, the power spectrum of the incorrectly decrypted signal will vary significantly from the original message signal. In FIG. 48, the power spectra of the original message signal 4200 is shown in the 'Original Message' graph in the top row and the power spectra of the incorrectly decrypted message signal 4312 (decrypted) is shown in the middle row. Note that the power spectrum of each of the two signals is quite distinct. The original message signal is comprised of specific regions of concentrated power at specific frequencies along with other frequency regions with much less power. The decrypted message signal has energy spread across a broader spectrum and no longer exhibits the distinctive power spectrum contour of the original message. Although visually the decrypted message signal 4312 appears to be similar to the encrypted message signal at 4211 or 4300 in that they both have much broader spectral dispersion than the original message, the Pearson cross-correlation analysis indicates that the two signals are uncorrelated (r=−0.021).

FIG. 47 and FIG. 48 illustrate the output of systems identical in all aspects, except, in FIG. 47, the encryption and decryption analog keys match. In FIG. 48 the encryption and decryption analog keys do not match. FIG. 48 illustrates the scenario in which an encrypted signal may be intercepted in transmission or through unauthorized access to a data storage system. However, without the correct analog key, as well as any required synchronization control signals, the analog encrypted signal cannot be decrypted and the original message signal cannot be recovered.

Figure 49:
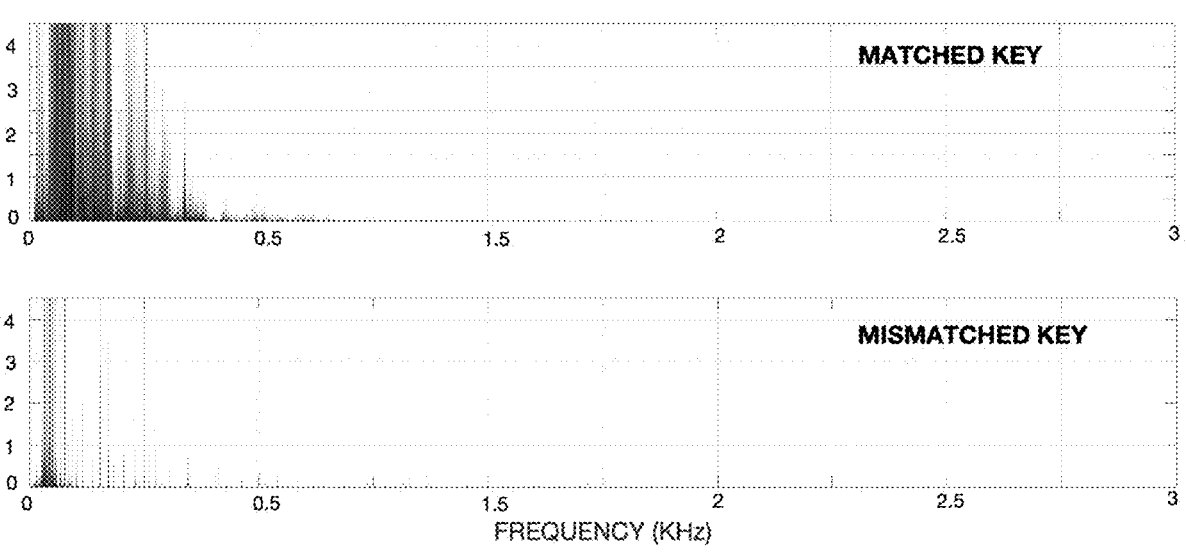
FIG. 49 illustrates the power spectra of the two analog keys used to generate the preceding figures.

Power spectra of the two keys used to generate the signals analyzed in FIGS. 47 and 48 are shown in FIG. 49 for reference. The 'Matched Key' signal is used for both analog key signal 4202 in FIG. 42 and analog key signal 4302 to generate the matched key graphs of FIG. 47. To generate the mismatched power spectrum graphs of FIG. 48 the top matched key was used for analog key signal 4202 in FIG. 42, and the lower mismatched key was used for analog key signal 4302 in FIG. 43.

Expanded Configurations of PLTNM for Encryption

The PLTNM blocks in FIGS. 42 and 43 (4212 and 4309 respectively) can be made to indicate a number of configurations of PLTNM circuits for different levels of encryption. In a first embodiment both could be simple PLTNM as shown in FIG. 22 for example, resulting in matched delays at both encryption system and decryption system. In a second embodiment the circuit at 4212 could be made to match FIG. 22, while 4309 on the other side of the encryption barrier is made to match FIG. 23.

Additional opportunities arise when block 4212 contains a circuit of FIG. 22 followed by a circuit of FIG. 23, and block 4309 then also contains the circuitry of FIG. 22 followed by FIG. 23. Order of the two circuits indicated by the figures within either block is not important. If component values and analog control keys all match, then the message signal simply passes through with gain, but with changes in analog control key values and component values encryption may be enhanced. In particular, the configuration where component values of the FIG. 22 of 4212 match FIG. 23 of 4309, and these are different from what are another matched set of FIG. 23 of 4212 and FIG. 22 of 4309 provides enhanced encryption. Determination of what types of analog control keys to apply to what control points also plays a critical role, but is beyond the scope of this document.

Additional Results Analyses: Spectral Coherence and Cross-Spectrum Phase

As discussed previously two additional signal analyses compare the original message signal to both the encrypted and decrypted signal following the application of both "Matched" (identical to the key used for encryption) and "Mis-Matched" analog security keys for decryption. These analyses support assertions regarding simultaneous effects of the encryption process on multiple signal characteristics (e.g., frequency and phase) on the original message signal depicted relative to both the encrypted and decrypted signals.

Spectral Coherence quantifies the frequency-domain correlation between signals from zero ("0") (uncorrelated) to one ("1") representing the correlation (y-axis) plotted against frequency (x-axis).

Figure 50:
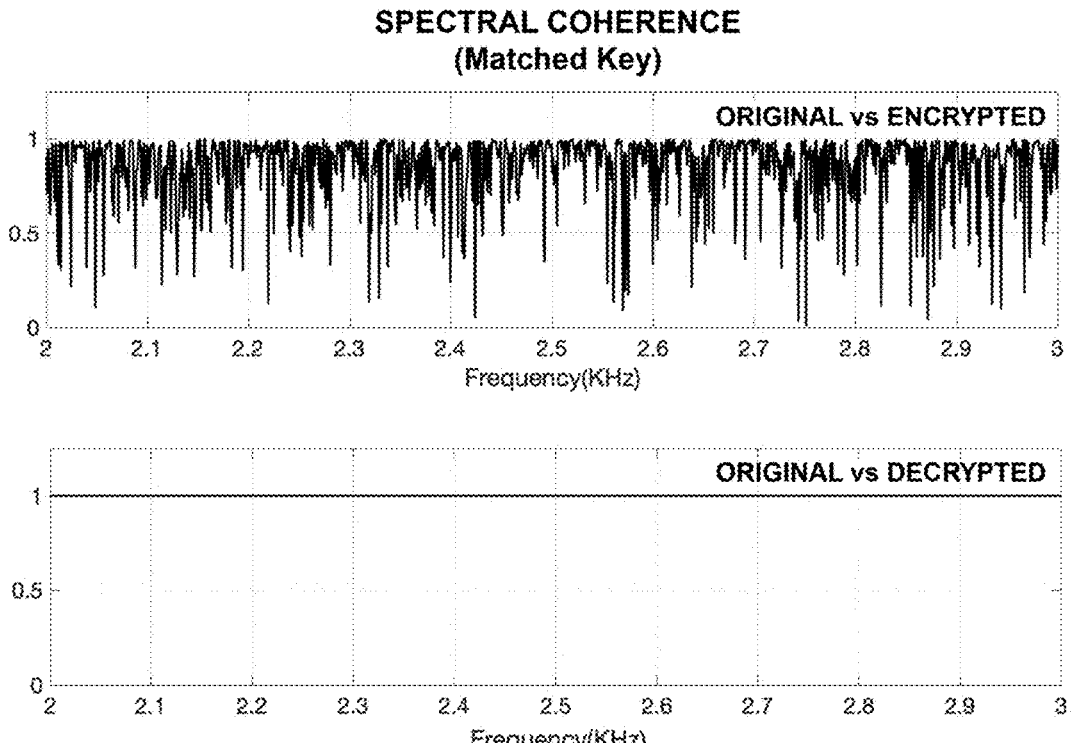
FIG. 50 illustrates the spectral coherence for a PLTNM plus multiplicative mixer encryption-decryption system with matching analog keys.

The spectral coherence results for a PLTNM plus multiplicative mixer encryption-decryption system (including FIGS. 21 and 22) in which the encryption and decryption keys match is illustrated in FIG. 50 for a limited frequency band (2.0 kHz-3.0 kHz). The top illustration depicts the spectral coherence between the original message signal and the encrypted signal. The bottom illustration depicts spectral coherence relative to frequency between the original message signal and the decrypted signal.

Figure 51:
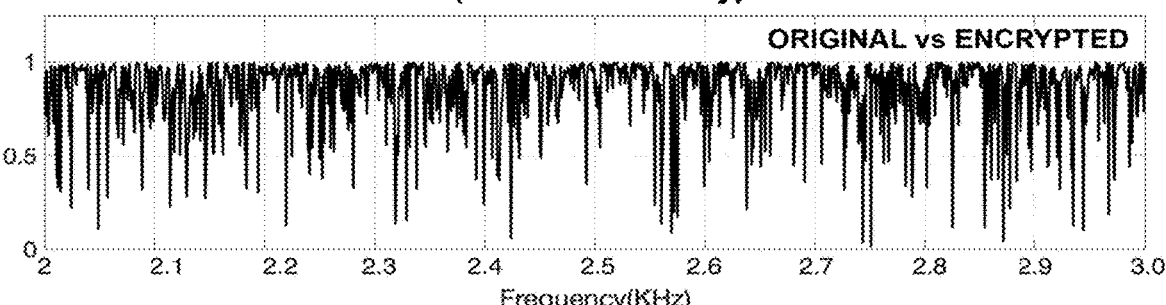
FIG. 51 illustrates the spectral coherence for a PLTNM plus multiplicative mixer encryption-decryption system with mis-matching analog keys.
Figure 51:
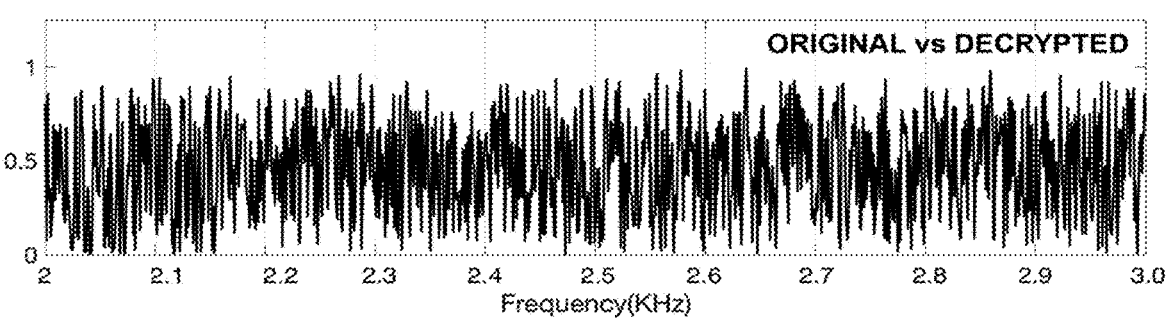

The spectral coherence results for a PLTNM plus multiplicative mixer encryption-decryption system (including FIGS. 21 and 22) in which the encryption and decryption keys do not match are illustrated in FIG. 51 for a limited frequency band (2.0 kHz-3.0 kHz). The top illustration depicts the spectral coherence relative to frequency between the original message signal and the encrypted signal. The bottom illustration depicts spectral coherence relative to frequency between the original message signal and the decrypted signal.

Figure 52:
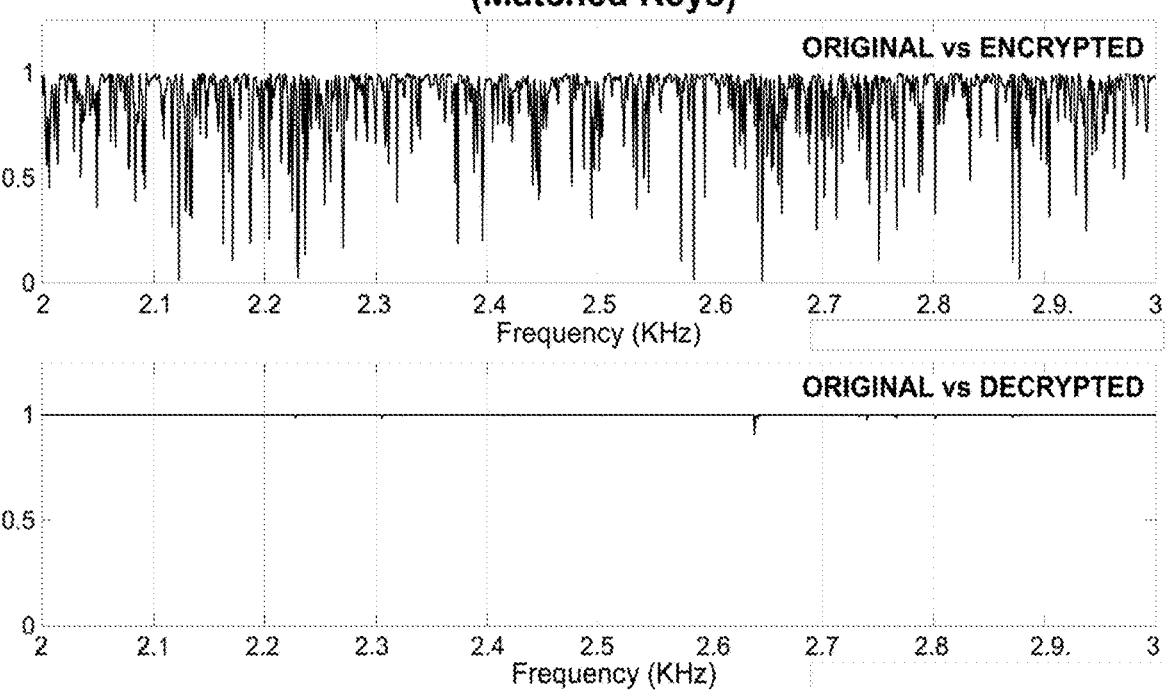
FIG. 52 illustrates the spectral coherence for a PLTNM plus multiplicative mixer encryption-decryption system with orthogonality and with matching analog keys.

The spectral coherence results for a PLTNM plus multiplicative mixer encryption-decryption system with orthogonal masking added, in which the encryption and decryption keys match, are illustrated in FIG. 52 for a limited frequency band (2.0 kHz-3.0 kHz). The top illustration depicts the spectral coherence relative to frequency between the original message signal and the encrypted signal. The bottom illustration depicts spectral coherence relative to frequency between the original message signal and the decrypted signal.

Figure 53:
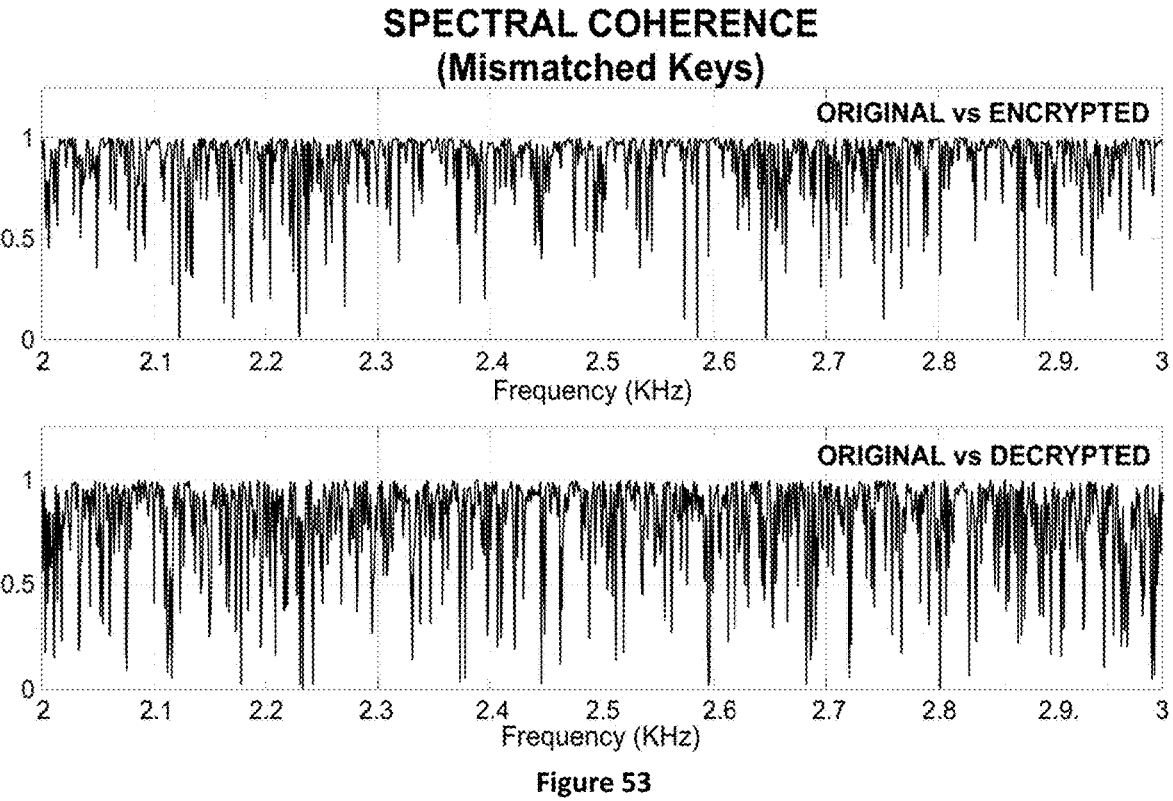
FIG. 53 illustrates the spectral coherence for a PLTNM plus multiplicative mixer encryption-decryption system with orthogonality and with mis-matching analog keys.

The spectral coherence results for a PLTNM plus multiplicative mixer encryption-decryption system with orthogonal masking added, in which the encryption and decryption keys do not match, are illustrated in FIG. 53 for a limited frequency band (2.0 kHz-3.0 kHz). The top illustration depicts the spectral coherence relative to frequency between the original message signal and the encrypted signal. The bottom illustration depicts spectral coherence relative to frequency between the original message signal and the decrypted signal.

Cross-Spectrum Phase: estimates the relative phase in degrees (y-axis) between the signal spectral (frequency) components (x-axis).

Figure 54:
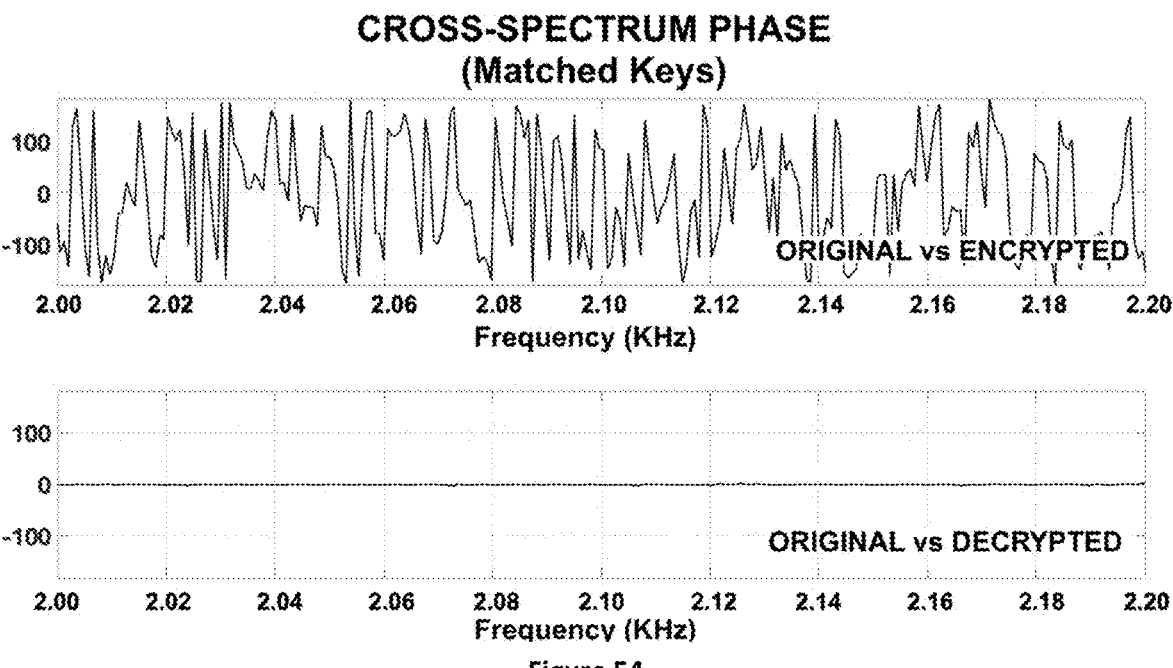
FIG. 54 illustrates the cross-spectrum phase plots for the spectrum of FIG. 50.

The cross-spectrum phase results for a PLTNM encryption-decryption system (FIGS. 21 and 22) in which the encryption and decryption keys match are illustrated in FIG. 54 for a limited frequency band (2.0 kHz-2.2 kHz). The top illustration depicts the cross-spectrum phase relative to frequency between the original message signal and the encrypted signal. The bottom illustration depicts cross-spectrum phase relative to frequency between the original message signal and the decrypted signal.

Figure 55:
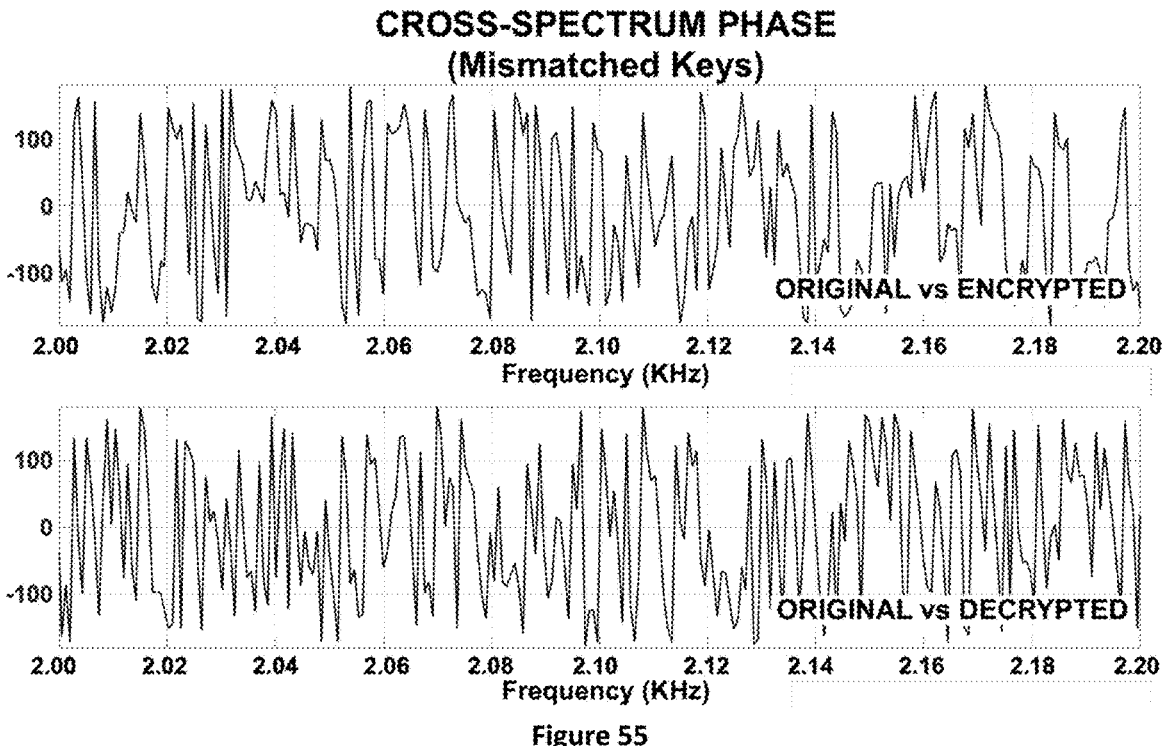
FIG. 55 illustrates the cross-spectrum phase plots for the spectrum of FIG. 51.

The cross-spectrum phase results for a PLTNM encryption-decryption system (FIGS. 21 and 22) in which the encryption and decryption keys do not match are illustrated in FIG. 55 for a limited frequency band (2.0 kHz-2.2 kHz). The top illustration depicts the cross-spectrum phase relative to frequency between the original message signal and the encrypted signal. The bottom illustration depicts cross-spectrum phase relative to frequency between the original message signal and the decrypted signal.

Figure 56:
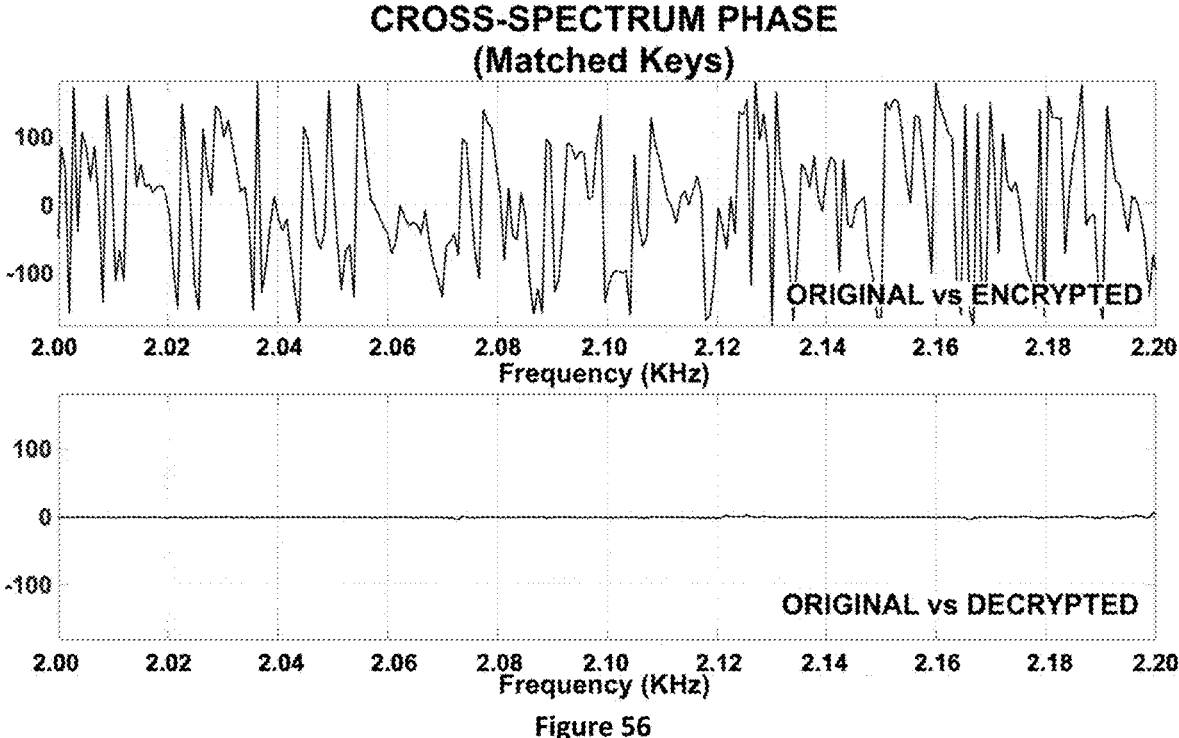
FIG. 56 illustrates the cross-spectrum phase plots for the spectrum of FIG. 52.

The cross-spectrum phase results for a PLTNM encryption-decryption system with orthogonal masking added, in which the encryption and decryption keys match, are illustrated in FIG. 56 for a limited frequency band (2.0 kHz-2.2 kHz). The top illustration depicts the cross-spectrum phase relative to frequency between the original message signal and the encrypted signal. The bottom illustration depicts cross-spectrum phase relative to frequency between the original message signal and the decrypted signal.

Figure 57:
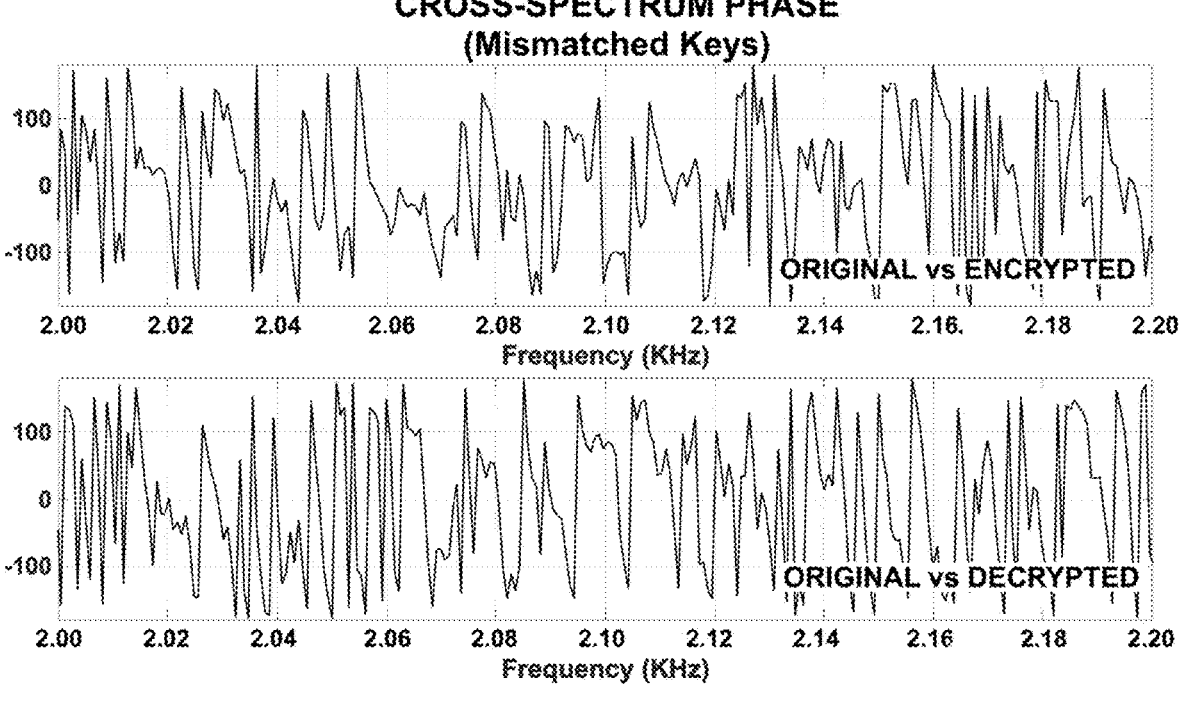
FIG. 57 illustrates the cross-spectrum phase plots for the spectrum of FIG. 53.

The cross-spectrum phase results for a PLTNM encryption-decryption system with orthogonal masking added, in which the encryption and decryption keys do not match, are illustrated in FIG. 57 for a limited frequency band (2.0 kHz-2.2 kHz). The top illustration depicts the cross-spectrum phase relative to frequency between the original message signal and the encrypted signal. The bottom illustration depicts cross-spectrum phase relative to frequency between the original message signal and the decrypted signal.

Additional Results Analyses: Bit Error Rate (BER)

Systems utilizing or handling digital data are concerned with the integrity of that data, and one commonly utilized measure of that integrity is Bit Error Rate (BER). BER is generally used for communication channels rather than encryption systems, but it is a useful measure when looking at the fidelity of correctly decrypted signals relative to the original message signal. BER is defined as the percentage of bits in a stream of bits that are incorrect over a given time period.

BER results for an embodiment of the present technology utilizing binary phase-shift keying (BPSK) to translate digital bits to analog for presentation to the encryption system (and the reverse at the end after decryption) are BER=0.485546875 for original message versus encrypted message, and 0.000000000 for original message versus decrypted message. This simulation used matching encryption and decryption analog keys. The BER for original message versus encrypted message will trend to 0.50 over large samples as this is the probability of a "1" changing to a"0" or a "0" changing to a "1" randomly.

BER results for an embodiment of the present technology utilizing binary phase-shift keying (BPSK) to translate digital bits to analog for presentation to the encryption system in the analog domain (and the reverse at the end after decryption) are BER=0.485578125 for original message versus encrypted message, and 0.47859375 for original message versus decrypted message in which the simulation applied mis-matching encryption and decryption analog keys. In this case because the keys for encryption and decryption did not match, the decrypted signal should not match the original message, and the BER shows that it does not, with an error rate approaching 50% which is to be expected.

BER results for an embodiment of the present technology utilizing 1) binary phase-shift keying (BPSK) to translate digital bits to analog for presentation to the encryption system (and the reverse at the end after decryption) and 2) applying partial (50%) orthogonal masking, are BER=0.48565625 for original message versus encrypted message, and 0.127953125 for original message versus decrypted message. In this simulation, the encryption and decryption analog keys matched, but partial orthogonal masking was applied. Although the keys for encryption and decryption match, the decrypted signal should still not completely match the original message with a BER of about 13% while the BER between the original message and the encrypted indicated the expected error rate approaching 50%.

Although the disclosed embodiment has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. A method for encrypting a message, comprising the steps of:
    receiving an analog message in an analog domain, the analog message to be encrypted and having a first length and initiated at a first time;
    receiving an analog key signal in the analog domain having a second length equal to or greater than the first length, wherein the analog key signal is initiated at the same time as the analog message;
    generating a reference sinusoidal signal having a reference frequency;

combining the reference sinusoidal signal and the analog message with a first combiner;

modifying the combined reference sinusoidal signal with the analog key signal which causes the spectral energy of the reference sinusoidal signal to be centered around the reference frequency; and outputting from the combiner an encrypted message generated based on the modification of the combined reference sinusoidal signal.

2. The method of claim 1, wherein the reference sinusoidal signal is modulated with a modulator and the received analog key signal provides the input to the modulator.

3. The method of claim 2, wherein the modulator is operated by a modulation selected from the group consisting of phase modulation, frequency modulation and amplitude modulation.

4. The method of claim 1, wherein the combiner is a mixer.

5. The method of claim 1, wherein the combiner is a multiplier.

6. The method of claim 1, wherein the reference sinusoidal signal comprises a carrier centric signal that can be transmitted over a communication link.

7. The method of claim 1, wherein the reference frequency of the reference sinusoidal signal is above the frequency range of the analog key signal.

8. The method of claim 1, wherein the analog key signal is non periodic.

9. The method of claim 8, wherein the analog key signal is a continuous analog signal.

10. A method for decrypting a complex analog encrypted message that was encrypted in an encryption process, the complex analog encrypted message encrypted with an analog key signal in an analog domain, the complex analog encrypted message having a finite length equal to or greater than the length of the analog message that was encrypted, comprising the steps of:

receiving the complex analog encrypted message in the analog domain to be de-crypted and having a first length and initiated at a first time;

receiving an analog key signal in the analog domain having a second length equal to or greater than the first length identical to the analog key signal utilized in the encryption process, wherein the received analog key signal is initiated at the same time as the complex analog encrypted message;

generating a reference sinusoidal signal having a reference frequency;

combining the reference sinusoidal signal and the complex analog encrypted message with a first combiner;

modifying the combined reference sinusoidal signal with the received analog key signal which causes the spectral energy of the reference sinusoidal signal to be centered around the reference frequency; and outputting from the combiner a decrypted message generated based on the modification of the combined reference sinusoidal signal.

11. The method of claim 10, wherein the reference sinusoidal signal is modulated with a modulator and the received analog key signal provides the input to the modulator.

12. The method of claim 11, wherein the modulator is operated by a modulation selected from the group consisting of phase modulation, frequency modulation and amplitude modulation.

13. The method of claim 10, wherein the combiner is a mixer.

14. The method of claim 10, wherein the combiner is a multiplier.

15. The method of claim 10, wherein the reference sinusoidal signal comprises a carrier centric signal that is identical to a carrier centric signal utilized in the encryption process to generate the complex analog encrypted message.

16. The method of claim 10, wherein the reference frequency of the reference sinusoidal signal is above the frequency range of the analog key signal.

17. The method of claim 10, wherein the analog key signal is non periodic.

18. The method of claim 17, wherein the analog key signal is a continuous analog signal.

\* \* \* \* \*